US005650584A

United States Patent [19]

Shinsky

[11] Patent Number: 5,650,584

[45] Date of Patent: Jul. 22, 1997

[54] FIXED-LOCATION METHOD OF COMPOSING AND PERFORMING AND A MUSICAL INSTRUMENT

[76] Inventor: Jeff K. Shinsky, 15531 Mira Monte, Houston, Tex. 77083

[21] Appl. No.: 531,786

[22] Filed: Sep. 21, 1995

Related U.S. Application Data

[60] Provisional application No. 60/020457 Aug. 28, 1995.

[51] Int. Cl.$^6$ .............................. G10H 5/00; H02M 5/00

[52] U.S. Cl. .............................. 84/657; 84/619; 84/613; 84/669

[58] Field of Search .............................. 84/613, 619, 637, 84/657, 669

[56] References Cited

U.S. PATENT DOCUMENTS

| | | | |
|---|---|---|---|
| 5,003,860 | 4/1991 | Minamitaka | 84/613 X |
| 5,078,040 | 1/1992 | Shibukawa | 84/619 |
| 5,083,493 | 1/1992 | Heo | 84/613 |
| 5,153,361 | 10/1992 | Kozuki | 84/613 |

*Primary Examiner*—William M. Shoop, Jr.
*Assistant Examiner*—Jeffrey W. Donels

[57] ABSTRACT

A method and apparatus for composing and performing music on an electronic instrument in which individual chord progression chords can be triggered in real-time, while simultaneously making the individual notes of the chord, and/or possible scale and non-scale notes to play along with the chord, available in separate fixed-locations on the instrument. The method of composition involves the designation of a chord progression section on the instrument, then assigning chords to this chord progression section according to particular song keys and scales. Further, as each chord is played in the chord progression section, the individual notes of the currently triggered chords are simultaneously made available for playing in a separate fixed location on the instrument. Fundamental and alternate (fifth) notes of each chord may be made available in separate fixed locations for composing purposes. Possible scale and non-scale notes, to play along with the currently triggered chord, can also be simultaneously made available for playing in fixed locations on the instrument. Finally, a method of storing all composition data in memory, in which all of this sequenced data can later be retrieved and performed by the user from a fixed location on the instrument, and on a reduced number of keys.

30 Claims, 33 Drawing Sheets

Set Scale Type to Y with root note N

FIXED-LOCATION METHOD OF COMPOSING AND PERFORMING AND A MUSICAL INSTRUMENT

This application claims the benefit of U.S. provisional application No. 60/020,457, filed Aug. 28, 1995.

The present invention relates generally to a method of composing and performing music on an electronic instrument. This invention relates more particularly to a method and an instrument for composing in which individual chords in a chord progression can be triggered in real-time. Simultaneously, other notes, such as individual notes of the chord, scale, and non-scale notes may be selectively played along with the chord. These other notes are made available in separate fixed locations on the instrument. The present invention further provides to a user or performer a means of adding additional musically correct parts to the composition once a basic chord progression and melody are decided upon and recorded by the user.

BACKGROUND OF THE INVENTION

A complete electronic musical system should have both a means of composing professional music with little or no training, and a means of performing music, whether live or along with a previously recorded track, with little or no training, while still maintaining the highest levels of creativity and interaction in both composition and performance.

Methods of composing music on an electronic instrument are known, and may be classified in either of two ways: (1) a method in which automatic chord progressions are generated by depression of a key or keys (for example, Cotton Jr., et al., U.S. Pat. No. 4,449,437), or by generating a suitable chord progression after a melody is given by the user (for example, Minamitaka, U.S. Pat. No. 5,218,153); and (2) a method in which one-finger chords can be produced in real-time (for example, Aoki, U.S. Pat. No. 4,419,916).

The first method of composition involves generating presequenced or preprogrammed accompaniment. This automatic method of composition lacks the creativity necessary to compose music with the freedom and expression of a trained musician. This method dictates a preprogrammed accompaniment without user selectable modifications in real-time, either during composition or performance.

The second method of composition, on the other hand, allows a user to trigger one-finger chords in real-time, thus allowing the user some creative control over which chord progression is actually formed. Although this method has the potential to become an adequate method of composition, it currently falls short in several aspects. There are five distinct needs which must be met, before a person with little or no musical training can effectively compose a complete piece of music with total creative control, just as a trained musician would:

(1) A means is needed for assigning a particular section of a musical instrument as a chord progression section in which individual chords can be triggered in real-time with one or more fingers. Further, the instrument should provide a means for dividing this chord progression section into particular song keys and scales so that a user understands the predetermined song key and chord progression number. For example a song in the key of E Major defines a chord progression 1-4-5, as described more fully below.

Shimaya, U.S. Pat. No. 5,322,966, teaches a designated chord progression section, but the chord progression section disclosed in Shimaya follows the chromatic progression of the keyboard, from C to B. Shimaya provides no allowance for dividing this chord progression section into particular song keys and scales. One of the most basic tools of a composer is the freedom to compose in a selected key. Another basic tool allows a musician to compose using specific chord progressions based on the particular key and a scale. As in the previous example, when composing a song in the key of E Major, the musician should be permitted to play a chord progression of 1-4-5-6-2-7-3, or any other progression chosen by the musician.

In our culture's music, there are thousands of songs based on a simple 1-4-5 chord progression. Yet, most people with little or no musical training, and using known systems and methods, have no concept of the meaning of a musical key or a chord progression.

Further, there currently exists no adequate method of creating chord progressions which allow an individual with little or no musical training to compose and perform music with the flexibility and musical know-how of a trained musician, while maintaining creative control. An individual using current methods is limited strictly to a chromatic chord progression in the key of C. Such systems are unduly limited since most modern music is composed using specific song keys and chord progressions based on a particular scale. The present invention, however, allows for the use of chromatics at the discretion of the user. The inexperienced composer who uses the present invention is made fully aware at all times of what he is actually playing. The user can add "non-scale" chromatic chords if desired, not just add them out of ignorance.

(2) There also remains a need for a musical instrument that provides a user the option to play chords with one or more fingers in the chord progression section as previously described, while the individual notes of the currently triggered chord are simultaneously made available for playing in separate fixed chord locations on the instrument. Individual notes can be sounded in different octaves when played. Regardless of the different chords which are being played in the chord progression section, the individual notes of each currently triggered chord can be made available for playing in these same fixed chord location(s) on the instrument in real-time. The fundamental note and the alternate note (fifth) of the chord can be made available in their own fixed locations for composing purposes.

This fixed chord location feature of the present invention allows a user with little or no musical training to properly compose a complete music piece. For example, by specifying this fixed chord location, and identifying the fundamental and alternate bass note locations of each chord, the user can easily compose entire basslines, arpeggios, and specific chord harmonies with no musical training, while maintaining complete creative control.

One obstacle that an individual with little or no training encounters when playing a musical instrument is the need for physical skill to accurately play all of the notes of a particular chord. Chord notes are usually spread out on a keyboard, and therefore are usually very difficult to identify and play efficiently, without extensive training and practice. The fixed-location feature of the present invention virtually eliminates the difficult physical aspects of playing chords on a musical instrument. An individual can play all of the individual notes of each chord in the progression, without movement of the user's hand from the fixed chord section.

(3) There also remains a need for a way to trigger chords with one or more fingers in the chord progression section, while scale notes and/or non-scale notes are simultaneously made available for playing in separate fixed locations on the instrument. These scale notes and non-scale notes can also be played in different octaves. This method of providing scale notes from a fixed location on the instrument dramatically reduces the amount of skill needed to compose and perform music. For example, a pentatonic scale can be made to take up only 5 positions in the fixed scale location, thus allowing the user to compose a song's entire melody line without moving his hand.

(4) There also remains a need for a way to trigger chords with one or more fingers in the chord progression section, while the entire chord is simultaneously made available for playing from one or more keys in a separate fixed location, and can be sounded in different octaves when played. This feature allows the user 16 play right hand chords, inversions, the root position of a chord, and popular voicing of a chord with dramatically reduced physical skill, yet retains the creativity and flexibility of a trained musician.

(5) Finally, there needs to be a means for adding to or modifying a composition once a basic progression and melody are decided upon and recorded by the user. A user with little or no musical training is thus able to add additional musically correct parts to the composition, to remove portions of the composition that were previously recorded, or to simply modify the composition in accordance with the taste of the musician.

Techniques for automating the performance of music on an electronic instrument are also well known, and primarily involve the use of indication systems which display to the user the notes to play on the electronic instrument to achieve the desired performance. These techniques are primarily used as teaching aids of traditional music theory and performance (e.g., Shaffer et al., U.S. Pat. No. 5,266,735). These current methods provide high tech "cheat sheets". The user must follow along to an indication system and play all chords, notes, and scales just as a trained musician would. These methods do nothing to actually reduce the demanding physical skills required to perform the music.

There are three distinct needs which must be met before a person with little or no musical training can effectively perform music while maintaining the high level of creativity and interaction of a trained musician.

The first need involves playing entire melody lines from a reduced number of keys in a fixed location. This technique dramatically reduces the amount of physical skill needed to perform melody lines. A user may perform a song at a reduced skill level. This allows an inexperienced user to play the melody of a song from a fixed location on the instrument without moving his hand. Yet, if the user strikes the wrong key, a wrong note will sound, just as it would with a trained musician. This allows the user to feel an interaction with the instrument.

The second need involves playing all of the individual chord notes in a song's chord progression from a fixed location on the instrument. This dramatically reduces the amount of physical skill needed to perform music, while allowing a user total creative control in playing basslines, arpeggios, and melodies from the fixed location.

The third need involves playing the entire chord in a song's chord progression with one or more keys from a fixed location on the instrument. This method also dramatically reduces the amount of physical skill needed to perform music, while still allowing a user total creative control in playing all inversions, including root position and popular voicing, without moving his hand from the fixed chord location.

SUMMARY OF THE INVENTION

There currently exists no such adequate means of composing and performing music with little or no musical training. It is therefore an object of the present invention to allow one to compose and perform music with dramatically reduced physical skill requirements and no need for knowledge of music theory while still maintaining the highest levels of creativity and flexibility that a trained musician would have. The fixed location methods of the present invention solves these problems while still allowing the user to maintain creative control.

These and other features of the present invention will be apparent to those of skill in the art from a review of the following detailed description, along with the accompanying drawings.

FIGS. **6*a* and 6*b*** together are a logic flow diagram of scale objects 'Set scale' service.

FIGS. **7*a*, 7*b*, 7*c*, and 7*d*** together are a logic flow diagram of chord inversion objects.

Figure 8:
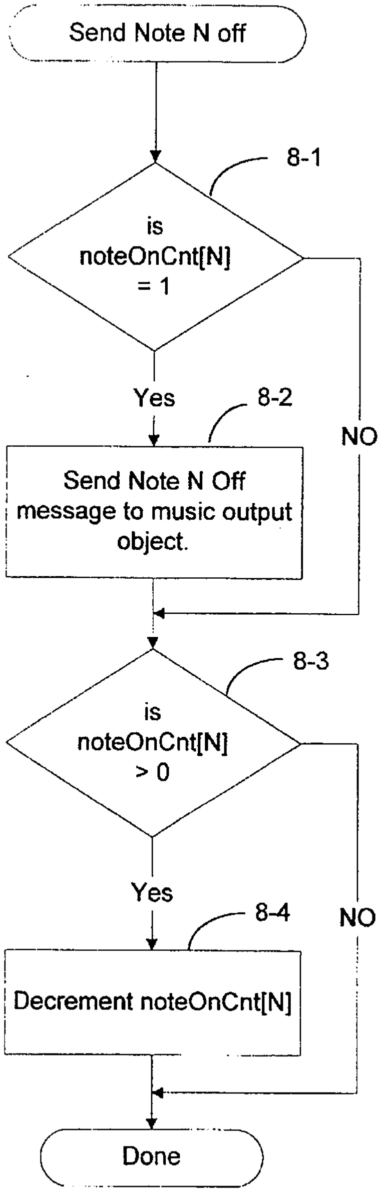

FIG. 8 is a logic flow diagram of channel output objects 'Send note off' service.

FIG. **9*a*** is a logic flow diagram of channel output objects 'Send note on' service.

FIG. **9*b*** is a logic flow diagram of channel output objects 'Send note on if off' service.

FIG. 10 is a logic flow diagram of PianoKey::Chord Progression Key objects 'Respond to key on' service.

Figure 11:
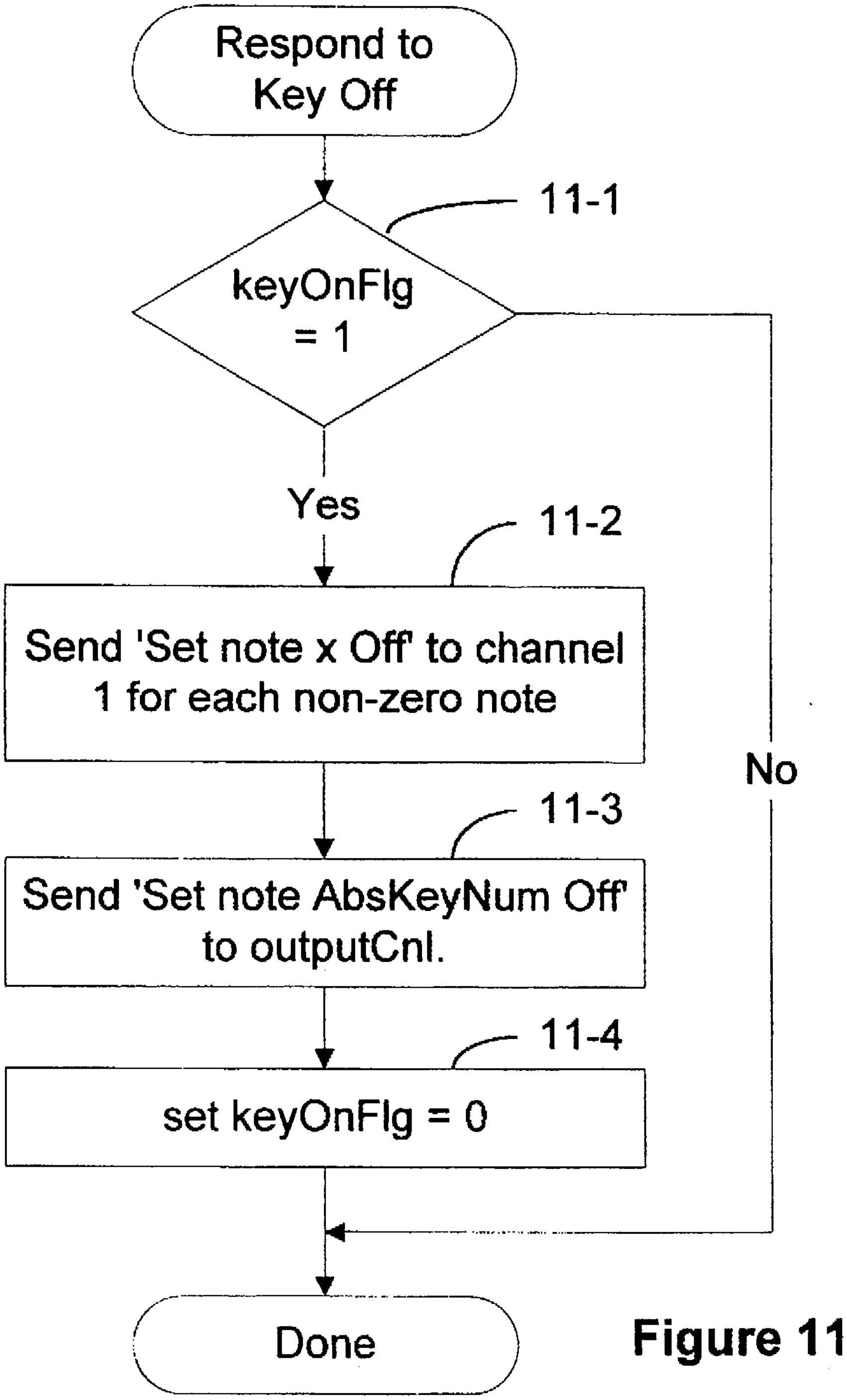

FIG. 11 is a logic flow diagram of PianoKey::Chord Progression Key objects 'Respond to key off' service.

FIGS. **12*a*, through 12*j*** together are a logic flow diagram of PianoKey::Melody Key objects 'Respond to key on' service.

FIG. **12*k*** is a logic flow diagram of PianoKey::Melody Key objects 'Respond to key off' service.

FIG. **13*a* through 13*f*** together are a logic flow diagram of the PianoKey::MelodyKey objects 'Respond To Key On' service.

FIGS. **14*a* through 14*d*** together are a logic flow diagram of Music Administrator objects 'Update' service.

DETAILED DESCRIPTION OF A PREFERRED EMBODIMENT

The present invention is primarily software based and the software is in large part a responsibility driven object oriented design. The software is a collection of collaborating software objects, where each object is responsible for a certain function.

Figure 1A:
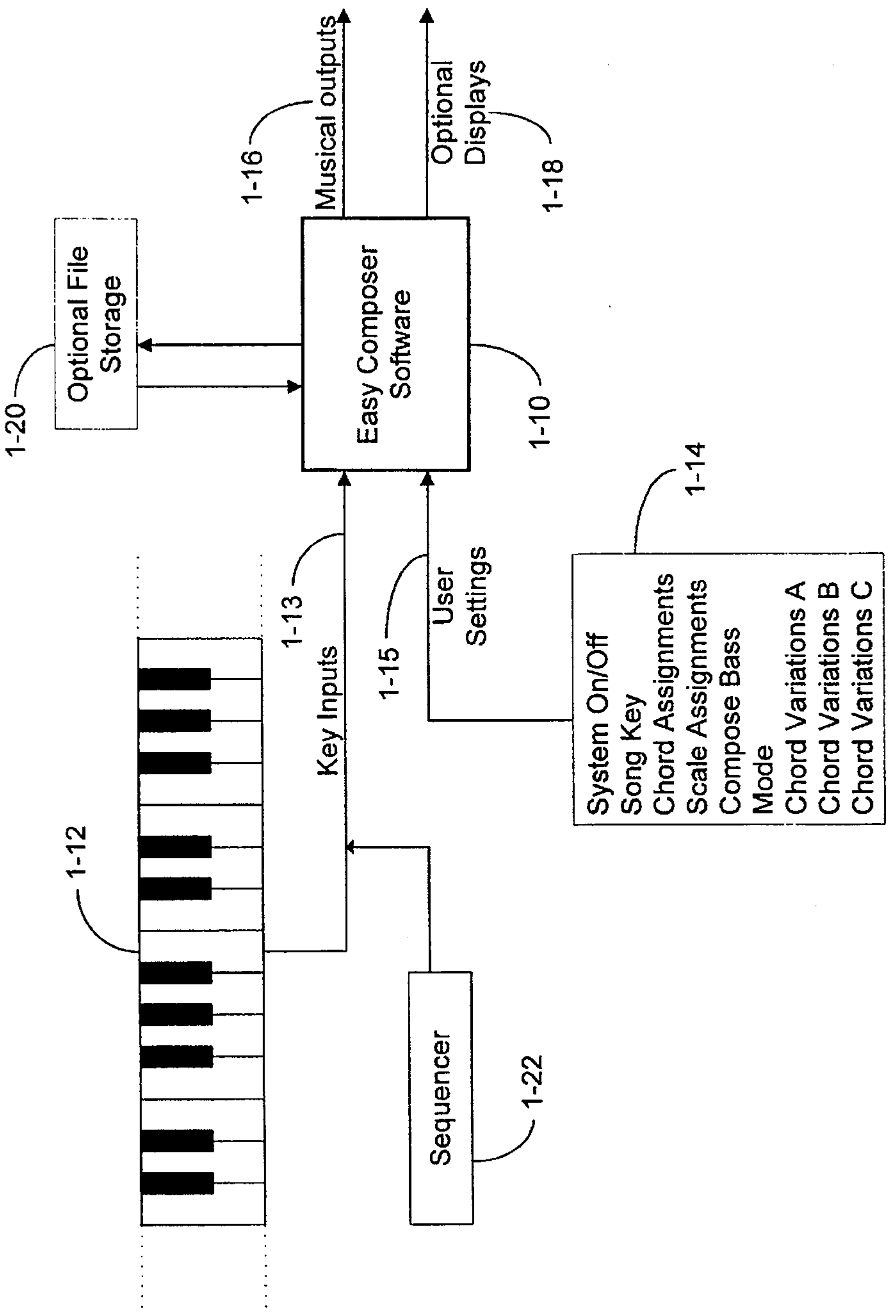
FIG. 1A is a schematic diagram of a composition and performance instrument of the present invention.
Figure 1B:
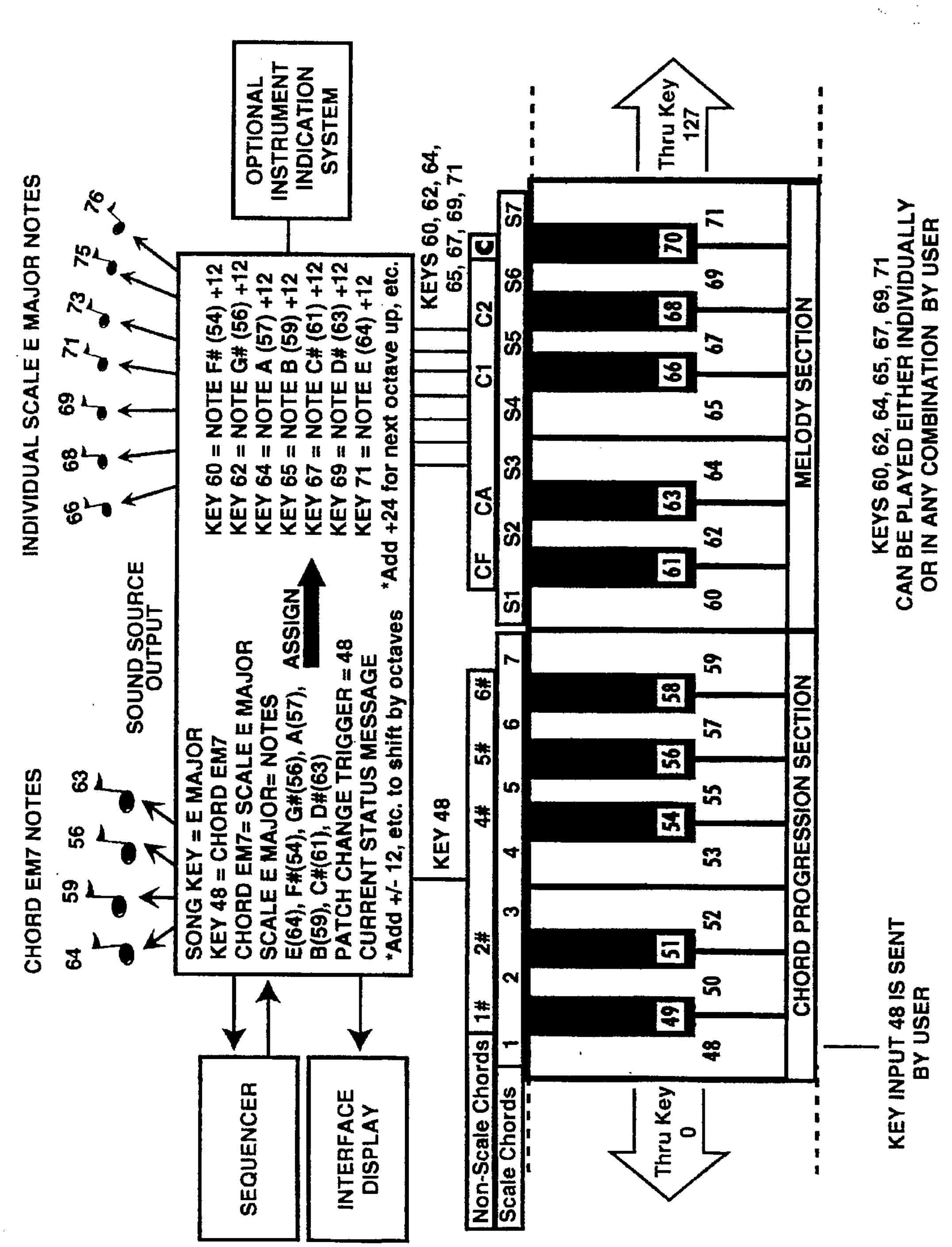
FIG. 1B is a general overview of the chord progression method and the fixed scale location method.
Figure 1C:
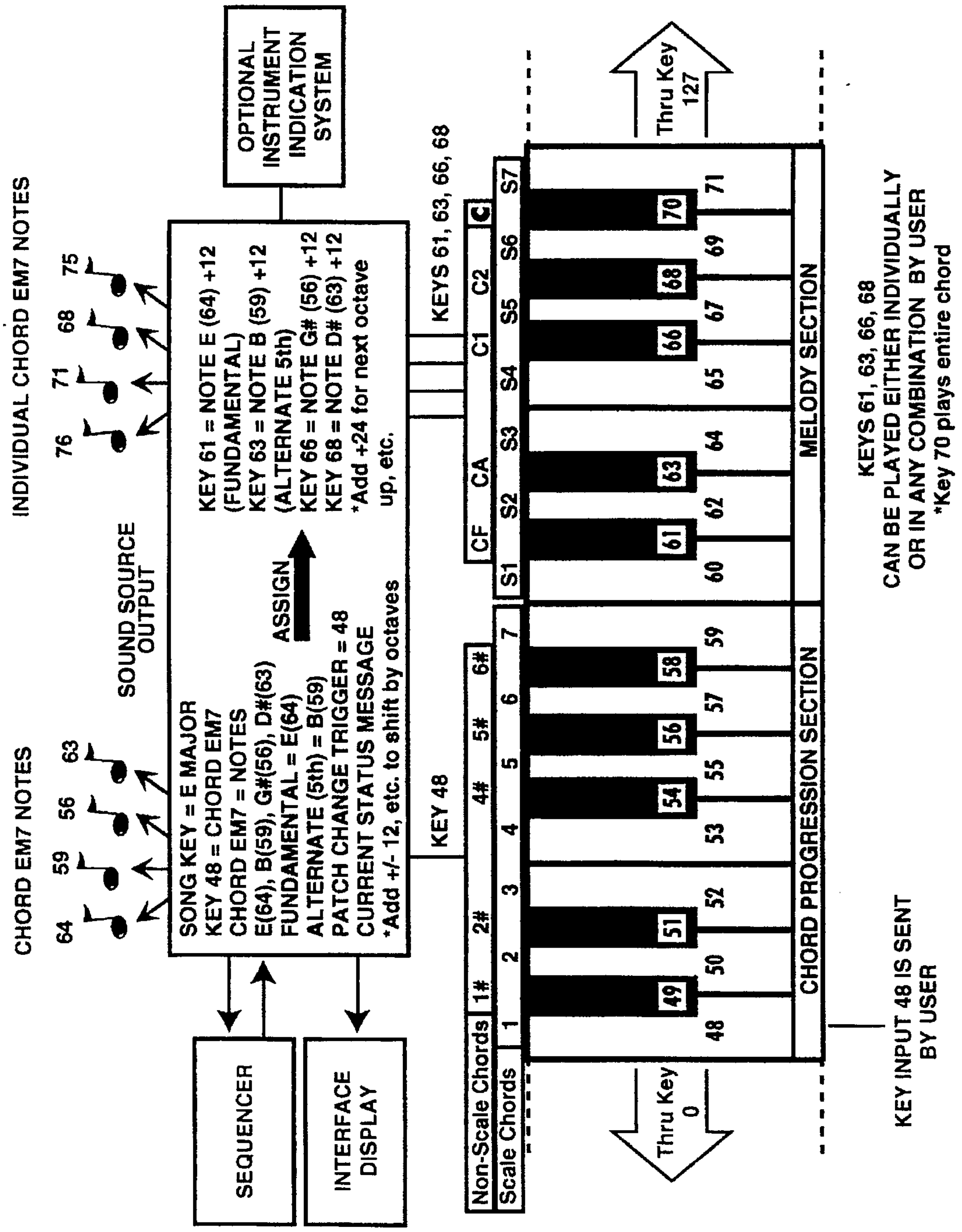
FIG. 1C is a general overview of the chord progression method and the fixed chord location method.
Figure 2:
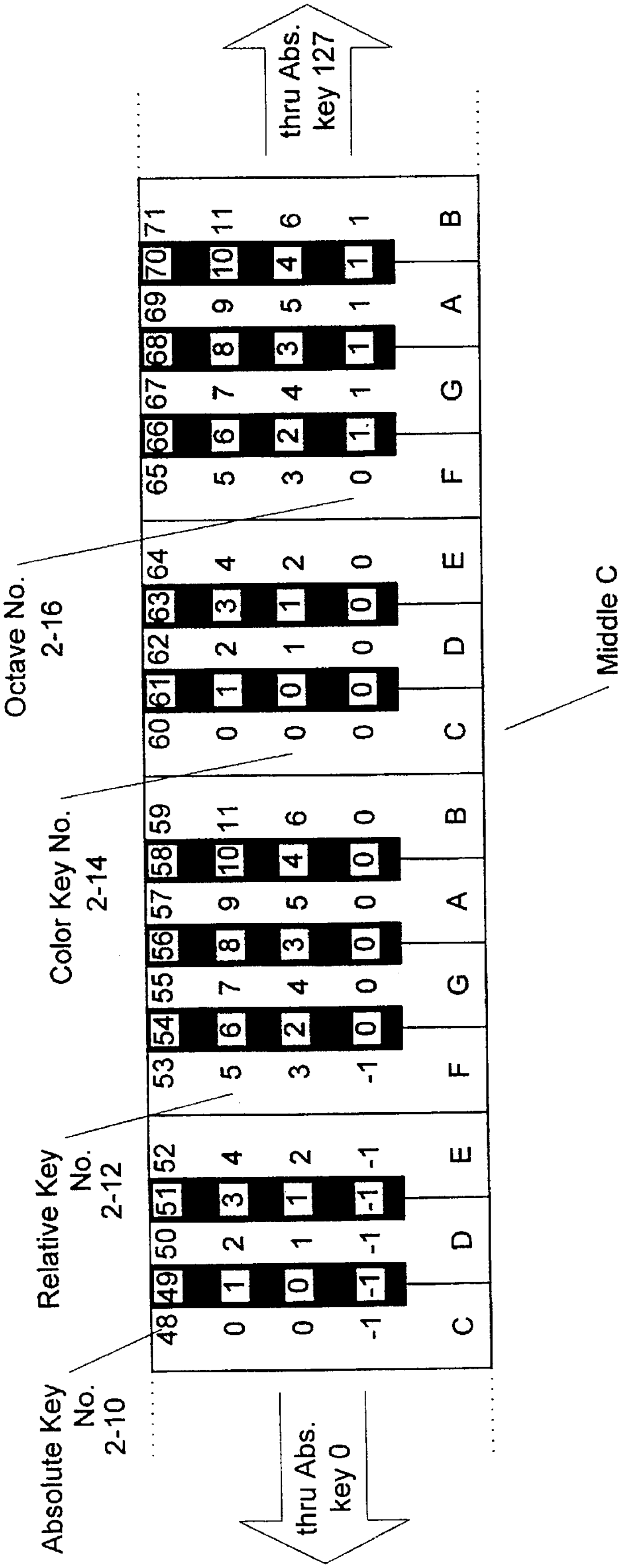
FIG. 2 is a detail drawing of a keyboard of the present invention defining key elements.
Figure 3:
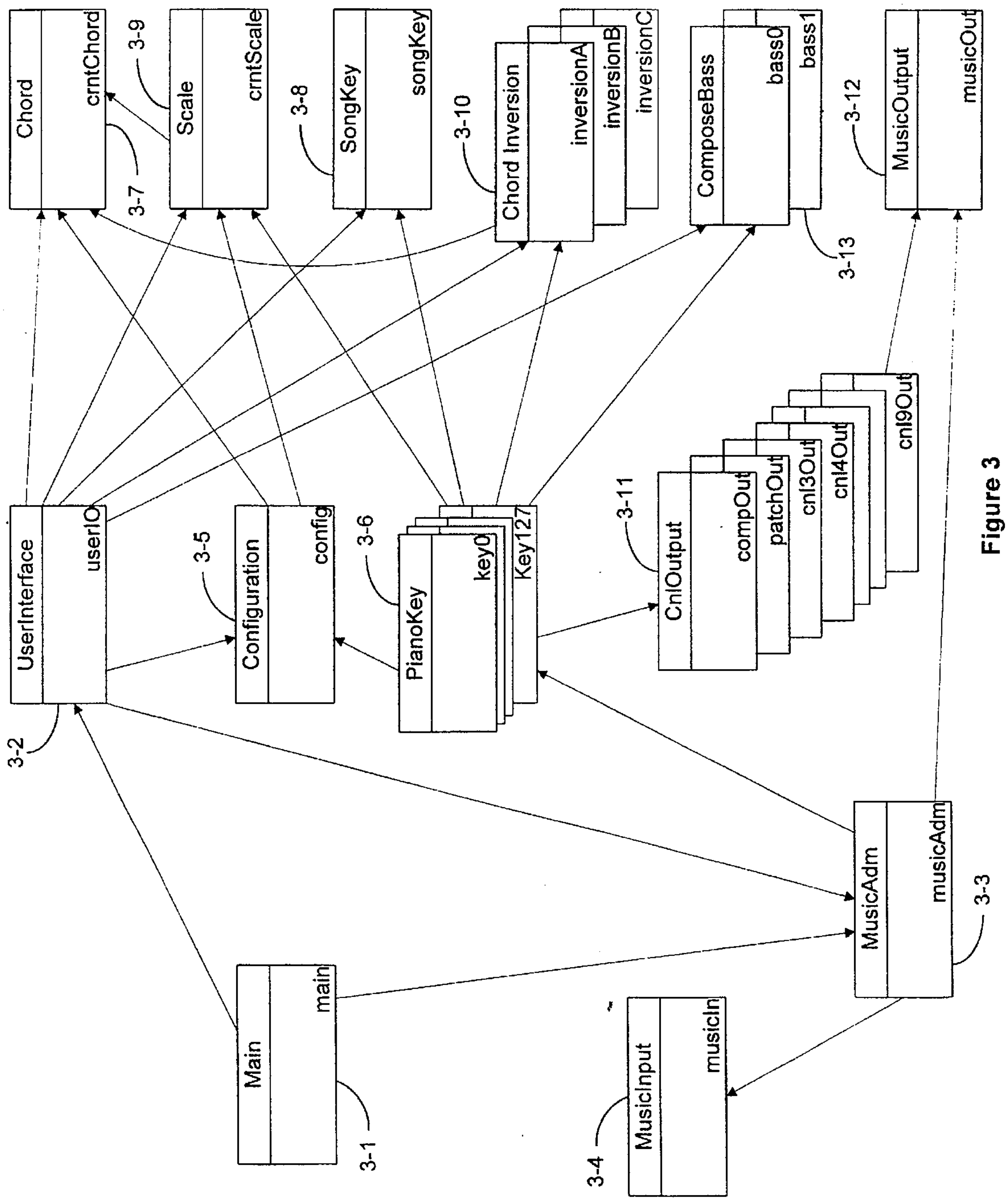
FIG. 3 is an overall logic flow block diagram of the system of the present invention.

For a more complete understanding of a preferred embodiment of the present invention, the following detailed description is divided to (1) show a context diagram of the software domain (FIG. 1); (2) describe the nature of the musical key inputs to the software (FIG. 2); (3) show a diagram of the major objects (FIG. 3); (3) identify the responsibility of each major object; (4) list and describe the attributes of each major object; (5) list and describe the services or methods of each object, including flow diagrams for those methods that are key contributors to the present invention; and (6) describe the collaboration between each of the main objects.

Referring first to FIG. 1, a computer 1-10 memory and processing elements in the usual manner. The computer 1-10 preferably has The Easy Composer program installed thereon. The Easy Composer program comprises an off-the shelf program, and provides computer assisted musical composition software. This program accepts inputs from a keyboard 1-12 or other user interface element and a user-selectable set of settings 1-14. The keyboard 1-12 develops a set of key inputs 1-13 and the settings 1-14 provides the user settings input group 1-15

It should be appreciated that the keyboard may comprise a standard style keyboard, or it may include a computer keyboard or other custom-made input device, as desired. For example, gloves are gaining in popularity as input devices for electronic instruments. The computer 1-10 sends outputs to musical outputs 1-16 for tone generation or other optional displays 1-18. The optional displays 1-18 provide the user with information which includes the present configuration, chords, scales and notes being played (output).

The Easy Composer Software in the computer 1-10 takes key inputs and translates them into musical note outputs. This software may exist separately from its inputs and outputs such as in a personal computer, or it may be incorporated within the same physical instrument as any one of its inputs or outputs or in combination with any or all of its inputs or outputs.

The User settings input group 1-14 contains settings and configurations specified by the user that influence the way the software interprets the Key inputs 1-13 and translates these into musical notes at the musical outputs 1-16. The user settings 1-15 may be input through a computer keyboard, push buttons, hand operated switches, foot operated switches, or any combination of such devices. Some or all of these settings may also be input from the Key inputs 1-13. The user settings 1-15 include a System on/off setting, a song key setting, chord assignments, scale assignments, and various modes of operation.

The key inputs 1-13 are the principle musical inputs to the Easy Composer software. The key inputs 1-13 contain musical chord requests, scale requests, melodic note requests, chord note requests and configuration requests and settings. These inputs are described in more detail in FIG. 2. The preferred source of the key inputs is a digital electronic (piano) keyboard that is readily available from numerous vendors. This provides the user with the most familiar and conventional way of inputting musical requests to the software. The Easy Composer software in the computer 1-10, however, may accept inputs 1-13 from other sources such as computer keyboards. A sequencer 1-22 or other device may simultaneously provide prerecorded input to the computer 1-10, allowing the user to add another "voice" to a composition.

The system may also include an optional non-volatile file storage device 1-20. The storage device 1-20 may be used to store and later retrieve the settings and configurations. This convenience allows the user to quickly and easily configure the system to a variety of different configurations. The storage device 1-20 may comprise a magnetic disk, tape, or other device commonly found on personal computers and other digital electronic devices.

The musical outputs 1-16 provide the main output of the system. The outputs 1-16 contain the notes that the user intends to be sounded (heard) as well as other information relating to how notes are sounded (loudness, etc.). In addition, other data such as configuration and key inputs 1-13 are encoded into the output stream to facilitate iteratively playing back and refining the results. The present invention does not actually generate any sounds, but rather sends notes to an instrument or device (such as a MIDI synthesizer) which generates the sound. MIDI is an acronym that stands for Musical Instrument Digital Interface, an international standard. Even though the preferred embodiment is described using the specifications of MIDI, any adequate protocol could be used to accomplish the same results.

FIG. 2 shows how the system parses key inputs 1-13. Only two octaves are shown in FIG. 2, but the pattern repeats for all other lower and higher octaves. Each key input 1-13 has a unique absolute key number 2-10, shown on the top row of numbers in FIG. 2. The present invention may use a MIDI keyboard and, in such a case, the absolute key numbers are the same as the MIDI note numbers as described in the MIDI specification. The absolute key number 2-10 (or note number), along with velocity, is input to the computer for manipulation by the software. The software assigns other identifying numbers to each key as shown in rows 2 through 4 in FIG. 2. The software assigns to each key a relative key number 2-12 as shown in row 2. This is the key number relative to a C chromatic scale and ranges from 0–11 for the 12 notes of the scale. For example, every 'F' key on the keyboard is identified with relative number 5. Each key is also assigned a color (black or white) key number 2-14. Each white key is numbered 0–6 (7 keys) and each black key is numbered 0–4 (5 keys). For example, every 'F' key is identified as color (white) key number 3 (the 4th white key) and every 'F#' as color (black) key number 2 (the 3rd black key). The color key number is also relative to the C scale. The 4th row shown on FIG. 2 is the octave number 2-16. This number identifies which octave on the keyboard a given key is in. The octave number 0 is assigned to absolute key numbers 54 through 65. Lower keys are assigned negative octave numbers and higher keys are assigned positive octave numbers. The logic flow description that follows will refer to all 4 key identifying numbers.

FIG. 3 is a block diagram of the structure of the software showing the major objects. Each object has its own memory for storing its variables or attributes. Each object provides a set of services or methods (subroutines) which are utilized by other objects. A particular service for a given object is invoked by sending a message to that object. This is tantamount to calling a given subroutine within that object. This concept of message sending is described in numerous text books on software engineering and is well known in the art. The lines with arrows in FIG. 3 represent the collaborations between the objects. The lines point from the caller to the receiver.

Each object forms a part of the software; the objects work together to achieve the desired result. Below, each of the objects will be described independent of the other objects. Those services which are key to the present invention will include flow diagrams.

Figure 4:
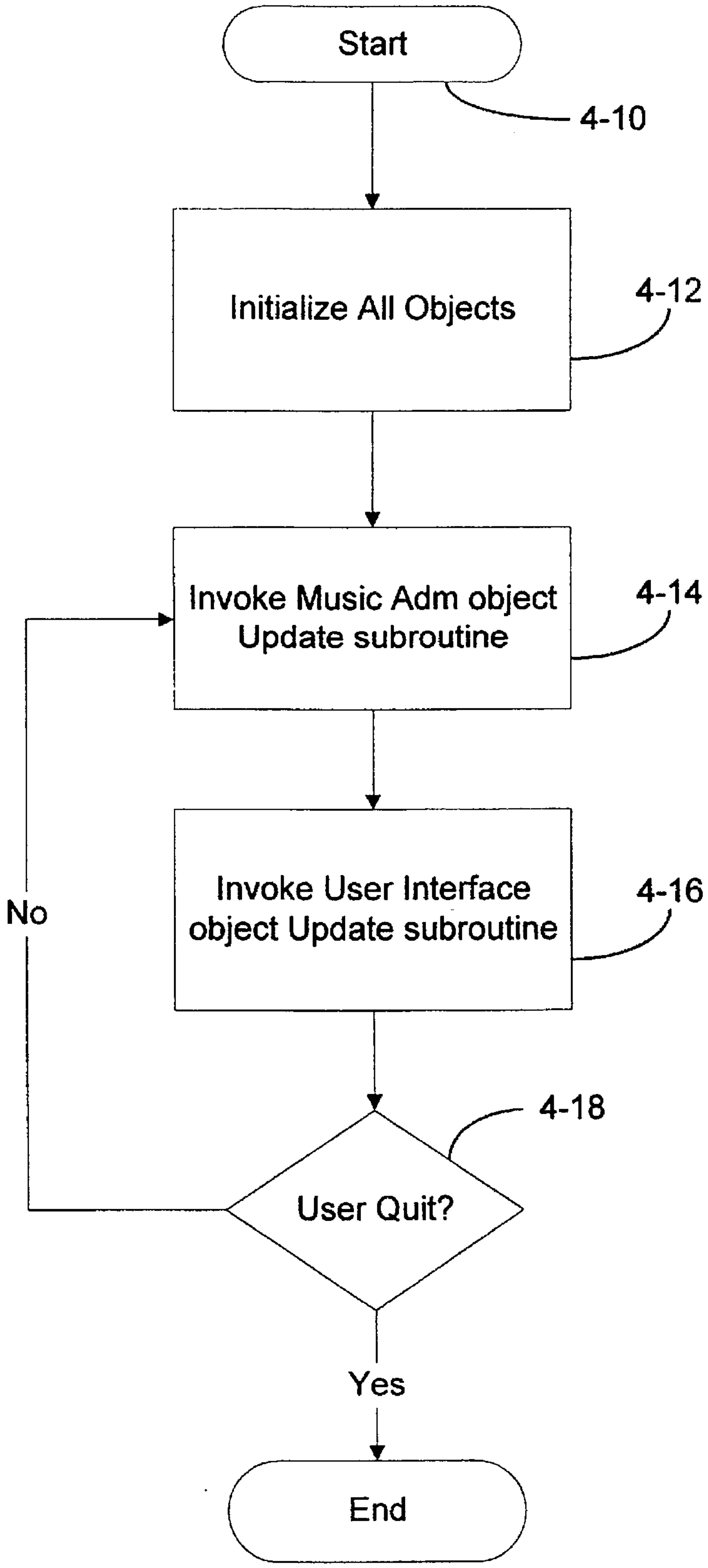
FIG. 4 is a high level logic flow diagram of the system.

The Main block 3-1 is the main or outermost software loop. The Main block 3-1 repeatedly invokes services of other objects. FIG. 4 depicts the logic flow for the Main object 3-1. It starts in step 4-10 and then invokes the initialization service of every object in step 4-12. Steps 4-14 and 4-16 then repeatedly invoke the update services of a Music Administrator object 3-3 and a User Interface object 3-2. The objects 3-3 and 3-2 in turn invoke the services of other objects in response to key (music) inputs 1-13 and user interface inputs. The user interface object 3-2 in step 4-18 determines whether or not the user wants to terminate the program.

Thus, the Main Object 3-1 calls the objects 3-3 and 3-2 to direct the overall action of the system and the lower level action of the dependent objects will now be developed.

TABLES 1 AND 2

Among other duties, the User Interface object 3-2 calls up a song key object 3-8. The object 3-8 contains the one current song key and provides services for determining the chord fundamental for each key in the chord progression section. The song key is stored in the attribute songKey and is initialized to C (See Table 2 for a list of song keys). The attribute circleStart (Table 1) holds the starting point (fundamental for relative key number 0) in the circle of 5ths or 4ths. The Get Key and Set Key services return and set the songKey attribute, respectively. The service 'SetMode( )' sets the mode attribute. The service SetCircle Start( ) sets the circle Start attribute.

When mode=normal, the 'Get-Chord Fundamental for relative key number Y' determines the chord fundamental note from Table 2. The relative key number Y is added to the current song key. If this sum is greater than 11, then 11 is subtracted from the sum. The sum becomes the index into Table 2 where the chord fundamental note is located and returned.

The chord fundamentals are stored in Table 2 in such a way as to put the scale chords on the white keys (index values of 0, 2, 4, 5, 7, 9, and 11) and the non-scale chords on the black keys (index values 1, 3, 6, 8, and 10). This is also the preferred method for storing the fundamental for the minor song keys. Sending the message 'Get chord fundamental for relative key number Y' to the song key object calls a function or subroutine within the song key object that takes the relative key number as a parameter and returns the chord fundamental. When mode=circle5 or circle4, the relative key number Y is added to circleStart and the fundamental is found in Table 2 in circle of 5th and circle of 4th rows respectively. The service 'GetSongKeyLable( )' returns the key label for use by the user interface.

The service 'GetIndicationForKey(relativeKeyNumber)' is provided as an added feature to the preferred 'fixed location' method which assigns the first chord of the song key to the first key, the 2nd chord of the song key to the 2nd key etc. As an added feature, instead of reassigning the keys, the chords may be indicated on a computer monitor or above the appropriate keys using an alphanumeric display. This indicates to the user where the first chord of the song key is, where the 2nd chord is etc. The service 'GetIndicationForKey(relativeKeyNumber)' returns the alpha-numeric indication that would be displayed. The indicators are in Table 2 in the row labeled 'Chord Indications'. The song key object locates the correct indicator by subtracting the song key from the relative key number. If the difference is less than 0, then 12 is added. This number becomes the table index where the chord indication is found. For example, if the song key is E MAJOR, the service GetIndicationForKey(4) returns indication '1' since 4 (relative key) 4 (song key)=0 (table index). GetIndicationForKey(11) returns '5' since 11 (relative key) —4 (song Key)=7 (table index) and GetIndicationForKey(3) returns '7' since 3(relative key)—4(song key) 12=11 (table index). If the indication system is used, then the user interface object requests the chord indications for each of the 11 keys each time the song key changed.The chord indication and the key labels can be used together to indicate the chord name as well (D, F#, etc.)

TABLE 1

| SongKey Object Attributes and Services |
|---|
| attributes: |
| 1. songKey |
| 2. mode |
| 3. circleStart |
| Services: |
| 1. SetSongKey(newSongKey); |
| 2. GetSongKey(); songKey |
| 3. GetChordFundamental(relativeKeyNumber): fundamental |
| 4. GetSongKeyLabel(); textLabel |
| 5. GetIndicationForKey(relativeKeyNumber); indication |
| 6. SetMode(newMode); |
| 7. setCircleStart(newStart) |

TABLE 2

Song key and Chord Fundamental

| Table Index | 0 | 1 | 2 | 3 | 4 | 5 | 6 | 7 | 8 | 9 | 10 | 11 |
|---|---|---|---|---|---|---|---|---|---|---|---|---|
| Song Key | C | C♯ | D | D♯ | E | F | F♯ | G | G♯ | A | A♯ | B |
| Song Key attribute | 0 | 1 | 2 | 3 | 4 | 5 | 6 | 7 | 8 | 9 | 10 | 11 |
| Chord Fundamental | 60 | 61 | 62 | 63 | 64 | 65 | 54 | 55 | 56 | 57 | 58 | 59 |
| Circle of 5ths | C (60) | G (55) | D (62) | A (57) | E (64) | B (59) | F♯ (54) | C♯ (61) | G♯ (56) | D♯ (63) | A♯ (58) | F (65) |
| Circle of 4ths | C (60) | F (65) | [A♯] B♭ (58) | [D♯] E♭ (63) | [G♯] A♭ (56) | [C♯] D♭ (61) | [F♯] G♭ (54) | B (59) | E (64) | A (57) | D (62) | G (55) |
| Key Label | C | C♯ | D | D♯ | E | F | F♯ | G | G♯ | A | A♯ | B |
| Chord indication | '1' | '1♯' | '2' | '2♯' | '3' | '4' | '4♯' | '5' | '5♯' | '6' | '6♯ | '7' |
| Relative minor | '3' | '3♯ | '4' | '4♯' | '5' | '6' | '6♯' | '7' | '7♯' | '1' | '1♯' | '2' |

For example, if the current song key is D Major, then the current song key value is 2. If a message is received requesting the chord fundamental note for relative key number 5, then the song key object returns 55, which is the chord fundamental note for the 7th (2+5) entry in Table 2. This means that in the song key of D, an F piano key should play a G chord, but how the returned chord fundamental is used is entirely up to the object receiving the information. The song key object (3-8) does its part by providing the services shown.

FIG. 5 AND TABLES 3 AND 4

There is one current chord object 3-7. Table 3 shows the attributes and services of the chord object which include the current chord type and the four notes of the current chord. The current chord object provides nine services.

The 'GetChord( )' service returns the current chord type (major, minor, etc.) and chord fundamental note. The 'CopyNotes( )' service copies the notes of the chord to a destination specified by the caller. Table 4 shows the possible chord types and the chord formulae used in generating chords. The current chord type is represented by the index in Table 4. For example, if the current chord type is =6, then the current chord type is a suspended 2nd chord.

Figure 5:
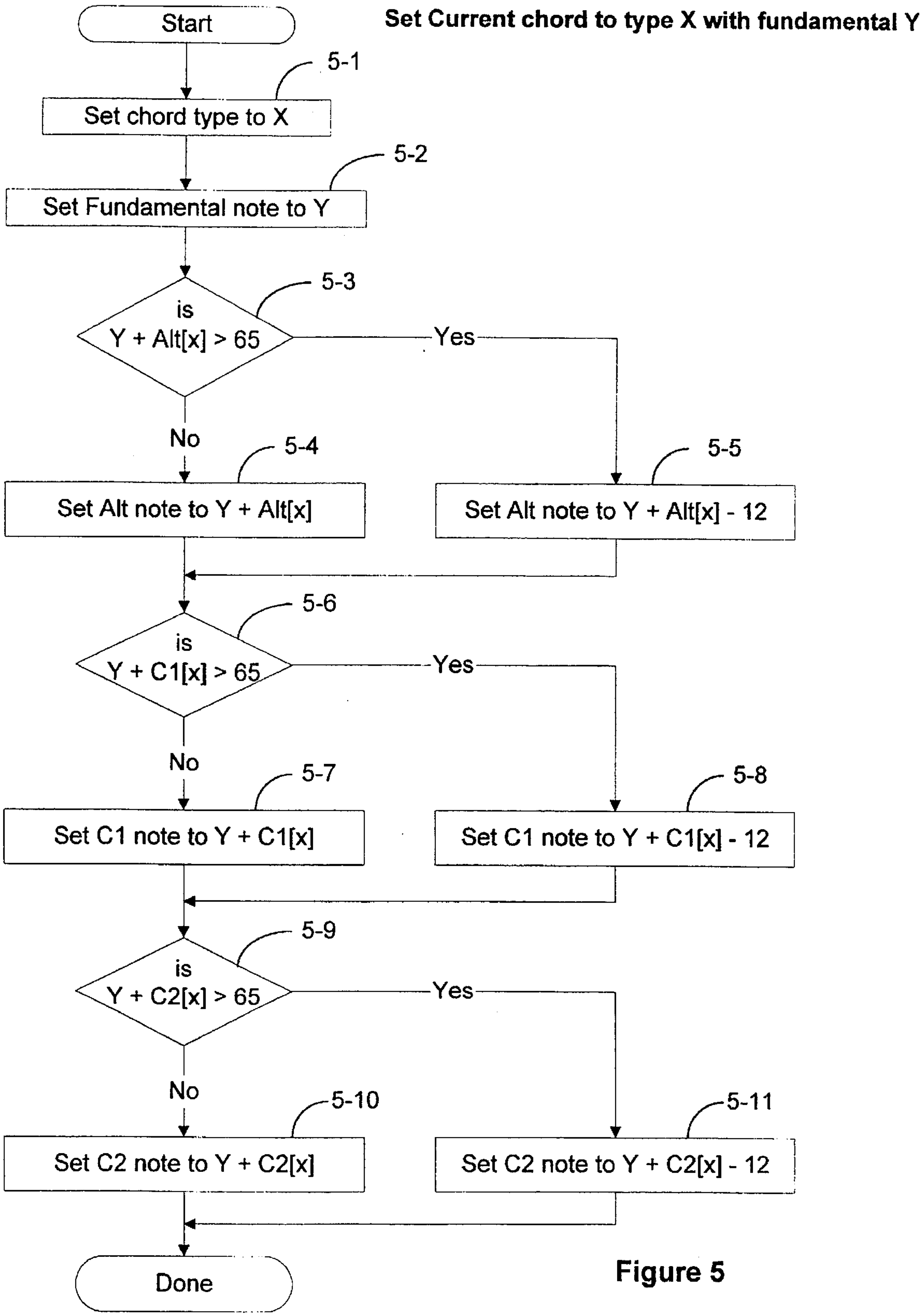
FIG. 5 is a logic flow diagram of chord objects 'Set Chord' service.

FIG. 5 shows a flow diagram for the service that generates and sets the current chord. Referring to FIG. 5, this service first sets the chord type to the requested type X in step 5-1. The fundamental note Y is then stored in step 5-2. Generally, all the notes of the current chord will be contained in octave number 0 which includes absolute note numbers 54 through 65 (FIG. 2). Y will always be in this range. The remaining three notes, the Alt note, C1 note, and C2 note of the chord are then generated by adding an offset to the fundamental note. The offset for each of these note is found in Table 4 under the columns labeled Alt, C1 and C2. Four notes are always generated. In the case where a chord has only three notes, the C2 note will be a duplicate of the C1 note.

Referring back to FIG. 5, step 5-3 determines if the sum of the fundamental note and the offset for the All note (designated Alt[x]) is less than or equal to 65 (5-3). If so, then the Alt note is set to the sum of the fundamental note plus the offset for the Alt note in step 5-4. If the sum of the fundamental note and the offset for the Alt note is greater than 65, then the Alt note is set to the sum of the fundamental note plus the offset of the Alt note minus 12 in step 5-5. Subtracting 12 yields the same note one octave lower.

Similarly, the C1 and C2 notes are generated in steps 5-6 through 5-11. For example, if this service is called requesting to set the current chord to type D Major (X=0, Y=62), then the current chord type will be equal to 0, the fundamental note will be 62 (D), the Alt note will be 57 (A, 62+7−12), the C1 note will be 54 (F#, 62+4−12) and the C2 note also be 54 (F#, 62+4−12). New chords may also be added simply by extending Table 4, including chords with more than 4 notes. Also, the current chord object can be configured so that the C1 note is always the 3rd note of the chord. A mode may be included where the 5th(ALT) is omitted from any chord simply by adding an attribute such as 'drop5th' and adding a service for setting 'drop5th' to be true or false and modifying the SetChordTo( ) service to ignore the ALT in Table 4 when 'drop5th' is true.

The service 'isNoteInChord(noteNumber)' will scan chordNote[] for noteNumber. If noteNumber is found it will return True (1). If it is not found, it will return False (0).

The remaining services return a specific chord note (fundamental, alternate, etc.) or the chord label.

TABLE 3

| Chord Object Attributes and Services |
|---|
| Attributes: |
| 1. chordType |
| 2. chordNote (4) |
| Services: |
| 1. SetChordTo(ChordType, Fundamental); |
| 2. GetChordType(); chordType |
| 3. CopyChordNotes(destination); |
| 4. GetFundamental(); chordNote[0] |
| 5. GetAlt(); chordNote[1] |
| 6. GetC1(); chordNote[2] |
| 7. GetC2(); chordNote[3] |
| 8. GetChordLabel(); textLabel |
| 9. isNoteInChord(noteNumber); True/False |

TABLE 4

Chord Note Generation

| Index | Type | Fund | Alt | C1 | C2 | Label |
|---|---|---|---|---|---|---|
| 0 | Major | 0 | 7 | 4 | 4 | "" |
| 1 | Major seven | 0 | 7 | 4 | 11 | "M7" |
| 2 | minor | 0 | 7 | 3 | 3 | "m" |
| 3 | minor seven | 0 | 7 | 3 | 10 | "m7" |
| 4 | seven | 0 | 7 | 4 | 10 | "7" |
| 5 | six | 0 | 7 | 4 | 9 | "6" |
| 6 | suspended 2nd | 0 | 7 | 2 | 2 | "sus2" |
| 7 | suspended 4th | 0 | 7 | 5 | 5 | "sus4" |
| 8 | Major 7 diminished 5th | 0 | 6 | 4 | 11 | "M7(−5)" |
| 9 | minor six | 0 | 7 | 3 | 9 | "m6" |
| 10 | minor 7 diminished 5th | 0 | 6 | 3 | 10 | "m7(−5)" |
| 11 | minor Major 7 | 0 | 7 | 3 | 11 | "m(M7)" |
| 12 | seven diminished 5 | 0 | 6 | 4 | 10 | "7(−5)" |
| 13 | seven augmented 5 | 0 | 8 | 4 | 10 | "7(+5)" |
| 14 | augmented | 0 | 8 | 4 | 4 | "aug" |
| 15 | diminished | 0 | 6 | 3 | 3 | "dim" |
| 16 | diminished 7 | 0 | 6 | 3 | 9 | "dim7" |

FIGS. *6a* AND *6b* AND TABLES 5, 6a, 6b, AND 7

As shown in FIG. 3, there is one Current Scale object 3-9. This object is responsible for generating the notes of the current scale. It also generates the notes of the current scale with the notes common to the current chord removed. It also provides the remaining notes that are not contained in the current scale or the current chord.

Referring to Table 5, the attributes of the current scale include the scale type (Major, pentatonic, etc.), the root note and all other notes in three scales. The scaleNote[7] attribute contains the normal notes of the current scale. The remainScaleNote[7] attributes contains the normal notes of the current scale less the notes contained in the current chord. The remainNonScaleNote[7] attribute contains all remaining notes (of the 12 note chromatic scale) that are not in the current scale or the current chord. The combinedScaleNote[11] attribute combines the normal notes of the current scale (scaleNote[]) with all notes of the current chord that are not in the current scale (if any).

Each note attribute (. . . Note[]) contains two fields, a note number and a note indication (text label). The note number field is simply the value (MIDI note number) of the note to be sounded. The note indication field is provided in the event that an alpha numeric, LED (light emitting diode) or other indication system is available. It may provide a useful indication on a computer monitor as well. This 'indication' system indicates to the user where certain notes of the scale appear on the keyboard. The indications provided for each note include the note name, (A, B, C#, etc.), and note position in the scale (indicated by the numbers 1 through 7). Also, certain notes have additional indications. The root note is indicated with the letter 'R', the fundamental of the current chord is indicated by the letter 'F', the alternate of the current chord is indicated by the letter 'A', and the C1 and C2 notes of the current chord by the letters 'C1' and 'C2', respectively. All non-scale notes (notes not contained in scaleNote[]) have a blank ('') scale position indication. Unless otherwise stated, references to the note attributes refer to the note number field.

Figure 6A:
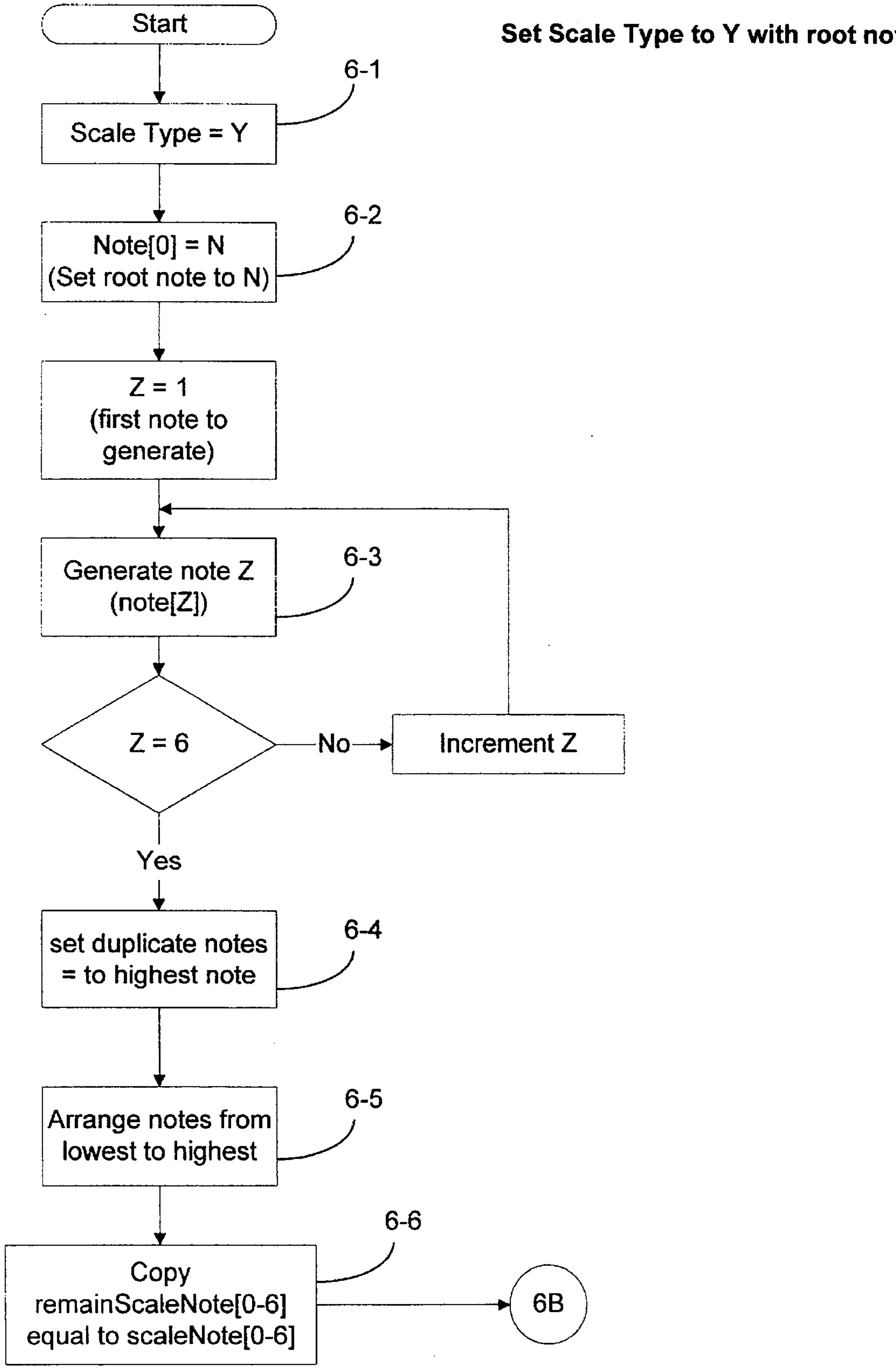
Figure 6B:
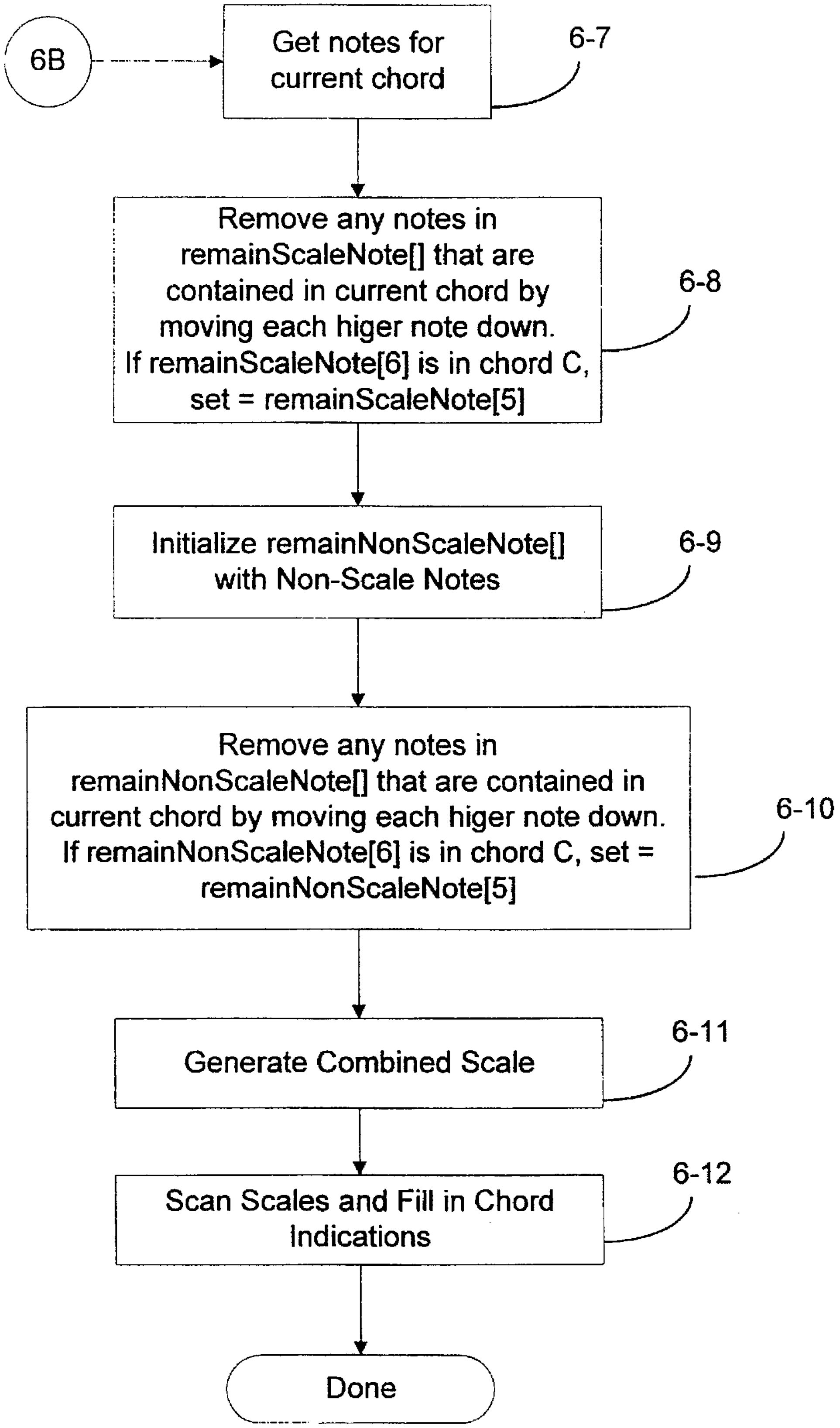

The object provides twelve main services. FIGS. 6a and 6b show a flow diagram for the service that sets the scale type. This service is invoked by sending the message 'Set scale type to Y with root note N' to the scale object. First, the scale type is saved in step 6-1. Next, the root or first note of the scale, designated note[0], is set to N in step 6-2. The remaining notes of the scale are generated in step 6-3 by adding an offset for each note to the root note. The offsets are shown for each scale type in Table 6a. As with the current chord object, all the scale notes will be in octave 0 (FIG. 2). As each note is generated in step 6-3, if the sum of the root note and the offset is greater than 65, then 12, or one octave, is subtracted, forcing the note to be between 54 and 65. As shown in Table 6a, some scales have duplicate offsets. This is because not all scales have 7 different notes. By subtracting 12 from some notes to keep them in octave 0, it is possible that the duplicated notes will not be the highest note of the resulting scale. Note that the value of 'Z' (step 6-3) becomes the position (in the scale) indication for each note, except that duplicate notes will have duplicate position indications.

Step 6-4 then forces the duplicate notes (if any) to be the highest resulting note of the current scale. It is also possible that the generated notes may not be in order from lowest to highest.

Step 6-5, in generating the current scale, rearranges the notes from lowest to highest. As an example, Table 7 shows the values of each attribute of the current scale after each step 6-1 through 6-5 shown in FIG. 6 when the scale is set to C Major Pentatonic. Next, the remaining scales notes are generated in step 6-6. This is done by first copying the normal scale notes to remainScaleNote[] array. Next, the notes of the current chord are fetched from the current chord object in step 6-7.

Then, step 6-8 removes those notes in the scale that are duplicated in the chord. This is done by shifting the scale notes down, replacing the chord note. For example, if remainScaleNote[2] is found in the current chord, then remainScaleNote[2] is set to remainScaleNote[3], remainScaleNote[3] is set to remainScaleNote[4], etc. (remainScaleNote[6] is unchanged). This process is repeated for each note in remainScaleNote[] until all the chord notes have been removed. If remainScaleNote[6] is in the current chord, it will be set equal to remainScaleNote[5]. Thus, the remainScaleNote[] array contains the notes of the scale less the notes of the current chord, arranged from highest to lowest (with possible duplicate notes as the higher notes).

Finally, the remaining non-scale notes (remainNonScaleNote[]) are generated. This is done in a manner similar to the remaining scale notes. First, remainNonScaleNote[] array is filled with all the non-scale notes as determined in step 6-9 from Table 6b in the same manner as the scale notes were determined from Table 6a. The chord notes (if any) are then removed in step 6-10 in the same manner as for remainScaleNotes[]. The combineScaleNote[] attribute is generated in step 6-11. This is done by taking the scaleNote[] attribute and adding any note in the current chord (fundamental, alternate, C1, or C2) that is not already in scaleNote[] (if any). The added notes are inserted in a manner that preserves scale order (lowest to highest).

The additional indications (Fundamental, Alternate, C1 and C2) are then filled in step 6-12. The GetScaleType( ) service returns the scale type. The service GetScaleNote(n) returns the nth note of the normal scale. Similarly, services GetRemainScaleNote(n) and GetRemainNonScaleNote(n) return the nth note of the remaining scale notes and the remaining non-scale notes respectively. The services, 'GetScaleNoteIndication' and 'GetCombinedNoteIndication', return the indication field of the scaleNote[] and combinedScaleNote[] attribute respectively. The service 'GetScaleLabel' returns the scale label (such as 'C MAJOR' or 'f minor').

The service 'GetScaleThirdBelow(noteNumber)' returns the scale note that is the third scale note below noteNumber. The scale is scanned from scaleNote[0] through scaleNote [6] until noteNumber is found. If it is not found, then combinedScaleNote[] is scanned. If it is still not found, the original note Number is returned (it should always be found as all notes of interest will be either a scale note or a chord note). When found, the note two positions before (where noteNumber was found) is returned as scaleThird. The 2nd position before a given position is determined in a circular fashion, i.e., the position before the first position (scaleNote [0] or combinedScaleNote[0] is the last position (scaleNote [6] or combinedScaleNote[10]. Also, positions with a duplicate of the next lower position are not counted. I.e., if scaleNote[6] is a duplicate of scaleNote[5] and scaleNote[5] is not a duplicate of scaleNote[4], then the position before scaleNote[0] is scaleNote[5]. If scaleThird is higher than noteNumber, it is lowered by one octave (=scaleThird−12) before it is returned. The service 'GetBlockNote(nthNote, noteNumber)' returns the nthNote chord note in the combined scale that is less (lower) than noteNumber. If there is no chord note less than noteNumber, 0 is returned.

The services 'isNoteInScale(noteNumber)' and 'isNoteInCombinedScale(noteNumber)' will scan the scale Note[] and combinedScaleNote[] arrays respectively for noteNumber. If noteNumber is found it will return True (1). If it is not found, it will return False (0).

A configuration object 3-5 collaborates with the scale object 3-9 by calling the SetScaleTo service each time a new chord/scale is required. This object 3-9 collaborates with a current chord object 3-7 to determine the notes in the current chord (CopyNotes service). The PianoKey objects 3-6 collaborate with this object by calling the appropriate GetNote service (normal, remaining scale, or remaining non-scale) to get the note(s) to be sounded. If an indication system is used, the user interface object 3-2 calls the appropriate indication service ('Get . . . NoteIndication( )') and outputs the results to the alphanumeric display, LED display, or computer monitor.

The present invention has eighteen different scale types (index 0–17), as shown in Table 6a. Additional scale types can be added simply by extending Tables 6a and 6b.

The present invention may also derive one or a combination of 2nds, 4ths, 5ths, 6ths, etc. and raise or lower these derived notes by one or more octaves to produce scalic harmonies.

TABLE 5

Scale Object Attributes and Services

Attributes:

1. scaleType
2. rootNote
3. scaleNote[7]
4. remainScaleNote[7]
5. remainNonScaleNote[7]
6. combinedScaleNote[11]

Services:

1. SetScaleTo(scaleType, rootNote);
2. GetScaleType(); scaleType
3. GetScaleNote(noteNumber); scaleNote[noteNumber]
4. GetRemainScaleNote(noteNumber); remainScaleNote[noteNumber]
5. GetRemainNonScaleNote(noteNumber); remainNonScaleNote [noteNumber]
6. GetScaleThirdBelow(noteNumber); scale Third
7. GetBlockNote(nthNote, noteNumber); combinedScaleNote[derivedValue]
8. GetScaleLabel(); textLabel
9. GetScaleNoteIndication(noteNumber); indication
10. GetCombinedScaleNoteIndication(noteNumber); indication
11. isNoteInScale(noteNumber); True/False
12. isNoteInCombinedScale(noteNumber); True/False TABLE 6a Normal Scale Note Generation

| Index | Scale type and label | 2nd note offset | 3rd note offset | 4th note offset | 5th note offset | 6th note offset | 7th note offset |
|---|---|---|---|---|---|---|---|
| 0 | minor | 2 | 3 | 5 | 7 | 8 | 10 |
| 1 | MAJOR | 2 | 4 | 5 | 7 | 9 | 11 |
| 2 | MAJ. PENT. | 2 | 4 | 7 | 9 | 9 | 9 |
| 3 | min.pent. | 3 | 5 | 7 | 10 | 10 | 10 |
| 4 | LYDIAN | 2 | 4 | 6 | 7 | 9 | 11 |
| 5 | DORIAN | 2 | 3 | 5 | 7 | 9 | 10 |
| 6 | AEOLIAN | 2 | 3 | 5 | 7 | 8 | 10 |
| 7 | MIXOLYDIAN | 2 | 4 | 5 | 7 | 9 | 10 |
| 8 | MAJ.PENT +4 | 2 | 4 | 5 | 7 | 9 | 9 |
| 9 | LOCRIAN | 1 | 3 | 5 | 6 | 8 | 10 |
| 10 | mel.minor | 2 | 3 | 5 | 7 | 9 | 11 |
| 11 | WHOLETONE | 2 | 4 | 6 | 8 | 10 | 10 |
| 12 | DIM.WHOLE | 1 | 3 | 4 | 6 | 8 | 10 |
| 13 | HALF/WHOLE | 1 | 3 | 4 | 7 | 9 | 10 |
| 14 | WHOLE/HALF | 2 | 3 | 5 | 8 | 9 | 11 |
| 15 | BLUES | 3 | 5 | 6 | 7 | 10 | 10 |
| 16 | harm.minor | 2 | 3 | 5 | 7 | 8 | 11 |
| 17 | PHRYGIAN | 1 | 3 | 5 | 7 | 8 | 10 |

TABLE 6b

Non-Scale Note Generation

| Index | Scale type and label | 1st note offset | 2nd note offset | 3rd note offset | 4th note offset | 5th note offset | 6th note offset | 7th note offset |
|---|---|---|---|---|---|---|---|---|
| 0 | Minor | 1 | 4 | 6 | 9 | 11 | 11 | 11 |
| 1 | MAJOR | 1 | 3 | 6 | 8 | 10 | 10 | 10 |
| 2 | MAJ. PENT. | 1 | 3 | 5 | 6 | 8 | 10 | 11 |
| 3 | min.pent. | 1 | 2 | 4 | 6 | 8 | 9 | 11 |
| 4 | LYDIAN | 1 | 3 | 5 | 8 | 10 | 10 | 10 |
| 5 | DORIAN | I | 4 | 6 | 8 | 11 | 11 | 11 |
| 6 | AEOLIAN | 1 | 4 | 6 | 9 | 11 | 11 | 11 |
| 7 | MIXOLYDIAN | 1 | 3 | 6 | 8 | 11 | 11 | 11 |
| 8 | MAJ.PENT +4 | 1 | 3 | 6 | 8 | 10 | 11 | 11 |
| 9 | LOCRIAN | 2 | 4 | 7 | 9 | 11 | 11 | 11 |
| 10 | mel.minor | 1 | 4 | 6 | 8 | 10 | 10 | 10 |
| 11 | WHOLETONE | 1 | 3 | 5 | 7 | 9 | 11 | 11 |

TABLE 6b-continued

Non-Scale Note Generation

| Index | Scale type and label | 1st note offset | 2nd note offset | 3rd note offset | 4th note offset | 5th note offset | 6th note offset | 7th note offset |
|---|---|---|---|---|---|---|---|---|
| 12 | DIM.WHOLE | 2 | 5 | 7 | 9 | 11 | 11 | 11 |
| 13 | HALF/WHOLE | 2 | 5 | 6 | 8 | 11 | 11 | 11 |
| 14 | WHOLE/HALF | 1 | 4 | 6 | 7 | 10 | 10 | 10 |
| 15 | BLUES | 1 | 2 | 4 | 8 | 9 | 11 | 11 |
| 16 | harm.minor | 1 | 4 | 6 | 9 | 10 | 10 | 10 |
| 17 | PHRYGIAN | 2 | 4 | 6 | 19 | 11 | 11 | 11 |

TABLE 7

Example Scale Note Generation
Example: Set current scale to type 2 (Major Pentatonic) with root note 60 (C)

| After (see FIG. 6) | Scale Type | note [0] (root) | note [1] | note [2] | note [3] | note [4] | note [5] | note [6] |
|---|---|---|---|---|---|---|---|---|
| 6-1 | 2 | — | — | — | — | — | — | — |
| 6–2 | 2 | 60(C) | — | — | — | — | — | — |
| 6–3 (Z = 1) | 2 | 60(C) | 62(D) | — | — | — | — | — |
| 6–3 (Z = 2) | 2 | 60(C) | 62(D) | 64(E) | — | — | — | — |
| 6–3 (Z = 3) | 2 | 60(C) | 62(D) | 64(E) | 55(G) | — | — | — |
| 6–3 (Z = 4) | 2 | 60(C) | 62(D) | 64(E) | 55(G) | 57(A) | — | — |
| 6–3 (Z = 5) | 2 | 60(C) | 62(D) | 64(E) | 55(G) | 57(A) | 57(A) | — |
| 6–3 (Z = 6) | 2 | 60(C) | 62(D) | 64(E) | 55(G) | 57(A) | 57(A) | 57(A) |
| 6–4 | 2 | 60(C) | 62(D) | 64(E) | 55(G) | 57(A) | 64(E) | 64(E) |
| 6–5 | 2 | 55(G) | 57(A) | 60(C) | 62(D) | 64(E) | 64(E) | 64(E) |

Figure 7A:
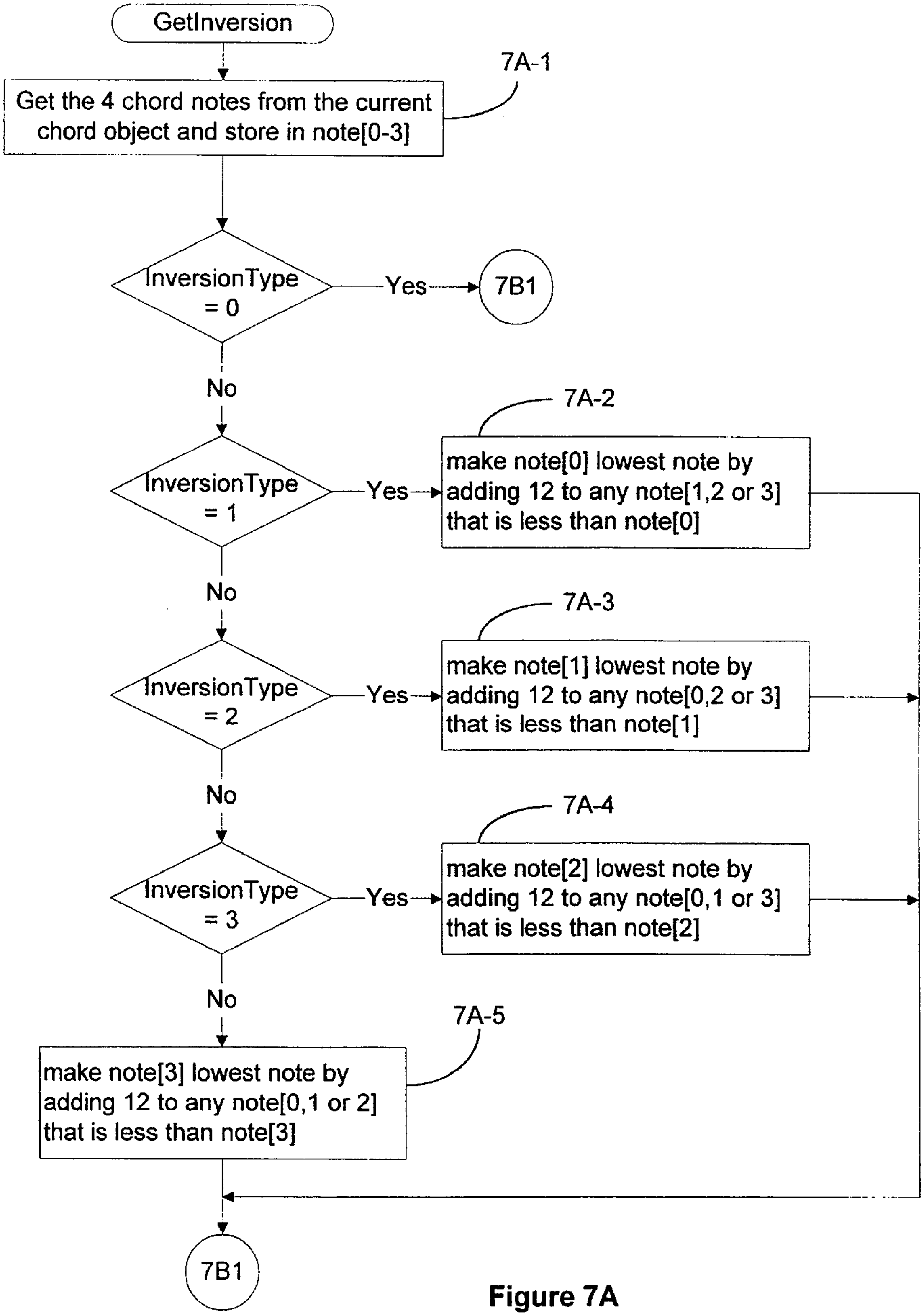
Figure 7B:
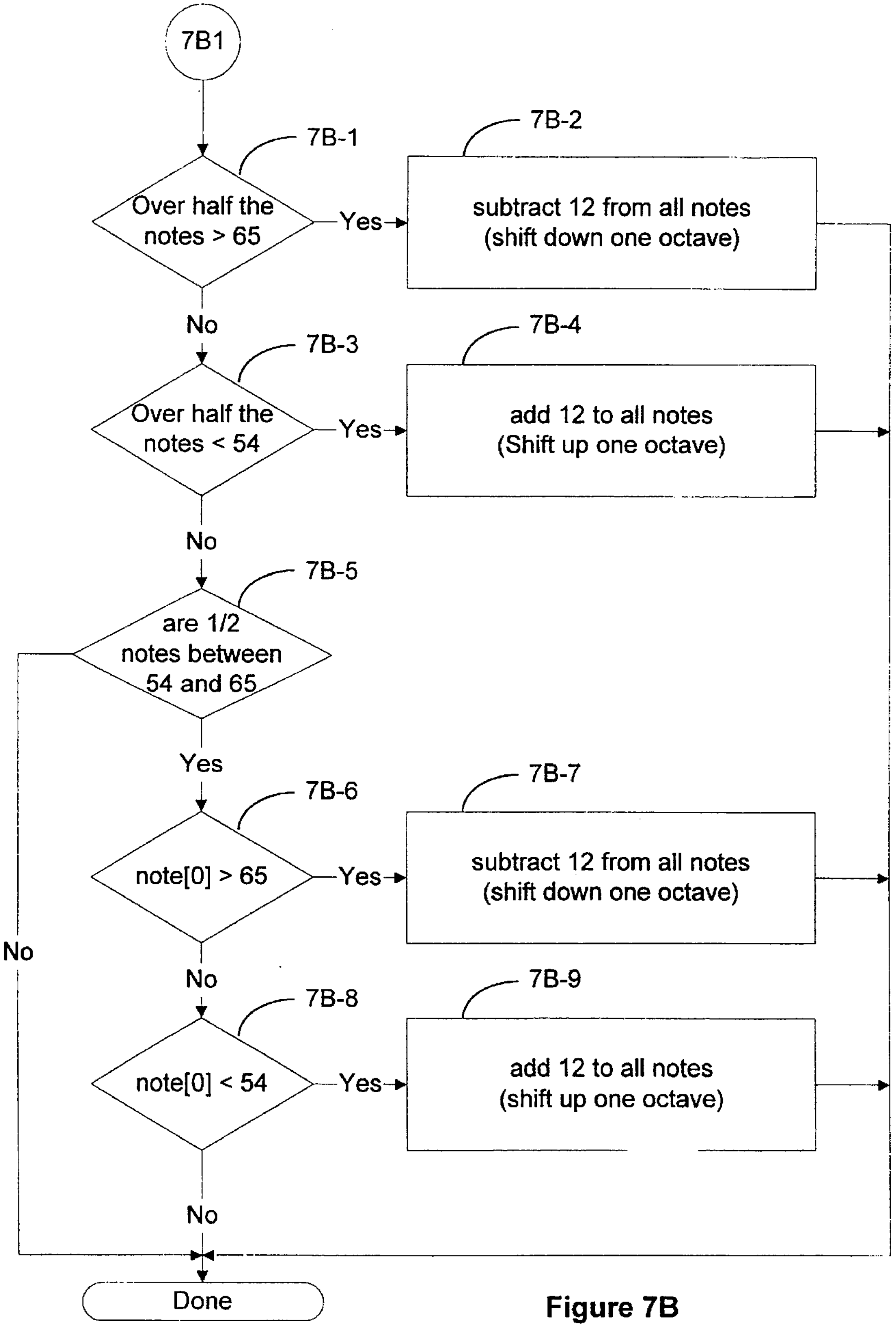
Figure 7C:
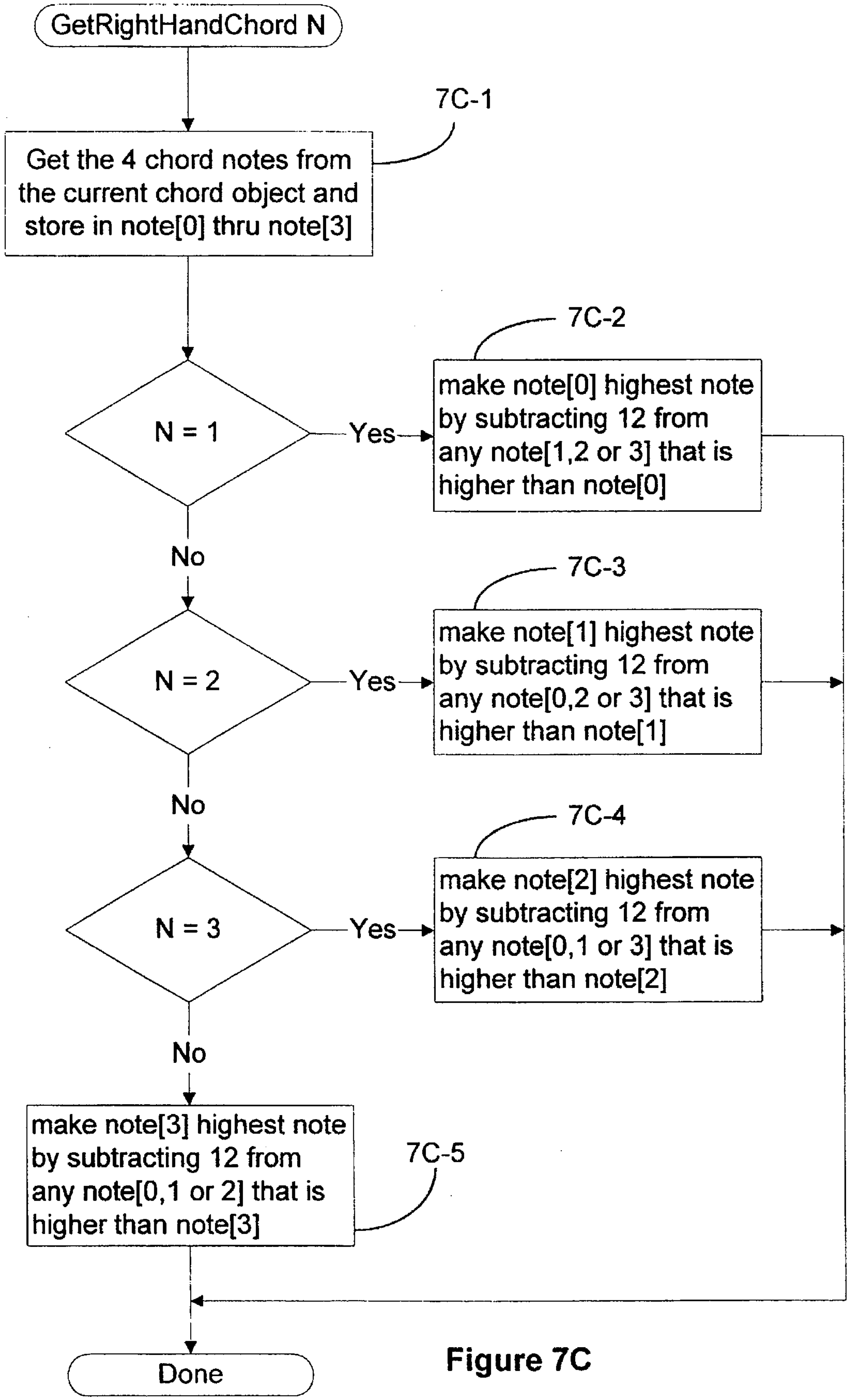

FIGS. 7*a*, 7*b* AND 7*c* AND TABLE 8

The present invention further includes three or more Chord Inversion objects 3-10. InversionA is for use by the Chord Progression type of PianoKey objects 3-6. InversionB is for the black melody type piano keys that play single notes 3-6 and inversionC is for the black melody type piano key that plays the whole chord 3-6. These objects simultaneously provide different inversions of the current chord object 3-7. These objects have the "intelligence" to invert chords. Table 8 shows the services and attributes that these objects provide. The single attribute inversionType, holds the inversion to perform and may be 0, 1, 2, 3, or 4.

TABLE 8

Chord Inversion Object Attributes and Services

Attributes:

1. inversionType

Services:

1. SetInversion(newInversionType);
2. GetInversion(note[]);
3. GetRightHandChord(note[], Number);
4. GetRightHandChordWithHighNote(note[],HighNote);
5. GetFundamental(); Fundamental
6. GetAlternate(); Alternate
7. GetC1(); C1
8. GetC2(); C2

The SetInversion( ) service sets the attribute inversionType. It is usually called by the user interface 3-2 in response to keyboard input by the user or by the user pressing a foot switch that changes the current inversion.

For services 2, 3, and 4 of Table 8, note[], the destination for the chord, is passed as a parameter to the service by the caller.

FIGS. 7A, and 7B show a flow diagram for the GetInversion( ) service. The GetInversion( ) service first (7A-1) gets all four notes of the current chord from the current chord object (3-7) and stores these in the destination (note[0] through note [3]). At this point, the chord is in inversion 0 where it is known that the fundamental of the chord is in note [0], the alternate is in note [1], the C1 note is in note [2] and C2 is in note [3] and that all of these notes are within one octave (referred to as 'popular voicing)'. If inversionType is 1, then 7A-2 of FIG. 7A will set the fundamental to be the lowest note of the chord. This is done by adding one octave (12) to every other note of the chord that is lower than the fundamental (note[0]). If inversionType is 2, then 7A-3 of FIG. 7A will set the alternate to be the lowest note of the chord. This is done by adding one octave (12) to every other note of the chord that is lower than the alternate (note[1]). If inversionType is 3, then 7A-4 of FIG. 7A will set the C1 note to be the lowest note of the chord. This is done by adding one octave (12) to every other note of the chord that is lower than the C1 note (note[2]). If inversionType is none of the above (then it must be 4) then 7A-5 of FIG. 7A will set the C2 note to be the lowest note of the chord. This is done by adding one octave (12) to every other note of the chord that is lower than the C2 note (note[3]). After the inversion is set then processing continues with FIG. 7B. 7B1 of FIG. 7B checks if over half of the different notes of the chord have a value that is greater than 65. If so, then 7B-2 drops the entire chord one octave by subtracting 12 from every note. If not, 7B-3 checks if over half of the different notes of the chord are less than 54. If so, then 7B-4 raises the entire chord by one octave by adding 12 to every note. If more than half the notes are not outside the range 54–65, then 7B-5 checks to see if exactly half the notes are outside this range. If so, then 7B-6 checks if the fundamental note (note[0]) is greater than 65. If it is, then 7B-7 lowers the entire chord by one octave by subtracting 12 from every note. If the chord fundamental is not greater than 65, then 7B-8 checks to see if it (note[0]) is less than 54. If it is , then 7B-9 raises the entire chord one octave by adding 12 to every note. If preferred, inversions could also be shifted as to always keep the fundamental note in the 54–65 range.

FIG. 7C shows a flow diagram for the service GetRightHand Chord( ). The right hand chord to get is passed as a parameter (N in FIG. 7C). 7C-1 first gets the current chord from the current chord object. If the right hand chord desired is 1 (N=1), meaning that the fundamental should be the highest note, then 7C-2 subtracts 12 (one octave) from any other note that is higher than the fundamental (note[0]). If the right hand chord desired is 2, meaning that the alternate should be the highest note, then 7C-3 subtracts 12 (one octave) from any other note that is higher than the alternate (note[1]). If the right hand chord desired is 3, meaning that the C1 note should be the highest note, then 7C-4 subtracts 12 (one octave) from any other note that is higher than the C1 note (note[2]). If the right hand chord desired is not 1, 2 or 3, then it is assumed to be 4, meaning that the C2 note should be the highest note and then 7C-5 subtracts 12 (one octave) from any other note that is higher than the C2 note (note[3]).

Figure 7D:
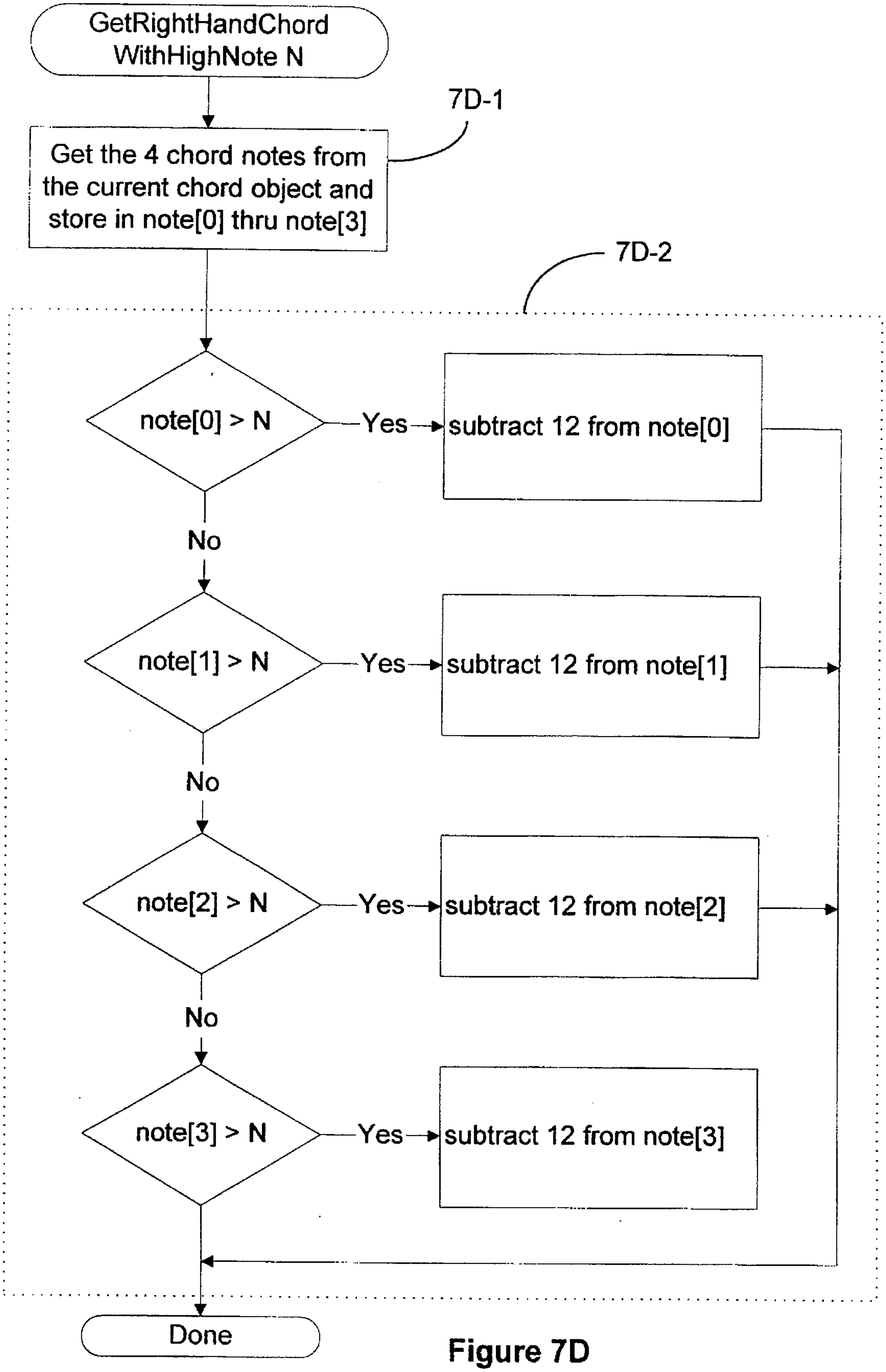

FIG. 7D shows a flow diagram for the service GetRightHandChordWithHighNote( ). This service is called by the white melody keys when the scale note they are to play is a chord note the mode calls for a right hand chord. It is desirable to play the scale note as the highest note, regardless of whether it is the fundamental, alternate, etc. This service returns the right hand chord with the specified note as the highest. First, the 4 notes of the chord are fetched from the current chord object (7D-1). The flow diagram of FIG. 7D indicated by 7D-2 checks each note of the chord and lowers it one octave (by subtracting 12) if it is higher than the specified note. This will result in a chord that is the current chord with the desired note as the highest.

Services 5, 6, 7 and 8 of table 8 each return a single note as specified by the service name (fundamental, alternate, etc.). These services first perform the same sequence as in FIG. 7A (7A-1 through 7A-5). This puts the current chord in the inversion specified by the attribute inversionType. These services then return a single note and they differ only in the note they return. GetFundamental( ) returns the fundamental (note [0]). GetAlternate( ) returns the alternate (note [1]). Get C1( ) returns the C1 note (note[2]) and GetC2 returns the C2 note (note [3]).

TABLES 9a AND 9b

Referring again to FIG. 3, there are two Compose Bass objects 3-13, 'bass0' and 'bass1'. These objects know what the bass offset is for each input channel and what output channel should receive the original performance for a particular compose bass setting. The present invention sends the processed music to channel 1. The original music performed by the user is accepted from channel 3. Original Input from channels 4 through 9 are accepted with implied bass offsets (see Table 9b). The original performance is also output to enable the user to record and replay an original performance, such as for use with a lighting system or other indication system which will allow the user to see the original performance and perform along with it by depressing the correctly indicated keys in a manner known in the art. It could also be used for replaying a performance with new chord/scale substitutions, etc. The compose bass settings affect input from channel 3 only. When the bass setting is not 0, original input from channel 3 will be output to another channel (see Table 9b).

TABLE 9a

Compose Bass Objects Attributes and Services

Attributes:

1. bassSetting

Services:

1. SetBass(newBassSetting);
2. GetBassOfstForCnl(cnlNum); bassOfst
3. GetOutputCnlForInputCnl(inputCnlNum); outputCnl The attribute bassSetting contains the bass offset. The service SetBass( ), called by the user interface (3-2), sets the bassSetting attribute to a new setting. The GetBassOfstForCnl( ) service provides the bass offset for that channel. The GetOutputCnlForInputCnl( ) service provides the destination channel for the specified input channel. The latter two services are call by the pianoKey 3-6 objects.

TABLE 9b

Channel Assignments of present invention

| Output Channel | Description | Output Contents |
|---|---|---|
| 1 | processed (composed) music output. | The resulting notes derived by the chord progression and |

TABLE 9b-continued

Channel Assignments of present invention

| Output Channel | Description | Output Contents |
|---|---|---|
| | | melody keys. This is what is intended to be "heard". |
| 2 | Program (patch) changes | Original (input) chord progression keys. |
| 3 | Original performance, 0 offset | All original input from channel 3 is output on this channel for bass offset of 0. |
| 4 | Original performance, −36 bass offset. | All original input from channel 4 and original input from channel 3 for bass offset of −3 octaves. |
| 5 | Original performance, −24 bass offset. | All original input from channel 5 and original input from channel 3 for bass offset of −2 octaves. |
| 6 | Original performance, −12 bass offset. | All original input from channel 6 and original input from channel 3 for bass offset of −1 octave. |
| 7 | Original, performance, +12 bass offset. | All original input from channel 7 and original input from channel 3 for bass offset of +1 octave. |
| 8 | Original performance, +24 bass offset. | All original input from channel 8 and original input from channel 3 for bass offset of +2 octaves. |
| 9 | Original performance, +36 bass offset. | All original input from channel 9 and original input from channel 3 for bass offset of +3 octaves. |

TABLE 10

A Main Configuration Memory 3-5 contains one or more sets or banks of chord assignments and scale assignments for each chord progression key. It responds to messages from the user interface 3-2 telling it to assign a chord or scale to a particular key. The Memory 3-5 responds to messages from the piano key objects 3-6 requesting the current chord or scale assignment for a particular key, or to switch to a different assignment set or bank. The response to these messages may result in the configuration memory 3-5 sending messages to other objects, thereby changing the present configuration. The configuration object provides memory storage of settings that may be saved and recalled from a named disk file. The number of storage banks or settings is arbitrary. A user could have several different configurations saved. It is provided as a convenience to the user. The present invention preferably uses the following configuration:

There are two song keys stored in songKey[2]. There are two chord banks, one for each song key called chordTypeBank1[60] and chordTypeBank2[60]. Each chord bank hold sixty chords, one for each chord progression key. There are two scale banks, one for each song key, called scaleBank1[60][2] and scaleBank2[60][2]. Each scale bank holds 2 scales (root and type) for each of the sixty chord progression keys. The currentChordFundamental attribute holds the current chord fundamental. The attribute currentChordKeyNum holds the number of the current chord progression key and selects one of sixty chords in the selected chord bank or scales in the selected scale bank. The attribute songKeyBank identifies which one of the two song keys is selected (songKey[songKeyBank]), which chord bank is selected (chordTypeBank1[60] or chordTypeBank2[60]) and which scale bank is selected (scaleBank1[60][2] or scaleBank2[60][2]). The attribute scaleBank[60] identifies which one of the two scales is selected in the selected scale bank (scaleBank1or2[currentChordKeyNum] [scaleBank [currentChordKey Num]]).

The following discusstion assumes that songKeyBank is set to 0. The service 'SetSongKeyBank(newSongKeyBank)' sets the current song key bank (songKeyBank= newSongKeyBank). 'SetScaleBank(newScaleBank)' service sets the scale bank for the current chord (scaleBank [currentChordKeyNum]=newScaleBank). 'AssignSongKey (newSongKey)' service sets the current song key (songKey [songKeyBank]=newSongKey).

The service 'AssignChord(newChordType, keyNum)' assigns a new chord (chordTypeBank1[keyNum]= newChordType). The service 'AssignScale(newScaleType, newScaleRoot, keyNum)' assigns a new scale (scaleBank1 [keyNum][scaleBank[currentChordKeyNum]]= newScaleType and newScaleRoot).

The service SetCurrentChord(keyNum, chordFundamental)

1. sets currentChordFundamental=chordFundamental;
2. sets currentChordKeyNum=keyNum; and
3. sets the current chord to chordBank1 [currentChordKeyNum] and fundamental currentChordFundamental The service SetCurrentScale(keyNum) sets the current scale to the type and root stored at scaleBank1[current ChordKeyNum] [scaleBank[currentChordKeyNum]].

The service 'Save(destinationFileName)' saves the configuration (all attributes) to a disk file. The service 'Recall (sourceFileName)' reads all attributes from a disk file.

The chord progression key objects 3-6 (described later) use the SetCurrentChord( ) and SetCurrentScale( ) services to set the current chord and scale as the keys are pressed. The control key objects use the SetSongKeyBank( ) and SetScaleBank( ) services to switch key and scale banks respectively as the user plays. The user interface 3-2 uses the other services to change (assign), save and recall the configuration. The present invention also contemplates assigning a song key to each key by extending the size of songKey[2] to sixty (songKey[60]) and modifying the SetCurrentChord( ) service to set the song key every time it is called. This allows chord progression keys on one octave to play in one song key and the chord progression keys in another octave to play in another song key.

TABLE 10

Configuration Objects Attributes and Services

Attributes:

1. songKeyBank
2. scaleBank[60]
3. currentChordKeyNum
4. currentChordFundamental
5. songKey[2]
6. chordTypeBank1[60]
7. chordTypeBank2[60]
8. scaleBank1[60][2]
9. scaleBank2[60][2]

Services:

1. SetSongKeyBank(newSongKeyBank);
2. SetScaleBank(newScaleBank);
3. AssignSongKey(newSongKey);
4. AssignChord(newChordType, keyNum);
5. AssignScale(newScaleType, newScaleRoot, keyNum);

TABLE 10-continued

| Configuration Objects Attributes and Services |
|---|
| 6. SetCurrentChord(keyNum, chordFundamental); |
| 7. SetCurrentScale(keyNum); |
| 8. Save(destinationFileName); |
| 9. Recall(sourceFileName); |

FIGS. 8 AND 9 AND TABLE 11

Each Output Channel object 3-11 (FIG. 3) keeps track of which notes are on or off for an output channel and resolves turning notes on or off when more than one key may be setting the same note(s) on or off. Table 11 shows the Output Channel objects attributes and services. The attributes include (1) the channel number and (2) a count of the number of times each note has been sent on. At start up, all notes are assumed to be off. Service (1) sets the output channel number. This is usually done just once as part of the initialization. In the description that follows, n refers to the note number to be sent on or off.

Figure 9A:
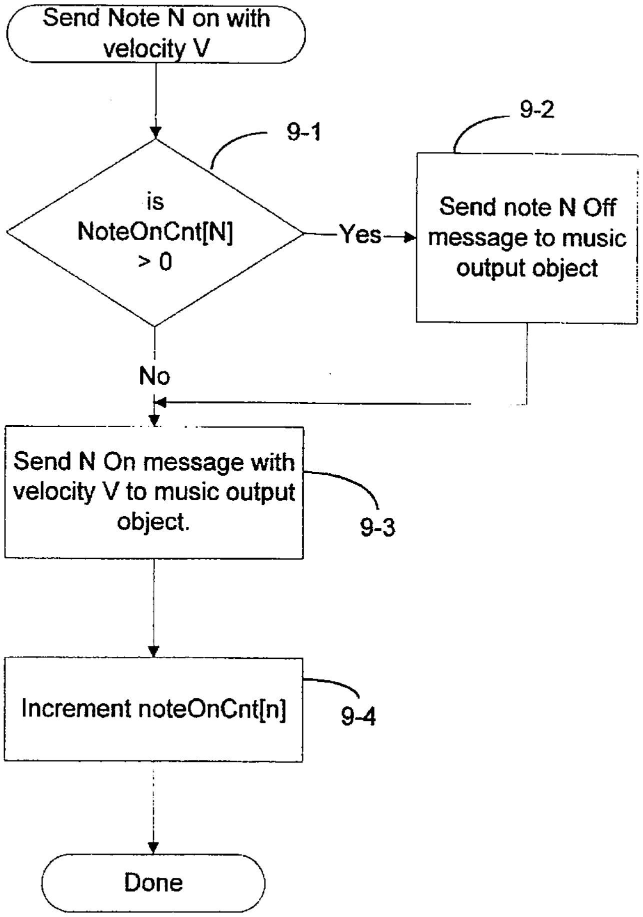

FIG. 9*a* shows a flow diagram for service 2, which sends a note on message to the music output object 3-12. The note to be sent (turned on) is first checked if it is already on in step 9-1, indicated by noteOnCnt[n]>0. If on, then the note will first be sent (turned) off in step 9-2 followed immediately by sending it on in step 9-3. The last action increments the count of the number of times the note has been sent on in step 9-4.

Figure 9B:
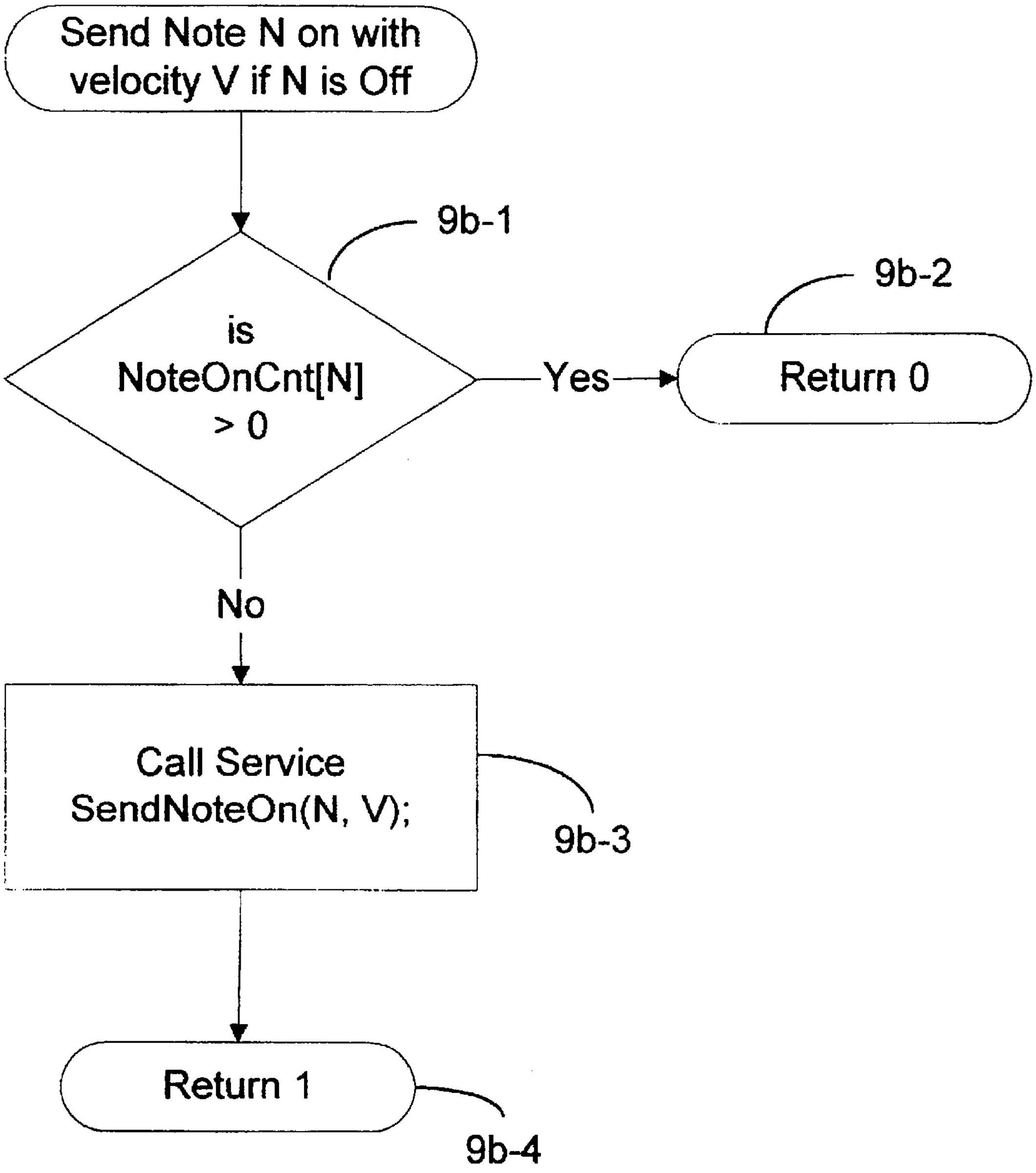

FIG. 9*b* shows a flow diagram for service 3 which sends a note on message only if that note is off. This service is provided for the situation where keys want to send a note on if it is off but do not want to re-send the note if already on. This service first checks if the note is on in step *9*b-1 and if it is, returns 0 in step 9*b*-2 indicating the note was not sent. If the note is not on, then the Send note on service is called in step 9*b*-3 and a 1 is returned by step 9*b*-4, indicating that the note was sent on and that the calling object must therefore eventually call the Send Note Off service.

FIG. 8 shows the flow diagram for the sendNoteOff service. This service first checks if the noteOnCnt[n] is equal to one in step 8-1. If it is, then the only remaining object to send the note on is the one sending it off, then a note off message is sent by step 8-2 to the music output object 3-12. Next, if the noteOnCnt[n] is greater than 0, it is decremented.

All objects which call the SendNoteOn service are required (by contract so to speak) to eventually call the SendNoteOff service. Thus, if two or more objects call the SendNoteOn service for the same note before any of them call the SendNoteOff service for that note, then the note will be sent on (sounded) or re-sent on (re-sounded) every time the SendNoteOn service is called, but will not be sent off until the SendNoteOff service is called by the last remaining object that called the SendNoteOn service.

The remaining service in Table 11 is SendProgramChange. The present invention sends notes on/off and program changes, etc., using the MIDI interface. The nature of the message content preferably conforms to the MIDI specification, although other interfaces may just as easily be employed. The Output Channel object 3-11 isolates the rest of the software from the 'message content' of turning notes on or off, or other control messages such as program change. The Output Channel object 3-11 takes care of converting the high level functionality of playing (sending) notes, etc. to the lower level bytes required to achieve the desired result.

TABLE 11

| Output Channel Objects Attributes and Services |
|---|
| Attributes: |
| 1. channelNumber |
| 2. noteOnCnt[128] |
| Services: |
| 1. SetChannelNumber(channelNumber); |
| 2. SendNoteOn(noteNumber, velocity); |
| 3. SendNoteOnIfOff(noteNumber, velocity); noteSentFlag |
| 4. SendNoteOff(noteNumber); |
| 5. SendProgramChange(PgmChangeNum); |

Figure 10A:
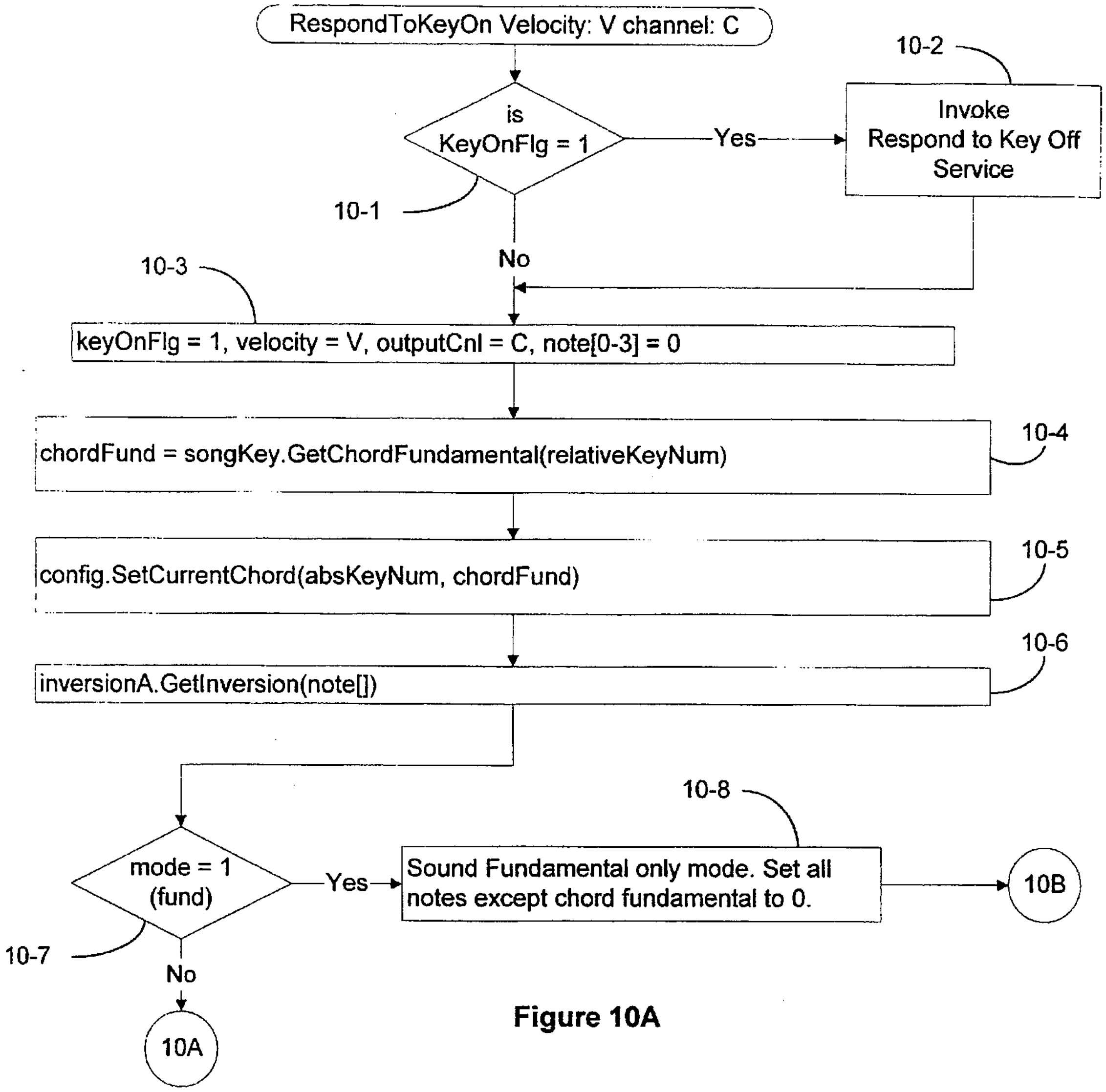
Figure 10B:
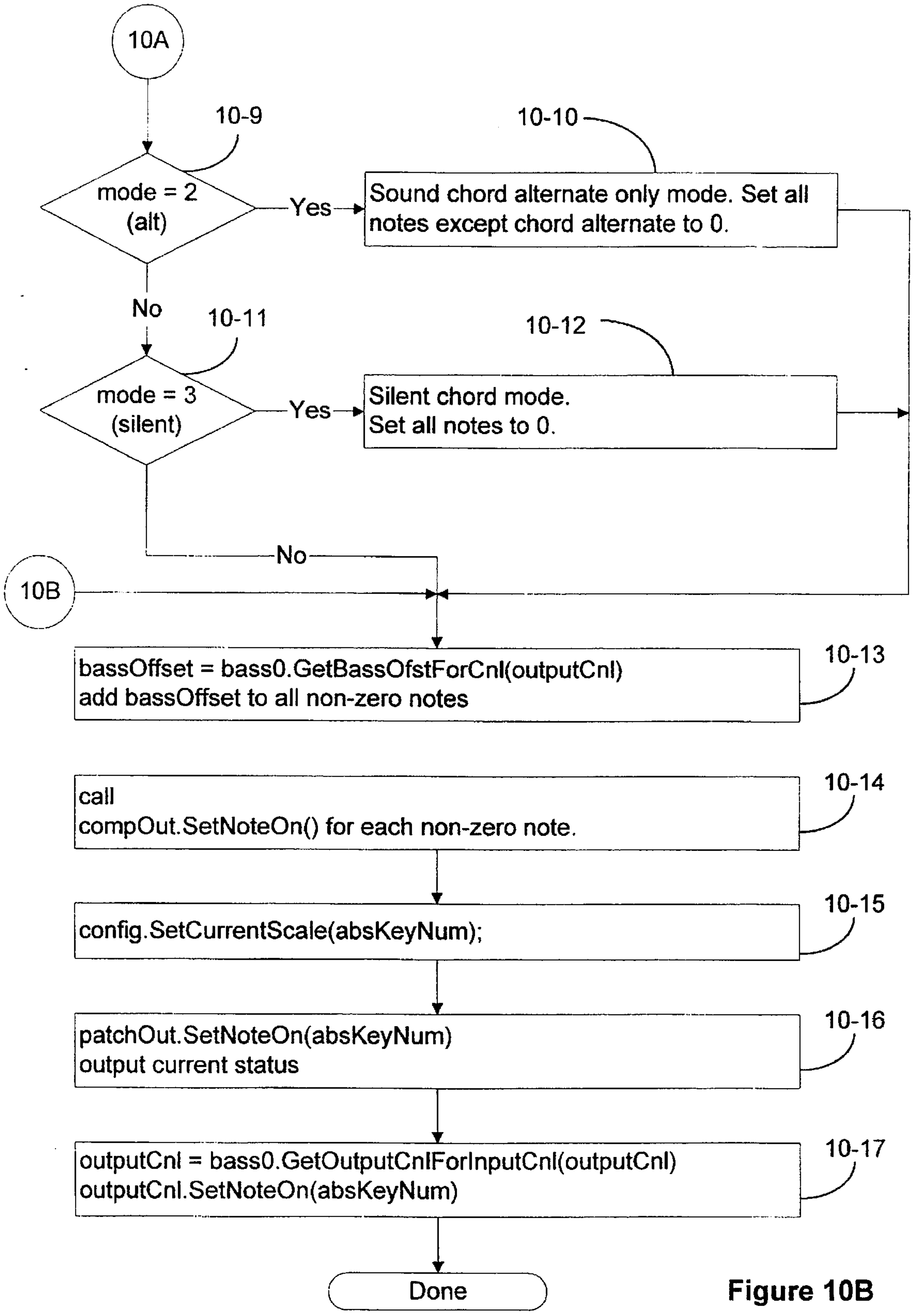

FIGS. 10*a*, 10*b* AND 11 AND TABLE 12

There are four kinds of PianoKey objects 3-6: (1) ChordProgressionKey, (2) WhiteMelodyKey, (3) BlackMelodyKey, and (4) ControlKey. These objects are responsible for responding to and handling the playing of musical (piano) key inputs. These types specialize in handling the main types of key inputs which include the chord progression keys (keys 0–59), the white melody keys (white keys greater than 59, the black melody keys (black keys greater than 59), and control keys (certain black chord progression keys).

The first three types of keys usually result in one or more notes being played and sent out to one or more output channels. The control keys are special keys that usually result in configuration or mode changes as will be described later. There are 128 instances of PianoKey objects, one for each piano key, in an array called PianoKey[128]. These objects receive piano key inputs from the music administrator object 3-3 and configuration input from the user interface object 3-2. They collaborate with the song key object 3-8, the current chord object 3-7, the current scale object 3-9, the chord inversion objects 3-10 and the configuration object 3-5, in preparing their response, which is sent to one or more of the many instances of the CnlOutput objects 3-11.

The output of the ControlKey objects may be sent to many other objects, setting their configuration or mode.

The ChordProgressionKey type of PianoKey 3-6 is responsible for handling the piano key inputs that are designated as chord progression keys (the instantiation is the designation of key type, making designation easy and flexible). These include all keys with absolute key numbers 0 through 59 with the exception of a few which are reserved for ControlKeys (see description for ControlKeys).

Table 12 shows the ChordProgressionKeys attributes and services. The attribute mode, a class attribute that is common to all instances of the ChordProgressionKey objects, stores the present mode of operation. The mode may be normal (0), Fundamental only (1), Alternate only (2) or silent chord (3). The class attribute correctionMode controls how the service CorrectKey behaves and may be se to either Normal=0 or SoloChord=1, SoloScale=2, or SoloCombined=3. =1. The absKeyNum is used for outputting patch triggers to output channel 2 (patchOut instance of output object). The relativeKeyNum is used to determine the chord to play. The outputCnl attribute stores the destination channel for the next key off response. The keyOnFlag indicates if the object has responded to a key on since the last key off. The velocity attribute holds the velocity with which the key was pressed. The chordNote[4] attributes holds the (up to) four notes of the chord last output.

TABLE 12

| PianoKey::ChordProgressionKey Attributes and Services |
| --- |
| Class Attributes: |
| 1. mode |
| 2. correctionMode |
| Instance Attributes: |
| 1. absoluteKeyNumber |
| 2. relativeKeyNumber |
| 3. outputCnl |
| 4. keyOnFlag |
| 5. velocity |
| 6. chordNote[4] |
| Services: |
| 1. RespondToKeyOn(sourceChannel, velocity); |
| 2. RespondToKeyOff(sourceChannel); |
| 3. RespondToProgramChange(sourceChannel); |
| 4. SetMode(newMode); |
| 5. CorrectKey(); |
| 6. SetCorrectionMode(newCorrectionMode); |

FIGS. 10*a* and 10*b* depict a flow diagram for the service 'RespondToKeyOn( )', which is called in response to a chord progression key being pressed. If the KeyOnFlg is 1 in step 10-1, indicating that the key is already pressed, then the service 'RespondToKeyOff( )' is called by step 10-2. Then, some of the attributes are initialized in step 10-3.

Then, the chord fundamental for the relative key number is fetched from the song key object in step 10-4. The main configuration memory 3-5 is then requested to set the current chord object 3-7 based on the presently assigned chord for the absKeyNum attribute in step 10-5. The notes of the current chord are then fetched in step 10-6 from the chord inversion object A 3-10 (which gets the notes from the current chord object 3-7. If mode attribute=1 (10-7) then all notes of the chord except the fundamental are discarded (set to 0) in step 10-8. If the mode attribute=2 in step 10-9, then all notes of the chord except the alternate are discarded by step 10-10. If the mode attribute=3 in step 10-11, then all notes are discarded in step 10-12. The bass offset is then fetched from the ComposeBass object basso and added to each note to turn on in step 10-13. All notes that are non zero are then output to channel 1 in step 10-14. The main configuration object 3-5 is then requested to set the current scale object 3-9 per current assignment for absoluteKeyNumber attribute 10-15. A patch trigger=to the absKeyNum is sent to channel 2 in step 10-16. In addition, the current status is also sent out on channel 2 (see table 17 for description of current status). When these patch triggers are recorded and played back into the easy composer software, it will result in the RespondToProgramChange( ) service being called for each patch trigger received. By sending out the current key, chord and scale for each key pressed, it will assure that the easy composer software will be properly configured when another voice is added to the previously recorded material. The absKeyNum attribute is output to output channel per current bass setting (10-17).

FIG. 11 shows a flow diagram for the service 'RespondToKeyOff( )'. This service is called in response to a chord progression key being released. If the key has already been released in step 11-1, indicated by keyOnFlg=0, then the service does nothing. Otherwise, it sends note off messages to channel 1 for each non-zero note, if any, in step 11-2. It then sends a note off message to outputCnl for AbsKeyNum in step 11-3. Finally it sets the keyOnFlg to 0 in step 11-4.

The service 'RespondToProgramChange( )' is called in response to a program change (patch trigger) being received. The service responds in exactly the same way as the 'RespondToKeyOn( )' service except that no notes are output to any object. It initializes the current chord object and the current scale object. The 'SetMode( )' service sets the mode attribute. The 'setCorrectionMode( )' service sets the correctionMode attribute.

The service CorrectKey( ) is called in response to a change in the song key, current chord or scale while the key is on (keyOnFlg=1). This enables the key to correct the notes it has sent out for the new chord or scale. There are two different correction modes (see description for correctionMode attribute above). In the normal correction mode (correctionMode=0), this service behaves exactly as RespondToKeyOn( ) with one exception. If a new note to be turned on is already on, it will remain on. It therefore does not execute the same identical initialization sequence (FIG. 10*a*) in this mode. It first determines the notes to play (as per RespondToKeyOn( ) service) and then turns off only those notes that are not already on and then turns on any new notes. The solo correction mode (correctionMode=1) takes this a step further. It turns off only those notes that are not in the new current chord (correctionMode=1), scale (correctionMode=2) or combined chord and scale (correctionMode=3). If a note that is already on exists anywhere in the current chord, scale or combined chord and scale it will remain on. The current chord objects service isNoteInChord( ) and the current scale objects services isNoteInScale and isNoteInCombinedScale( ) are used to determine if each note already on should be left on or turned off. The output channel for the original key is determined as for the white melody key as described below).

FIGS. 12*a* THROUGH 12*k* AND TABLE 13

The WhiteMelodyKey object is responsible for handling all white melody key events. This involves, depending on mode, getting notes from the current scale object and/or chord inversion object and sending these notes out.

The class attributes for this object include mode, which may be set to one of Normal=0, RightHandChords=1, Scale3rds=2, RHCand3rds=3, RemainScale=4 or RemainNonScale=5. The class attributes numBlkNotes hold the number of block notes to play if mode is set to 4 or 5. The attribute correctionMode controls how the service CorrectKey behaves and may be set to either Normal=0 or SoloChord=1, SoloScale=2, or SoloCombined=3. Instance variables include absoluteKeyNumber and colorKeyNumber and octave (see FIG. 2). The attribute outputCnl holds the output channel number the notes were sent out to. keyOnFlag indicates whether the Key in pressed or not. Velocity hold the velocity of the received 'Note On' and note[4] holds the notes that were sounded (if any).

TABLE 13

| PianoKey::WhiteMelodyKey Attributes and Services |
| --- |
| Class Attributes: |
| 1. mode |
| 2. numBlkNotes |
| 3. correctionMode |
| Instance Attributes: |
| 1. absoluteKeyNumber |
| 2. colorKeyNumber |

TABLE 13-continued

| PianoKey::WhiteMelodyKey Attributes and Services |
| --- |
| 3. octave |
| 4. outputCnl |
| 5. keyOnFlag |
| 6. velocity |
| 7. note[4] |
| Services: |
| 1. ResondToKeyOn(sourceChannel, velocity); |
| 2. RespondToKeyOff(sourceChannel); |
| 3. CoffectKey(); |
| 4. SetMode(newMode); |
| 5. SetCorrectionMode(newCorrectionMode); |
| 6. SetNumBlkNotes(newNumBlkNotes); |

FIGS. 12*a* through 12*j* provide a flow diagram of the service 'RespondToKeyOn( )'. This service is called in response to a white melody key being pressed. It is responsible for generating the note(s) to be sounded. It is entered with the velocity of the key press and the channel the key was received on.

The RespondToKeyOn( ) service starts by initializing itself in step 12*a*-1. This initialization will be described in more detail below. It then branches to a specific sequence that is dependent on the mode, as shown in flow diagram 12*a*-2. These specific sequences actually generate the notes and will be described in more detail below. It finishes by outputting the generated notes in step 12*a*-3.

Figure 12A:
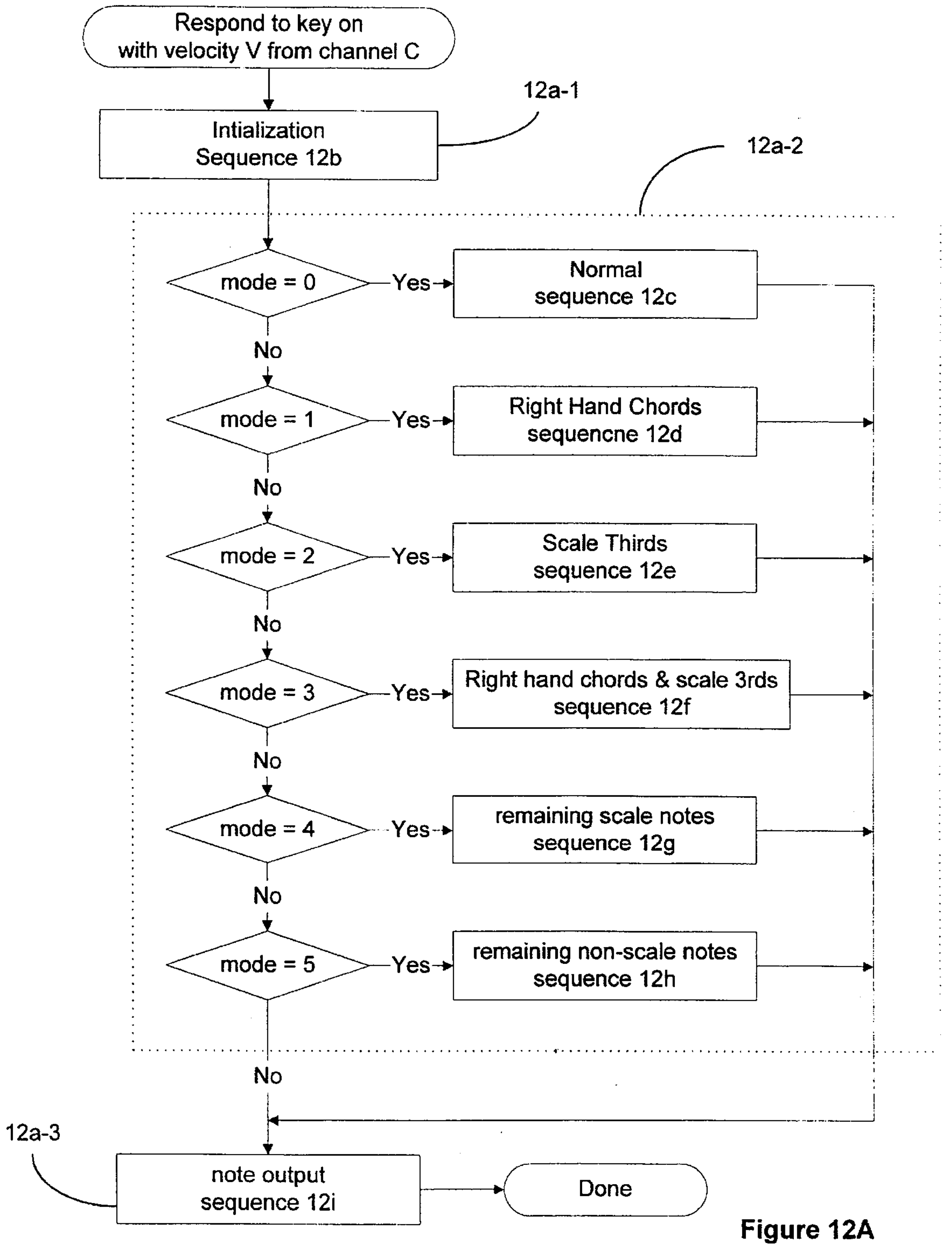
Figure 12B:
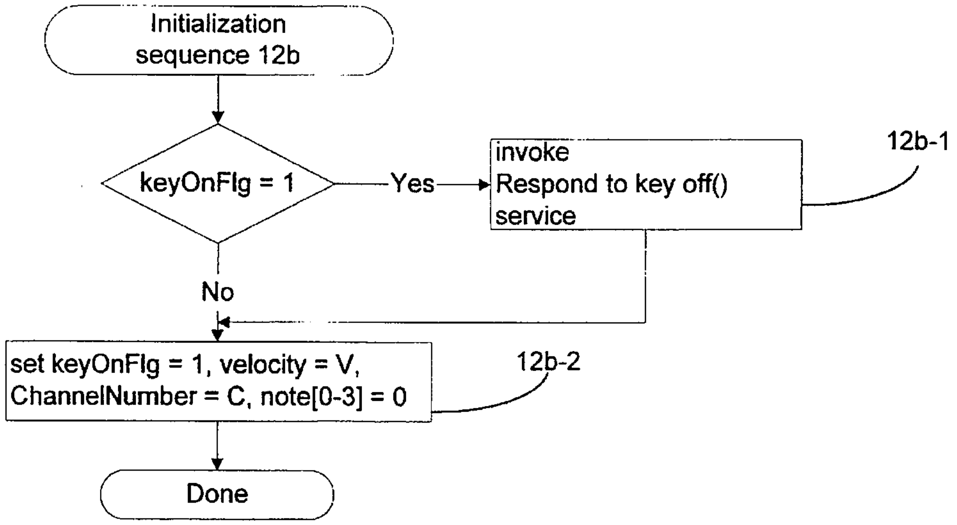

The initialization sequence, shown in FIG. 12*b*, first checks if the key is already pressed. If it is (keyOnFlg=1), the service 'RespondToKeyOff( )' service will be called in step 12*b*-1. Then, keyOnFlg is set to 1, indicating the key is pressed, the velocity and outputCnl attributes are set and the notes are cleared by being set to 0 in step 12*b*-2.

Figure 12I:
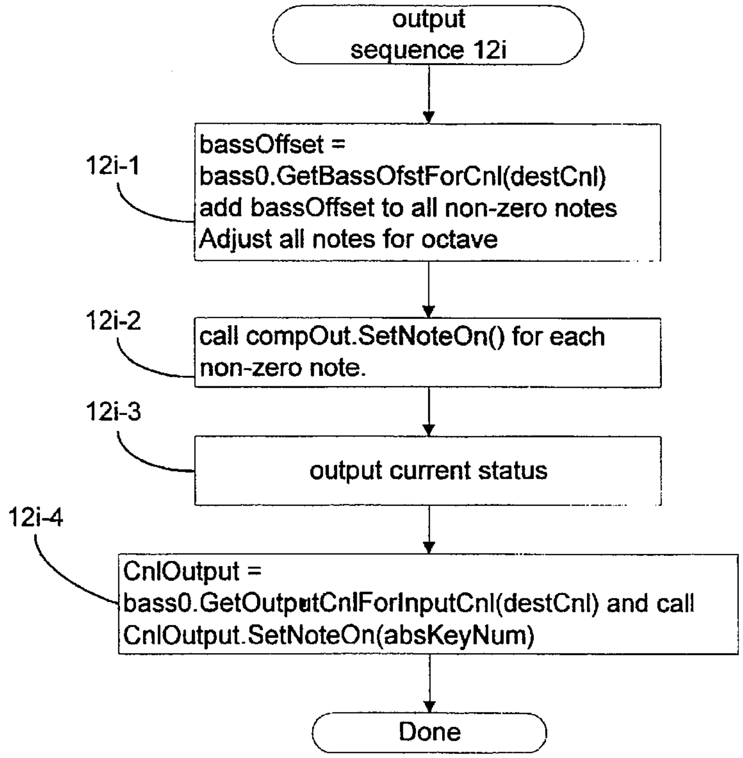
Figure 12C:
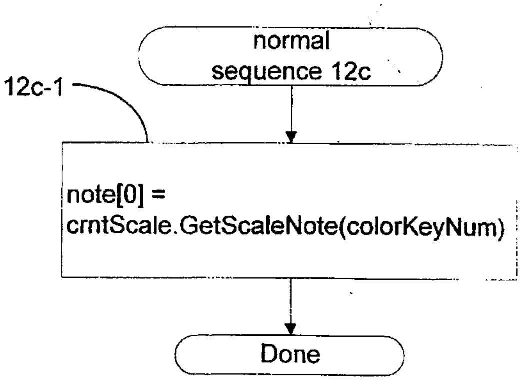

FIG. 12*c* depicts a flow diagram of the normal (mode=0) sequence. This plays a single note (note[0]) that is fetched from the current scale object based on the particular white key pressed (colorKeyNum).

Figure 12D:
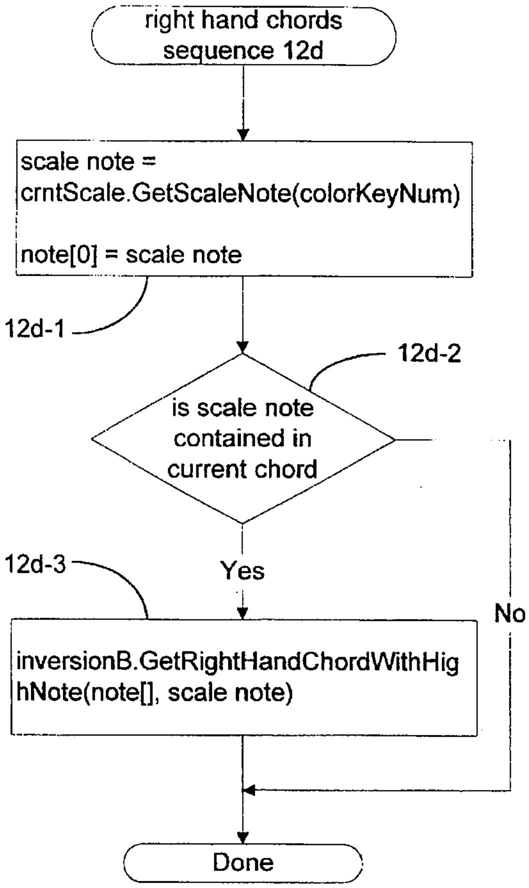

FIG. 12*d* gives a flow diagram of the right hand chord (mode=1) sequence. This sequence first fetches the single normal note as in normal mode in step 12*d*-1. It then checks if this note (note[0]) is contained in the current chord in step 12*d*-2. If it is not, then the sequence is done. If it is, then the right hand chord is fetched from chord inversion B object with the scale note (note[)]) as the highest note in step 12*d*-3.

Figure 12E:
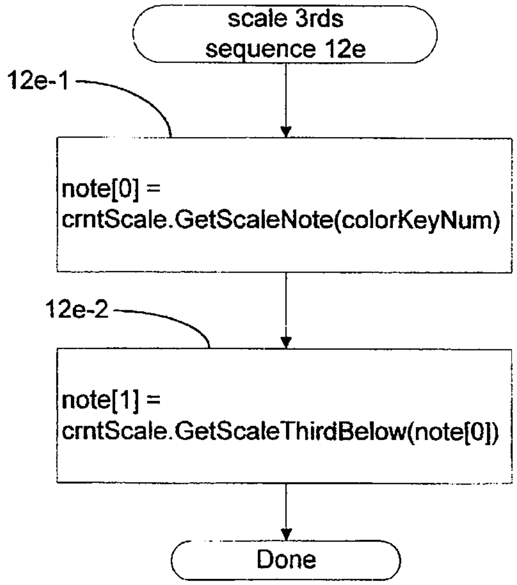

FIG. 12*e* gives a flow diagram of the scale thirds (mode=2) sequence. This sequence sets note[0] to the normal scale note as in normal mode (12*e*-1). It then sets note[1] to be the scale note one third below note[0] by calling the service 'GetScaleThird(colorKeyNum)' of the current scale object.

Figure 12F:
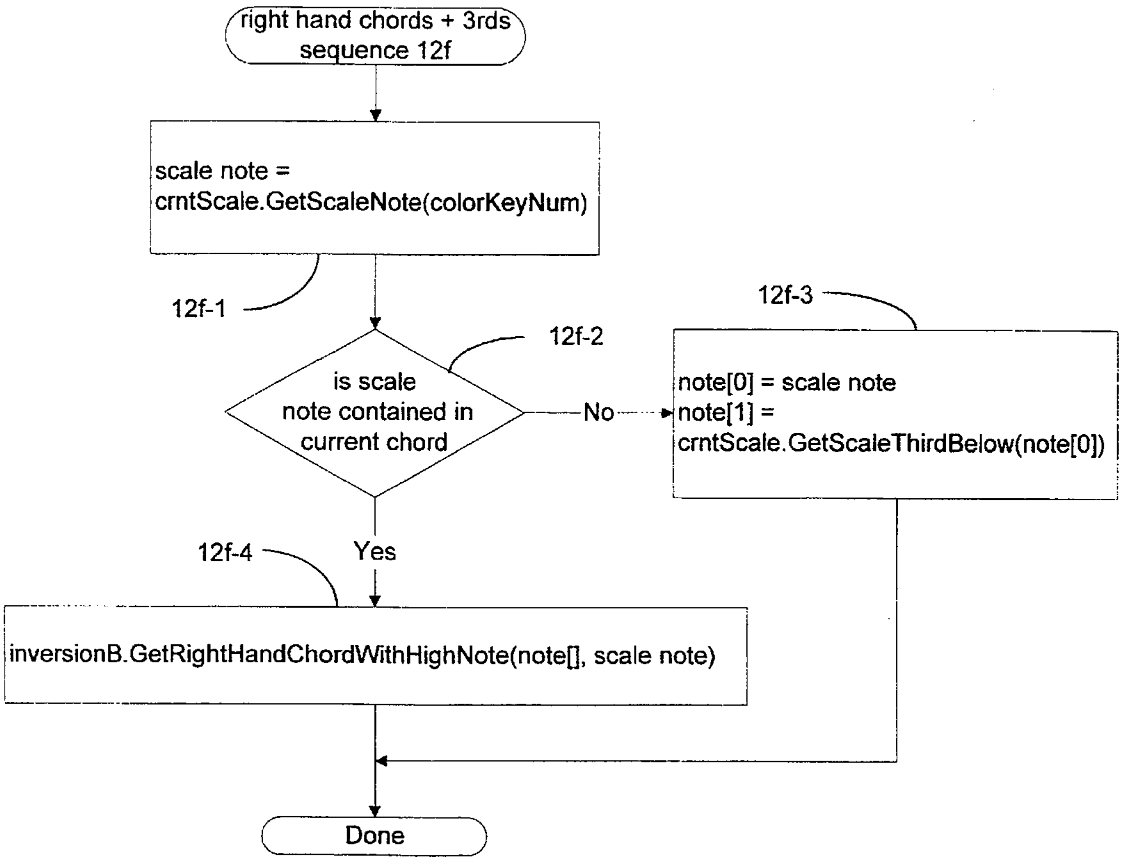

FIG. 12*f* gives a flow diagram of the right hand chords plus scale thirds (mode=3) sequence. This sequence plays a right hand chord exactly as for mode=1 if the normal scale note is in the current chord (12*f*-1, 12*f*-2, and 12*f*-4 are identical to 12*d*-1, 12*d*-2, and 12*d*-3 respectively). It differs in that if the scale note is not in the current chord, a scale third is played as mode 2 in step 12*f*-3.

Figure 12G:
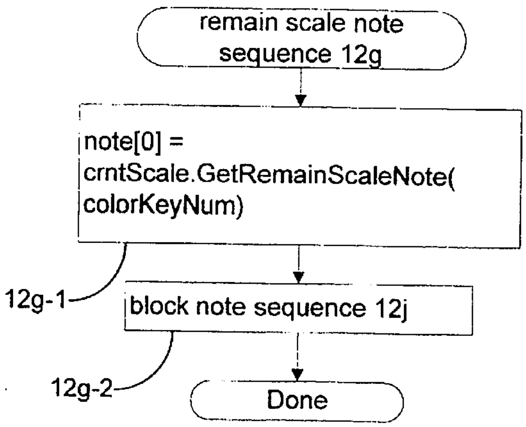

FIG. 12*g* depicts a flow diagram of the remaining scale note (mode=4) sequence. This sequence plays scale notes that are remaining after current chord notes are removed. It sets note[0] to the remaining scale note by calling the service 'GetRemainScaleNote(colorKeyNumber)' of the current scale object instep 12*g*-1. It then adds chord (block) notes based on the numBlkNotes attributes in step 12*g*-2. FIG. 12*j* shows a flow diagram for getting block notes.

Figure 12H:
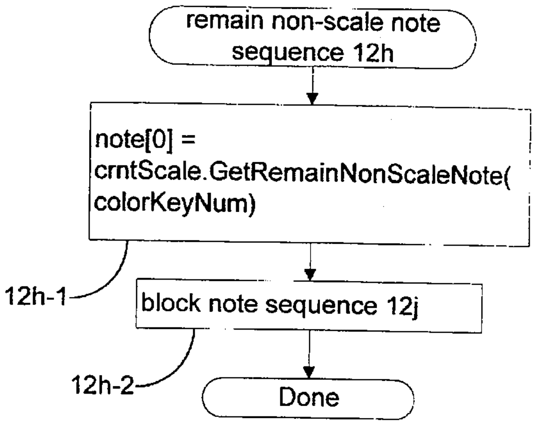
Figure 12J:
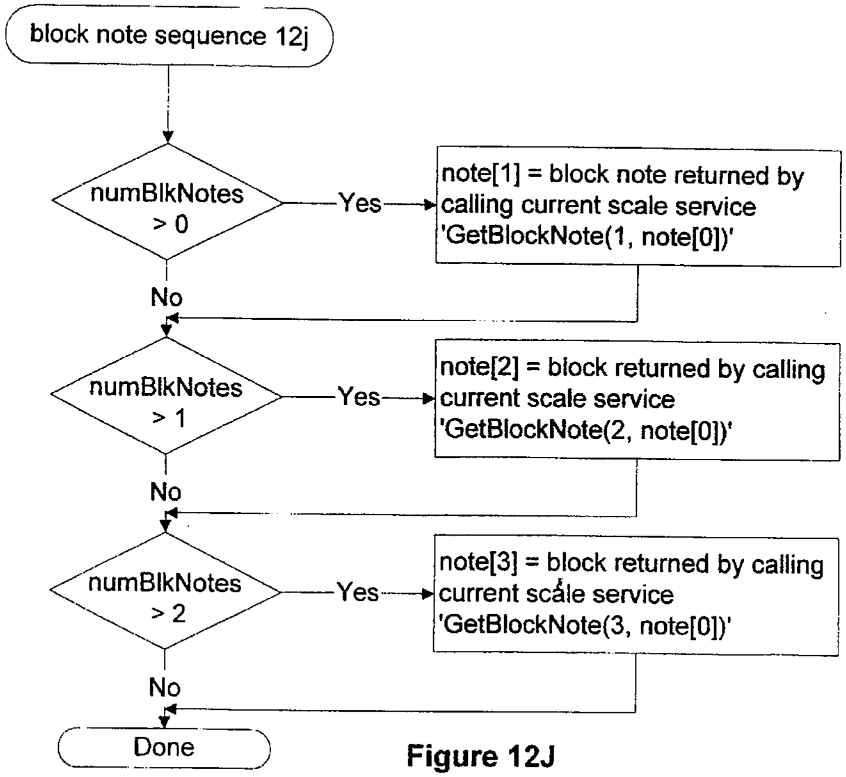

FIG. 12*h* gives a flow diagram of the remaining non-scale notes (mode=5) sequence. This sequence plays notes that are remaining after scale and chord notes are removed. It sets note[0] to the remaining non scale note by calling the service 'GetRemainNonScaleNote(colorKeyNumber)' of the current scale object in step 12*h*-1. It then adds chord (block) notes based on the numBlkNotes attributes in step 12*h*-2.

FIG. 12*j* shows a flow diagram for getting block notes.

FIG. 12*i* shows a flow diagram of the output sequence. This sequence includes adding the bass offset to each note and adjusting each note for the octave of the key pressed in step 12*i*-1. Next, each non-zero note is output to the compOut instance of the CnlOutput object in step 12*i*-2. The current status is also sent out to channel 2 in step 12*i*-3 (see Table 17). Last, the original note (key) is output to the proper channel in step 12*i*-4.

Figure 12K:
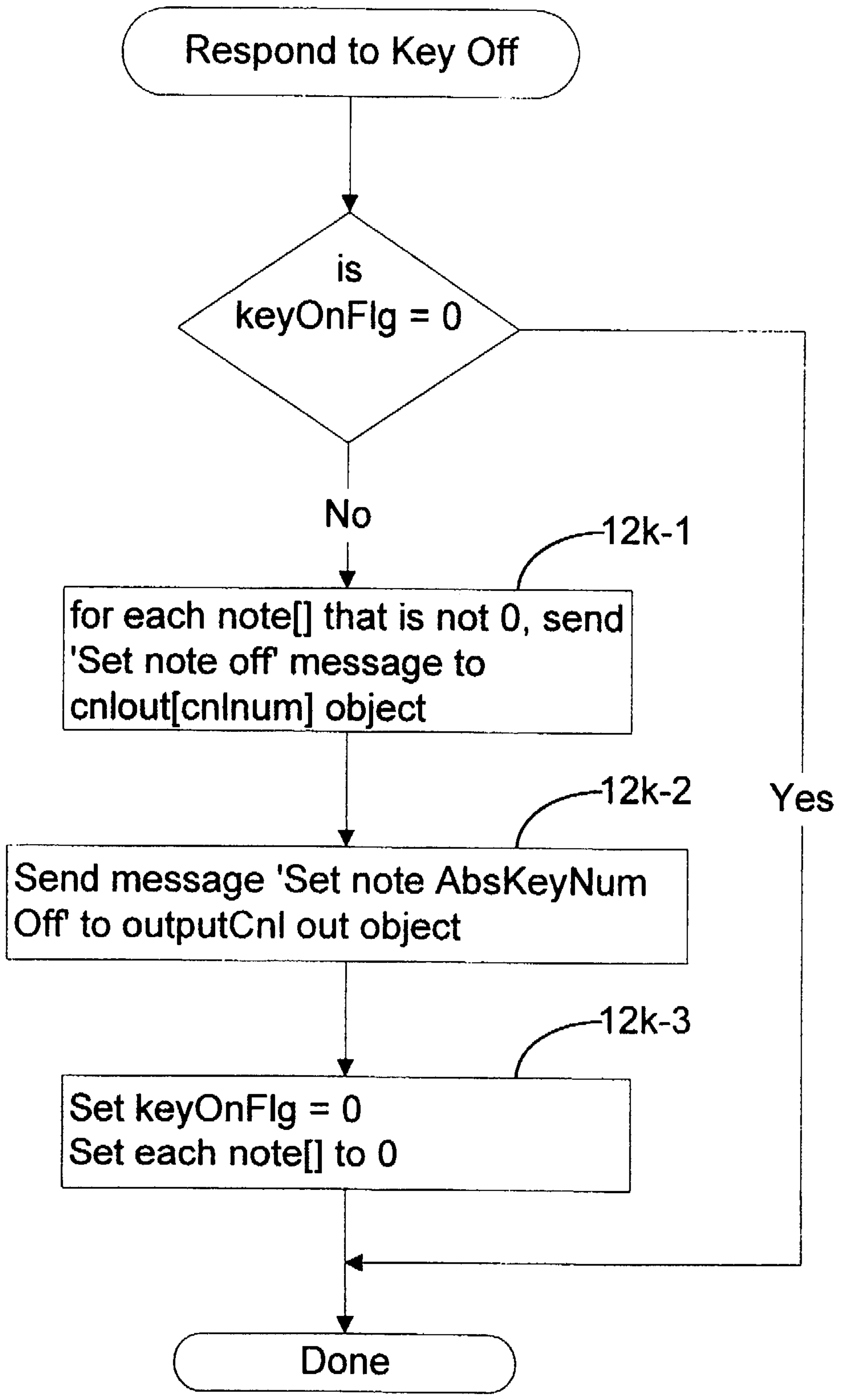

FIG. 12*k* provides a flow diagram for the service 'RespondToKeyOff( )'. This service is called in response to a key being released. If the key has already been released (keyOnFlg=0) then this service does nothing. If the key has been pressed (keyOnFlg=1) then a note off is sent to channel 1 for each non-zero note in step 12*k*-1. A note off message is sent for absoluteKeyNumber to output channel per channel number and bass setting in step 12*k*-2. Then the keyOnFlg is cleared and the notes are cleared in step 12*k*-3.

The service CorrectKey( ) is called in response to a change in the current chord or scale while the key is on (keyOnFlg=1). This enables the key to correct the notes it has sent out for the new chord or scale. There are four different correction modes (see description for correctionMode attribute above). In the normal correction mode (correctionMode=0), this service behaves exactly as RespondToKeyOn( ) with one exception. If a new note to be turned on is already on, it will remain on. It therefore does not execute the same identical initialization sequence (FIG. 12*b*) in this mode. It first determines the notes to play (as per RespondToKeyOn( ) service) and then turns of only those notes that are not already on and then turns on any new notes. The solo correction modes (correctionMode=1, 2, or 3) takes this a step further. It turns off only those notes that are not in the new current chord (correctionMode=1), scale (correctionMode=2) or combined chord and scale (correctionMode=3). If a note that is already on exists anywhere in the current chord, scale or combined chord and scale it will remain on. The current chord objects service is NoteInChord( ) and the current scale objects services isNoteInScale and is NoteInCombinedScale( ) are used to determine if each note already on should be left on or turned off.

When in solo mode (correctionMode=1, 2, or 3), the original key (absKeyNum) that will be output to a unique channel, as shown in step 12*i*-4 of FIG. 12*i*. The output channel is determined by adding the correction mode multiplied by 9 to the channel determined in 12*i*-4. For example, if correctionMode is 2 then 18 is added to the channel number determined in step 12*i*-4. This allows the software to determine the correction mode when the original performance is played back.

Step 12*b*-2 of FIG. 12*b* decodes the correctionMode and channel number. The original key channels are local to the software and are not MIDI channels, as MIDI is limited to 16 channels.

The services SetMode( ), SetCorrectionMode( ) and SetNumBlkNotes( ) set the mode, correctionMode and numBlkNotes attributes respectively using simple assignment (example: mode=newMode).

FIG. 13 AND TABLE 14

The BlackMelodyKey object is responsible for handling all black melody key events. This involves, depending on mode, getting notes from the current scale object and/or chord inversion object and sending the notes out.

The class attributes for this object include mode, which may be set to one of Normal=0, RightHandChords=1 or Scale3rds=2. The attribute correctionMode controls how the service CorrectKey behaves and may be set to either Normal=0 or SoloChord=1, SoloScale=2, or SoloCombined=3. Instance variables include absoluteKeyNum and colorKeyNum and octave (see FIG. 2). The attribute destChannel holds the destination channel for the key on event. keyOnFlag indicates whether the Key in pressed or not. Velocity holds the velocity the key was pressed with and note[4] holds the notes that were sounded (if any).

TABLE 14

| PianoKey::BlackMelodyKey Attributes and Services |
|---|
| Class Attributes: |
| 1. mode |
| 2. correctionMode |
| Instance Attributes: |
| 1. absoluteKeyNum |
| 2. colorKeyNum |
| 3. octave |
| 4. destChannel |
| 5. keyOnFlag |
| 6. velocity |
| 7. note[4] |
| Services: |
| 1. ResondToKeyOn(sourceChannel, velocity); |
| 2. RespondToKeyOff(sourceChannel); |
| 3. CorrectKey(); |
| 4. SetMode(newMode); |
| 5. SetCorrectionMode(newCorrectionMode); |

FIG. 13*a* through 13*f* shows a flow diagram for the RespondToKeyOn( ) service. This service is called in response to the black melody key being pressed. It is responsible for generating the note(s) to be sounded. It is entered with the velocity of the key press and the channel the key was received on. It starts by initializing itself in step **13*a*-1, as described below. Next, it branches to a specific sequence that is dependent on the mode in step 13*a*-2. These specific sequences generate the notes. It finishes by outputting the generated notes in step 13*a*-3**.

The initialization sequence, shown in FIG. **13*b*, first checks if the key is already pressed. If it is (keyOnFlg=1), the service 'RespondToKeyOff( )' service will be called in step 13*b*-1. Then, keyOnFlg is set to 1, indicating the key is pressed, the velocity and destCnl attributes are set and the notes are cleared by being set to 0 in step 13*b*-2**.

FIG. **13*c* shows a flow diagram of the normal (mode=0) sequence. The note(s) played depends on which black key it is (colorKeyNum). Black (colorKeyNum) keys 0, 1, 2, and 3 get the fundamental, alternate, C1 and C2 note of inversionC, respectively as simply diagrammed in the sequence 13*c*-1 of FIG. 13C. Black (colorKeyNum) key 4 gets the entire chord by calling the GetInversion( ) service of inversionC (13*c*-2**).

FIG. **13*d* shows a flow diagram of the right hand chords (mode=1) sequence. If the colorKeyNum attribute is 4 (meaning this is the 5th black key in the octave), then the current chord in the current inversion of inversionC is fetched and played in step 13*d*-1**. Black keys 0 through 3 will get right hand chords 1 through 4 respectively.

Figure 13A:
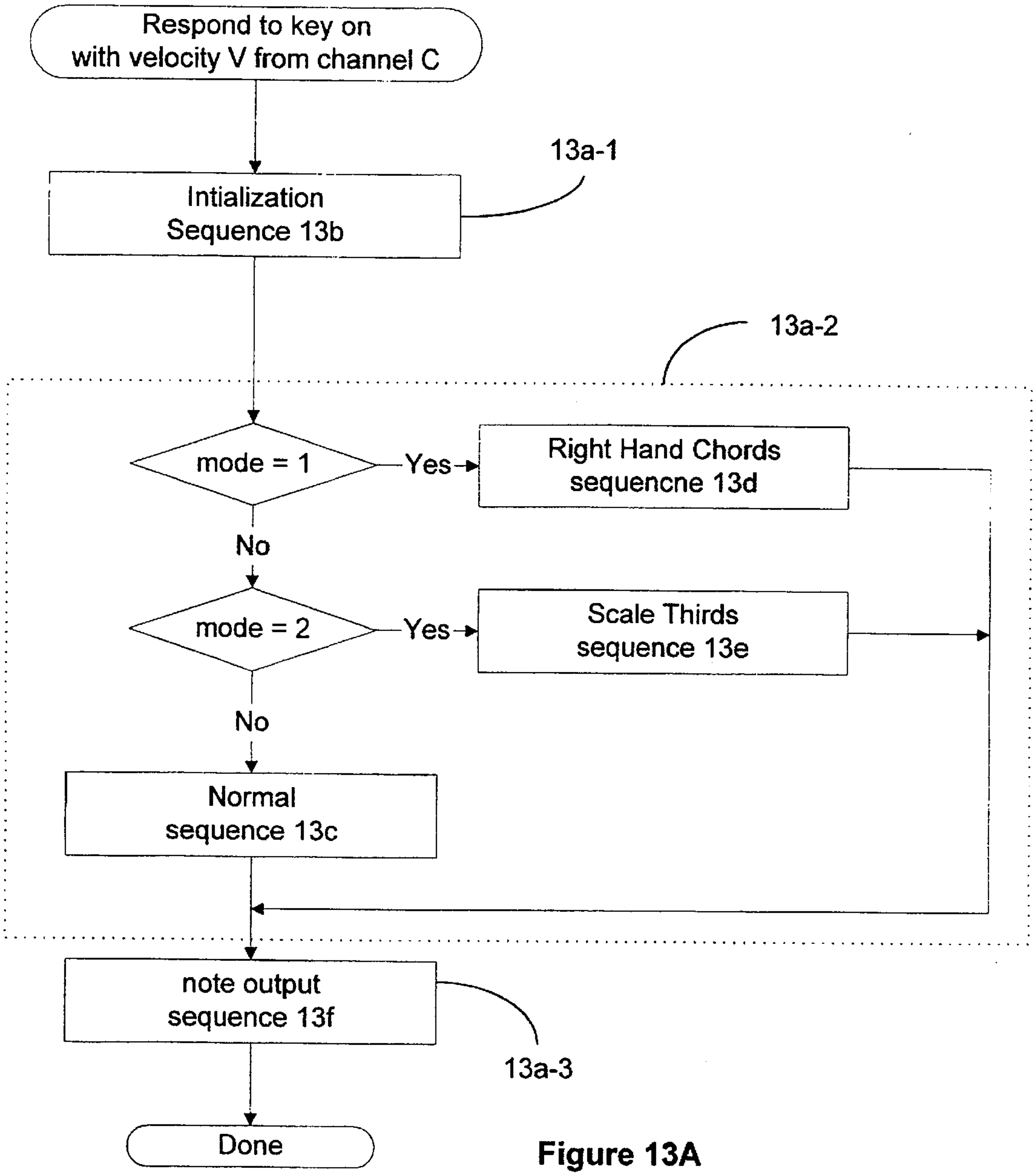
Figure 13B:
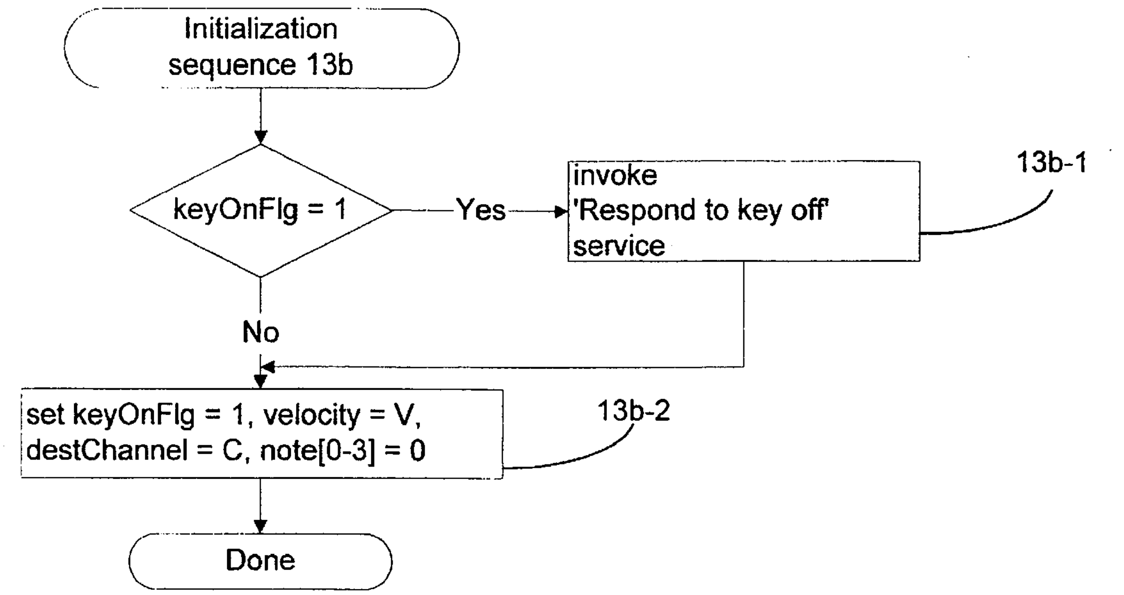
Figure 13F:
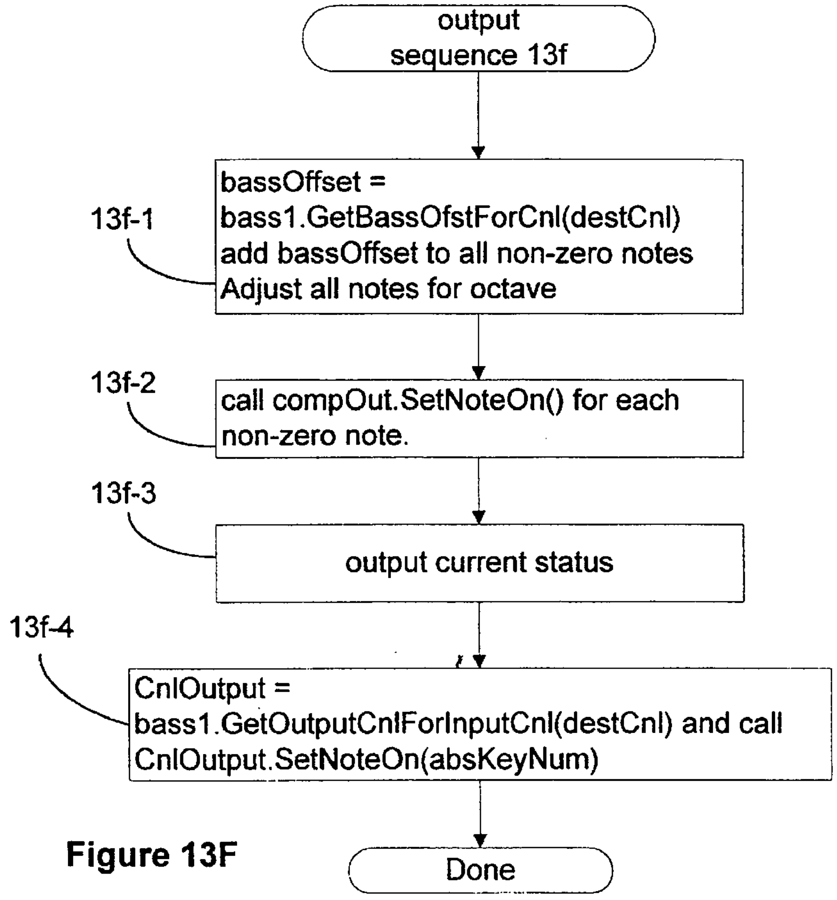
Figure 13D:
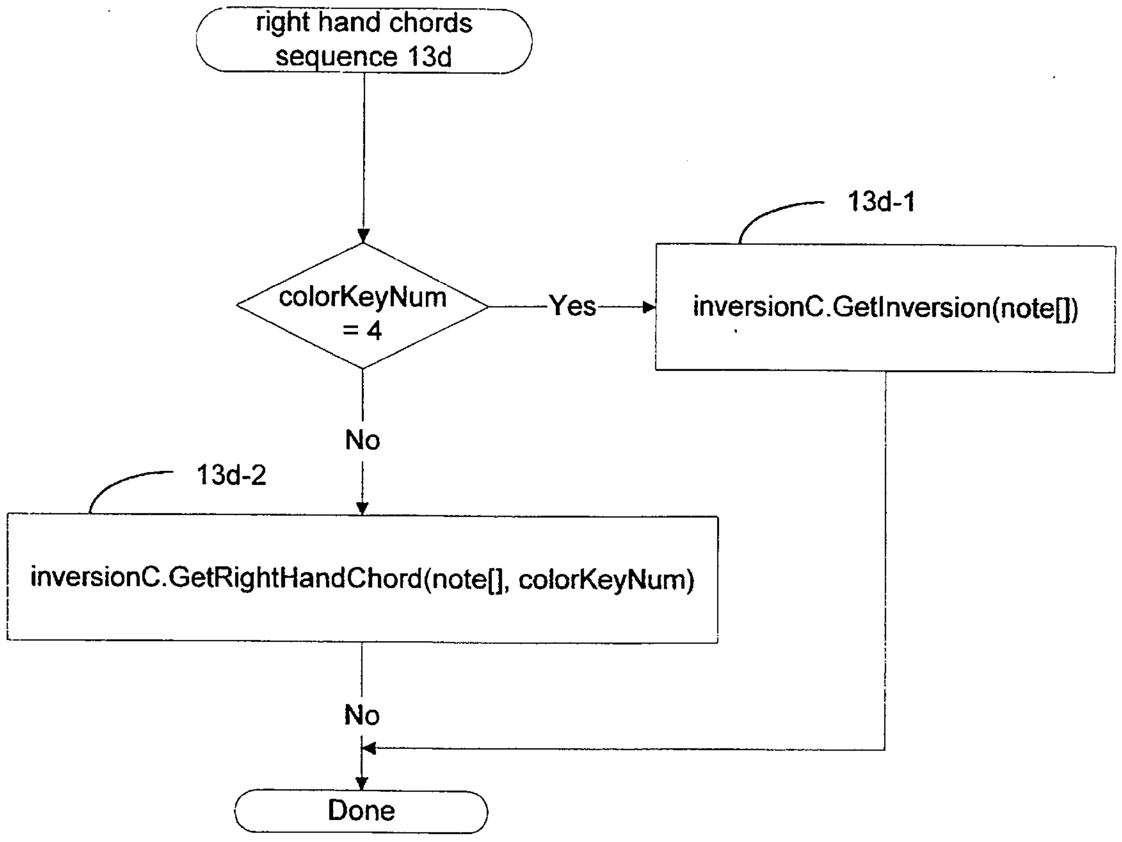
Figure 13C:
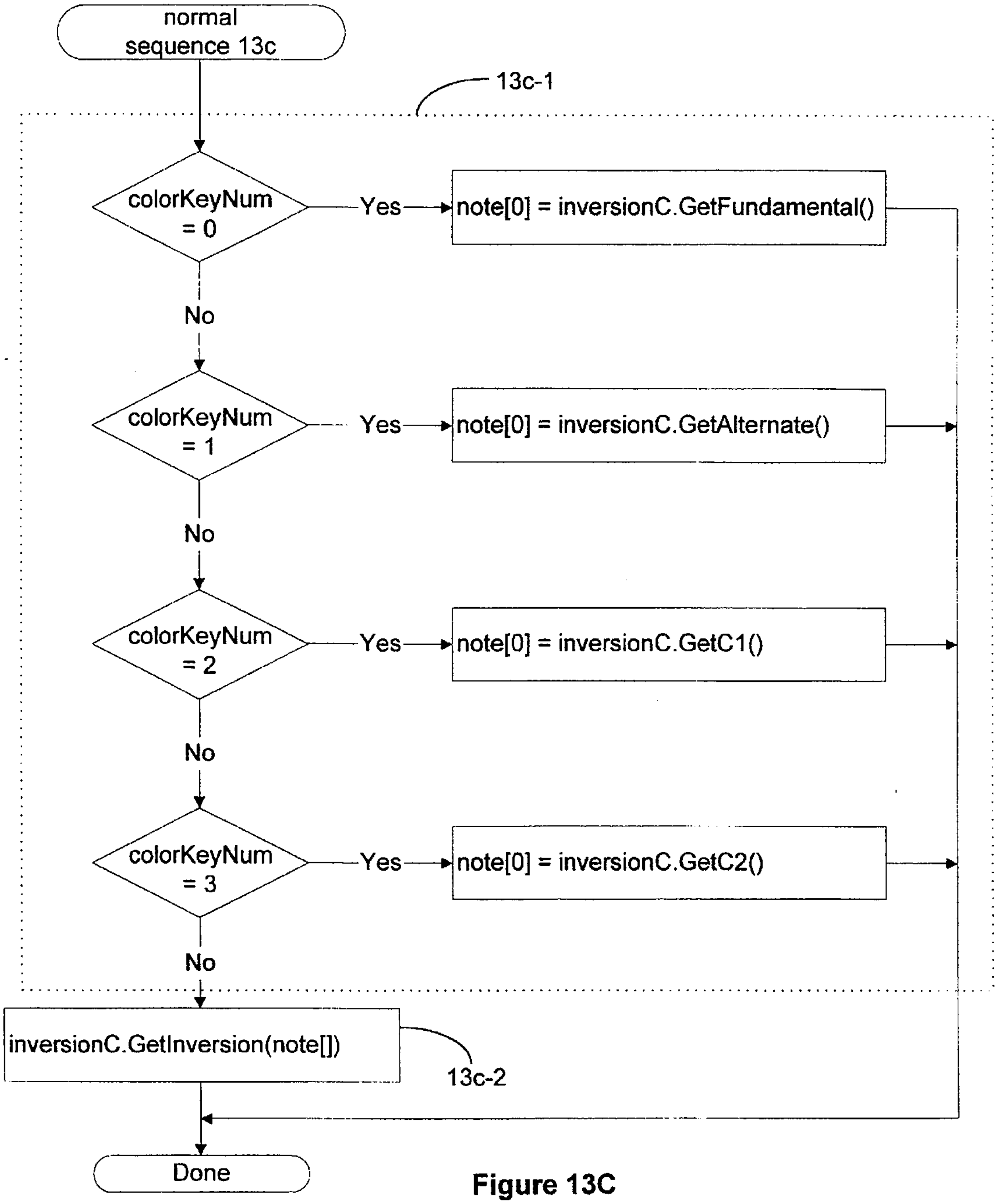
Figure 13E:
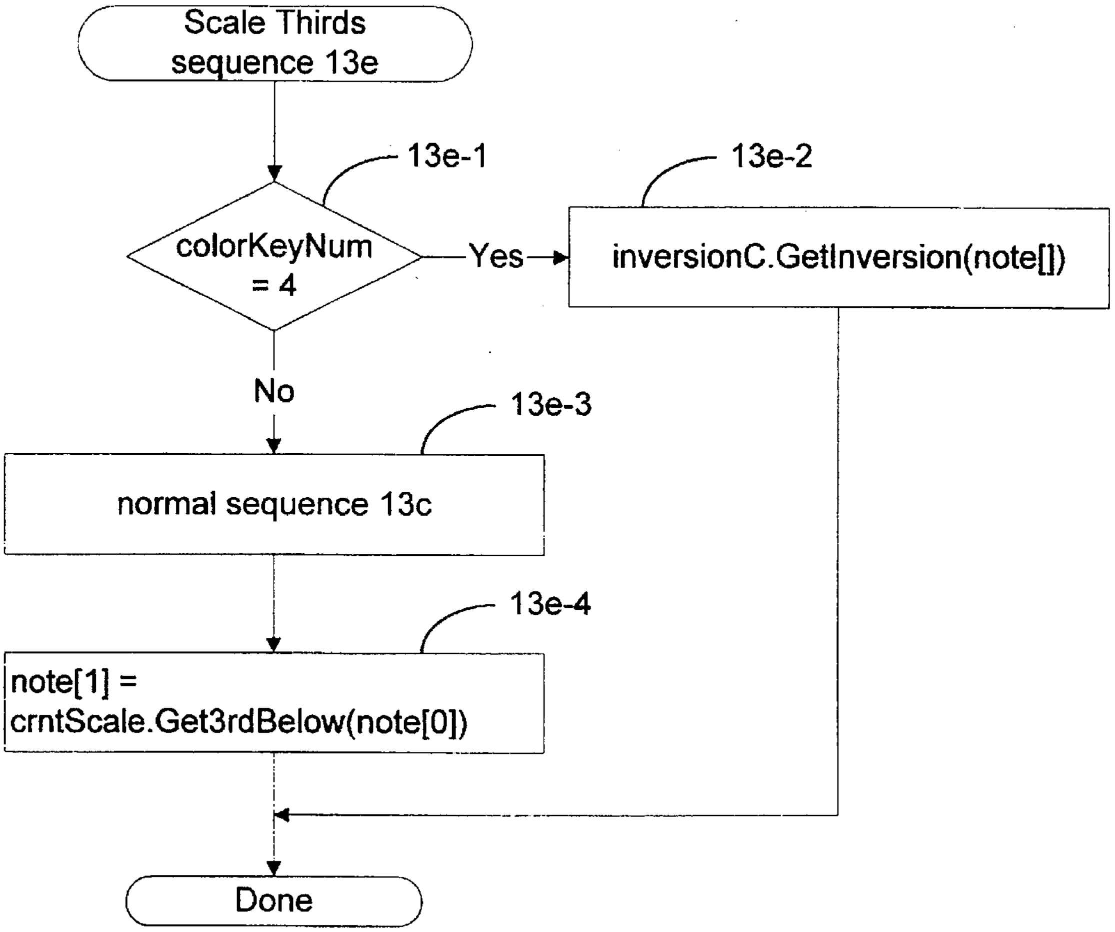

FIG. **13*e* shows a flow diagram of the scale thirds (mode=2) sequence. 13*e*-1 checks if this is the 5th black key (colorKeyNum=4). If it is, the 13*e*-2 will get the entire chord from inversionC object. If it is not the 5th black key, then the normal sequence shown in FIG. 13*c* is executed (13*e*-3). Then the note one scale third below note[0] is fetched from the current scale object (13*e*-4**).

FIG. **13*f* shows a flow diagram of the output sequence. This sequence includes adding the bass offset to each note and adjusting each note for the octave of the key pressed in step 13*f*-1. Next, each non-zero note is output to the compOut instance of the CnlOutput object in step 13*f*-2. The current status is also sent out to channel 2 in step 13*f*-3 (see Table 17). Finally, the original note (key) is output to the proper channel in step 13*f*-4**.

The service RespondToKeyOff( ) sends note offs for each note that is on. It is identical the flow diagram shown in FIG. **12*k***.

The service CorrectKeyOn( ) is called in response to a change in the current chord or scale while the key is on (keyOnFlg=1). This enables the key to correct the notes it has sent out for the new chord or scale. There are four different correction modes (see description for correctionMode attribute above).

In the normal correction mode (correctionMode=0), this service behaves exactly as RespondToKeyOn( ) with one exception. If a new note to be turned on is already on, it will remain on. It therefore does not execute the same identical initialization sequence (FIG. **13*b***) in this mode. It first determines the notes to play (as per RespondToKeyOn( ) service) and then turns off only those notes that are not already on and then turns on any new notes. The solo correction modes (correctionMode=1, 2, or 3) takes this a step further. It turns off only those notes that are not in the new current chord (correctionMode=1), scale (correctionMode=2) or combined chord and scale correctionMode=3). If a note that is already on exists any wherein the current chord, scale or combined chord and scale it will remain on. The current chord objects service isNoteInChord( ) and the current scale objects services isNoteInScale and isNoteInCombinedScale( ) are used to determine if each note already on should be left on or turned off. The output channel for the original key is determined as for the while melody key as described above.

The services SetMode( ) and SetCorrectionMode( ) set the mode and correctionMode attributes respectively using simple assignment (example: mode=newMode).

TABLE 15

Since the black chord progression keys play non-scale chords, they are seldom used in music production. These keys become more useful as a control (function) key or toggle switches that allows the user to easily and quickly make mode and configuration changes on the fly. Note that any key can be used as a control key, but the black chord progression keys (non-scale chords) are the obvious choice. The keys chosen to function as control keys are simply instantiated as the desired key type (as are all the other key types). The present invention uses 4 control keys. They are piano keys with absKeyNum of 49, 51, 54 and 56. They have three services, RespondToKeyOn( ), RespondToProgramChange and RespondToKeyOff( ). Presently, the RespondToKeyOff( ) service does nothing (having the service provides a consistent interface for all piano key objects, relieving the music administrator object 3-3 from having to treat these keys differently from other keys. The RespondToKeyOn( ) service behaves as follows. Key 49 calls config.setSongKeyBank(0), key 51 calls config.SongKeyBank(1), key 54 calls config. SetScaleBank (0), and key 56 calls config. SetScaleBank(1). Note that these same functions can be done via the user interface. A program change equal to the absKeyNum attribute is also output as for the chord progression keys (see 10-16). The service RespondToProgramChange( ) service is identical to the RespondToKeyOn( ) service. It is provided to allow received program changes (patch triggers) to have the same controlling effect as pressing the control keys.

TABLE 15

| PianoKey::ControlKey Attributes and Services |
|---|
| Attributes: |
| 1. absKeyNum |
| Services: |
| 1. RespondToKeyOn(sourceChannel, velocity); |
| 2. RespondToKeyOff(sourceChannel) |
| 3. RespondToProgramChange(sourceChannel); |

FIGS. 14*a*, 14*b*, 14*c*, 14*d* AND 14*e* AND TABLE 16

There is one instance of the music administrator object called musicAdm 3-3. This is the main driver software for the present invention. It is responsible for getting music input from the music input object 3-4 and calling the appropriate service for the appropriate piano key object 3-6. The piano key services called will almost always be RespondToKeyOn( ) or RespondToKeyOff( ). Some music input may be routed directly to the music output object 3-12. Table 16 shows the music administrators attributes and services. The attribute mode may be either off (0) or on (1). The array chordKeyFlg[60] is an array of flags that indicate which melody keys are on (flag=1) and which are off (flag=0). The array melodyKeyFlg[68] is an array of flags that indicate which melody keys are on (flag=1) and which are off (flag=0). The chord progression keys are pianoKeys 0 through 59 and the melody keys are pianoKeys 60 through 127 (melodyKeyFlg[0] is for pianoKey[60]).

TABLE 16

| Music Administrator Objects Attributes and Services |
|---|
| Attributes: |
| 1. mode |
| 2. chordKeyFlg[60] |
| 3. melodyKeyFlg[68] |
| Services: |
| 1. Update(); |
| 2. SetMode(newMode); |
| 3. CorrectKeys(); |

The service SetMode( ), called by the user interface object 3-2, simply sets the mode attribute.

The Update( ) service is called by main (or, in some operating systems, by the real time kernel or other process scheduler). This service is easy composers main execution thread. FIGS. 14*a* through 14*e* show a flow diagram of this service. It first checks if there is any music input received in step 14*a*-1 and does nothing if not. If there is input ready, step 14*a*-2 gets the music input from the music input object 3-4. This music input includes the key number (KeyNum in FIG. 14*a* through 14*d*), the velocity of the key press or release, the channel number and whether the key is on (pressed) or off (released).

If mode attribute is off (mode=0) then the music input is simply echoed directly to the output in step 14*a*-4. There is no processing of the music if mode is off. If mode is on (mode=1), then execution proceeds with the flow diagram shown in FIG. 14*b*. Step 14*b*-1 checks if the input channel of the received music is valid. If not valid, execution returns to the beginning (U1), to process the next music input (if any). This service does not return until there is no more music input waiting to be processed.

If the input is from a valid channel then step 14*b*-2 checks if it is a key on or off message. If it is, then step 14*b*-3 checks if it is a chord progression key (keys<60) or a melody key. Processing of chord progression keys proceeds with U3 (FIG. 14*c*) and processing of melody keys proceeds with U4 (FIG. 14*d*). If it is not a key on/off message then step 14*b*-4 checks if it is a program change (or patch trigger). If it is not then it is a pitch bend or other MIDI message and is sent unprocessed to the output object by step 14*b*-7, after which it returns to U1 to process the next music input. If the input is a patch trigger then step 14*b*-5 checks if the patch trigger is less than 60. If it is not, then the patch trigger is sent to the current status object in step 14*b*-8 by calling the RcvStatus(patchTrigger) service (see Table 17) and then calling the CorrectKey( ) service (14*b*-9), followed by returning to U1.

If the patch trigger is less than 60, then step 14*b*-6 calls the RespondToProgramChange( ) service of the pianoKey of the same number as the patch trigger. Execution then returns to U1 to process the next music input.

Figure 14A:
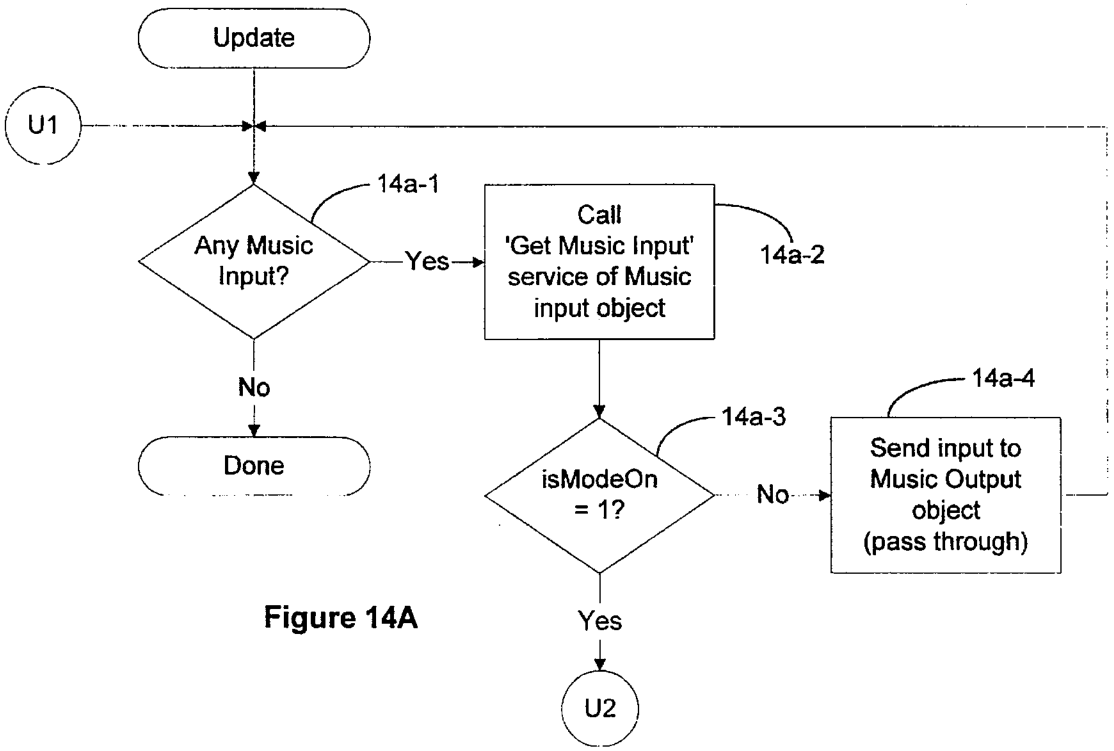
Figure 14B:
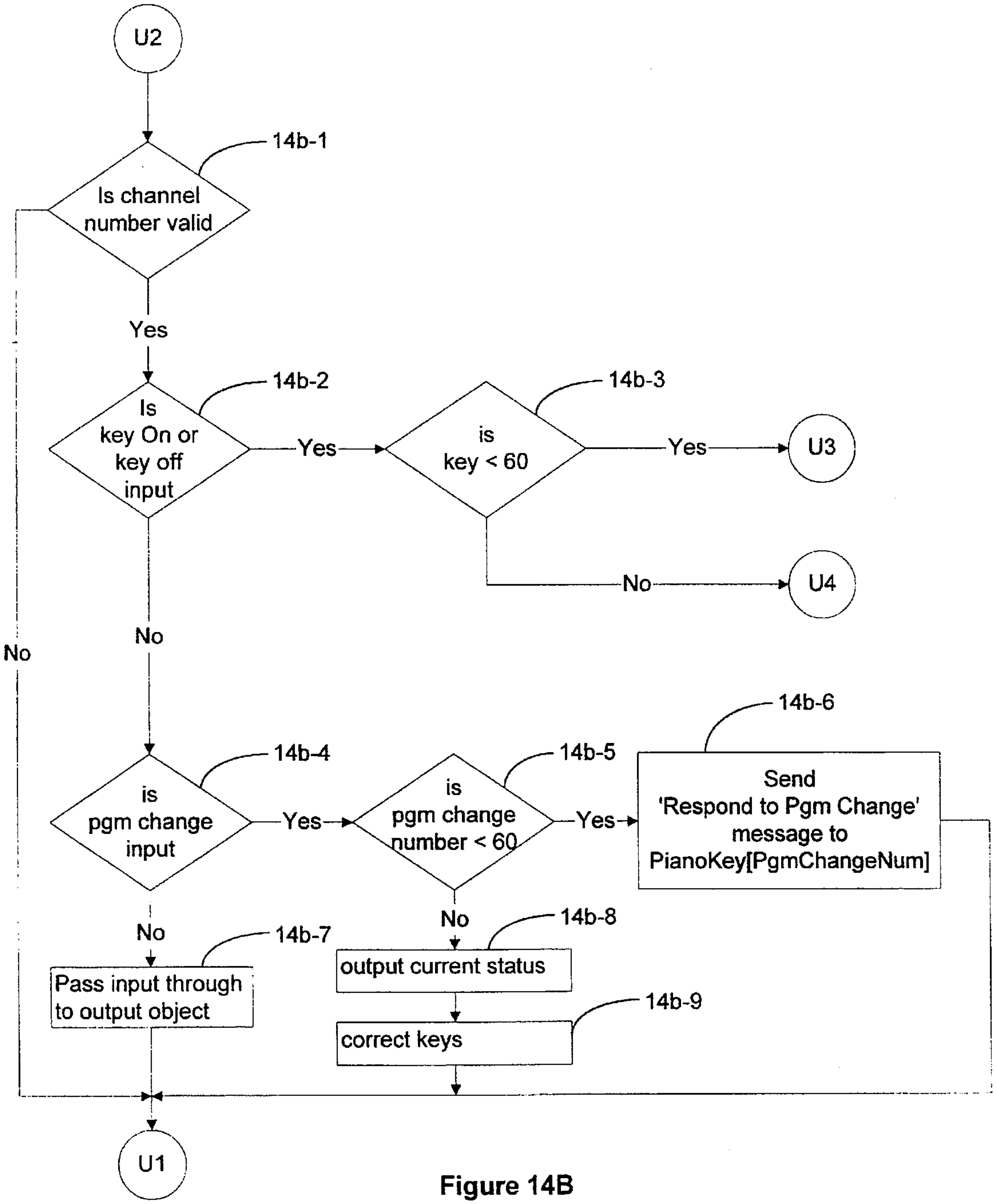
Figure 14C:
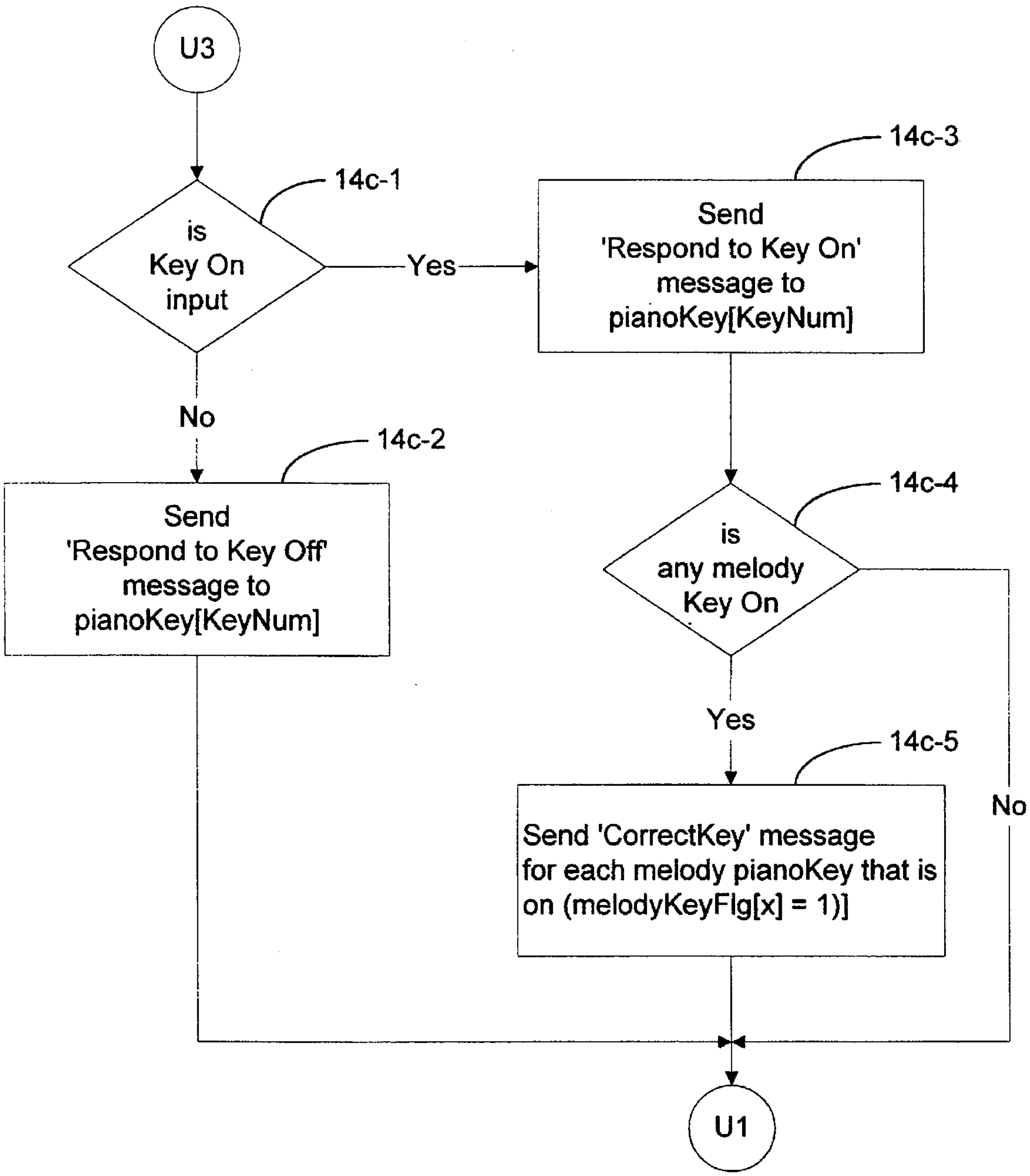
Figure 14D:
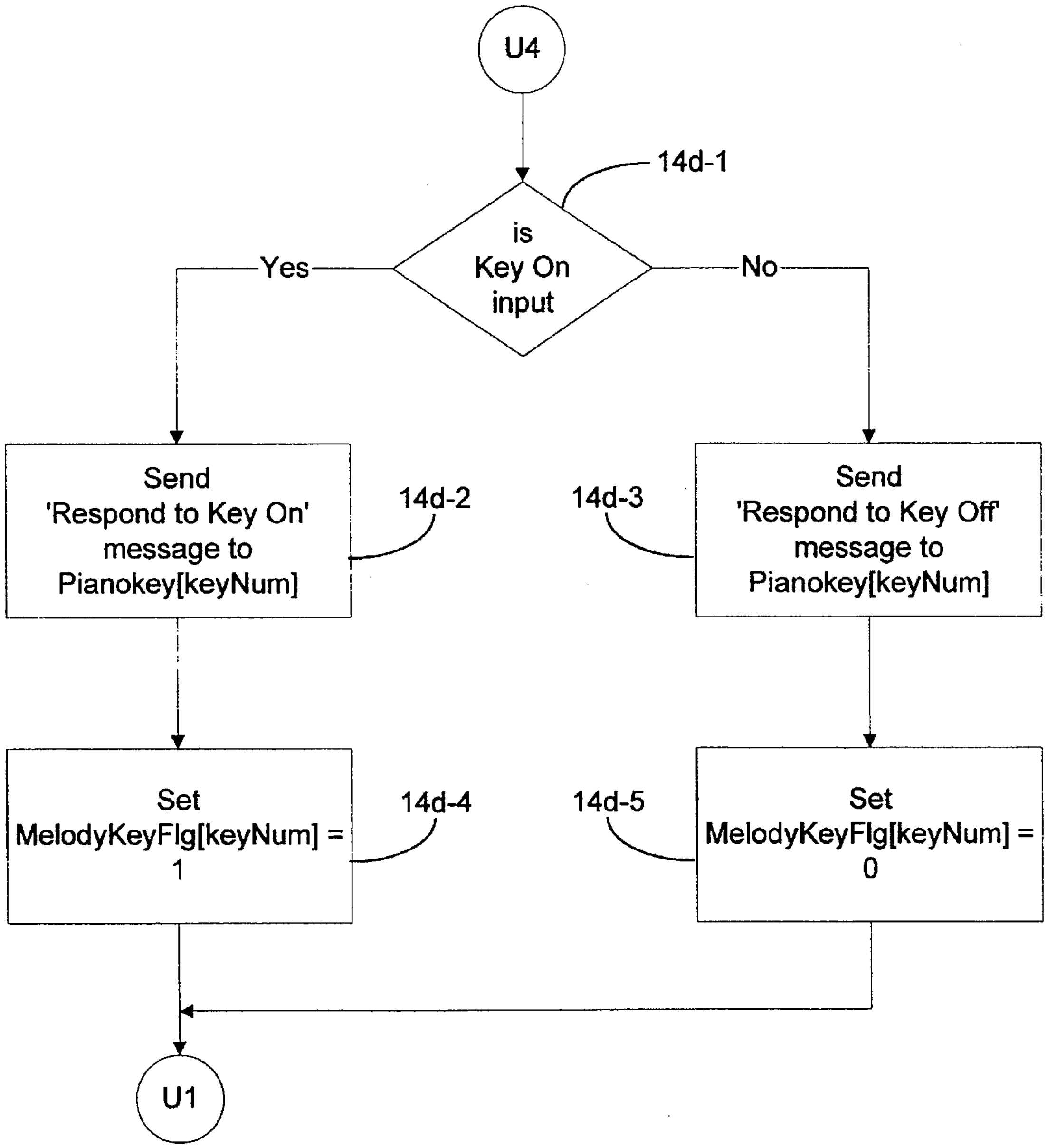

Referring to FIG. 14*c*, step 14*c*-1 checks if the music input is a key on message. If it is not, step 14*c*-2 calls the RespondToKeyOff( ) service of the key. If it is, step 14*c*-3 calls the RespondToKeyOn( ) service. After the KeyOn service is called, steps 14*c*-4 and 14*c*-5 call the CorrectKey( ) service of any melody key that is in the on state, indicated by melodyKeyFlg[pianoKey number]=1. Processing then proceeds to the next music input.

Referring to FIG. 14*d*, step 14*d*-1 checks if the melody key input is a Key On message. If it is, then step 14*d*-2 calls the RespondToKeyOn( ) service of the specified melody key. This is followed by step 14*d*-4 setting the melodyKeyFlg to 1 indicating that the key is in the on state. If the music input is a key off message, then step 14*d*-3 calls the RespondToKeyOff( ) service and step 14*d*-5 clears the melodyKeyflg to 0. Execution then proceeds to U1 to process the next input.

In the description thus far, if the user presses more than one key in the chord progression section, all keys will sound chords, but only the last key pressed will assign (or trigger) the current chord and current scale. It should be apparent that the music administrator object could be modified slightly so that only the lowest key pressed or the last key pressed will sound chords.

The CorrectKeys( ) service is called by the user interface in reponse to the song key being changed or changes in chord or scale assignments. This service is responsible for calling the CorrectKey( ) services of the chord progression key(s) that are on followed by calling the CorrectKey( ) services of the black and white melody keys that are on.

TABLE 17

Table 17 shows the current status objects attributes and services. This object, not shown in FIG. 3, is responsible for sending and receiving the current status which includes the song key, the current chord (fundamental and type) and the current scale (root and type). The current chord inversion setting could also be sent and received, if preferred. The current status message sent and received consists of 6 consecutive patch changes in the form 61, 1*aa*, 1*bb*, 1*cc*, 1*dd* and 1*ee*, where 61 is the patch change that identifies the beginning of the current status message (patch changes 0–59 are reserved for the chord progression keys).

aa is the current song key added to 100 to produce 1*aa*. The value of aa is found in the song key attribute row of Table 2 (when minor song keys are added, the value will range from 0 through 23). bb is the current chord fundamental added to 100. The value of bb is also found in the song key attribute row of Table 2, where the number represents the note in the row above it. cc is the current chord type added to 100. The value of cc is found in the Index column of Table 4. dd is the root note of the current scale added to 100. The value of dd is found the same as bb. ee is the current scale type added to 100. The possible values of ee are found in the Index column of Table 6a.

The attributes are used only by the service RcvStatus( ) which receives the current status message one patch change at a time. The attribute state identifies the state or value of the received status byte (patch change). When state is 0, RcvStatus( ) does nothing unless statusByte is 61 in which case is set state to 1. The state attribute is set to 1 any time a 61 is received. When state is 1, 100 is subtracted from statusByte and checked if a valid song key. If it is then it is stored in rcvdSongKey and state is set to 2. If not a valid song key, state is set to 0. Similarly, rcvdChordFund (state=2), rcvdChordType (state=3), rcvdScaleRoot (state=4) and rcvdScaleType (state=5) are sequentially set to the status byte after 100 is subtracted and value tested for validity. The state is always set to 0 upon reception of invalid value. After rcvdScaleType is set, the current song key, chord and scale are set according to the received values and state is set to 0 in preparation for the next current status message.

The service SendCurrentStatus( ) prepares the current status message by sending patch change 61 to channel 2, fetching the song key, current chord and current scale values, adding 100 to each value and outputting each to channel 2.

TABLE 17

| Current Status Objects Attributes and Services |
|---|
| Attributes: |
| 1. state |
| 2. rcvdSongKey |
| 3. rcvdChordFund |
| 4. rcvdChordType |
| 5. rcvdScaleRoot |
| 6. rcvdScaleType |
| Services: |
| 1. SendCurrentStatus(); |
| 2. RcvStatus (statusByte); |

Alternatively, the current status message could be simplified to identify only which chord, scale, and song key bank (of the configuration object) is selected, rather than identifying the specific chord, scale, and song key. In this case, 61 could be scale bank 1, 62 scale bank 2, 36 chord group bank 1, 63 song key bank 1, 64 song key bank 2, etc. The RcvStatus( ) service would, after reception of each patch trigger, would call the appropriate service of the configuration object, such as SetScaleBank(1 or 2). However, if the configuration has changed since the received current status message was sent, the resulting chord, scale, and song key may be not what the user expected.

TABLE 18

There is one music input object musicIn 3-4. Table 18 shows its attributes and services. This is the interface to the music input hardware. The low level software interface is usually provided by the hardware manufacturer as a 'device driver'. This object is responsible for providing a consistent interface to the hardware "device drivers" of many different vendors. It has four main attributes. keyRcvdFlag is set to 1 when a key pressed or released event (or other input) has been received. The array rcvdKeyBuffer[] is an input buffer that stores many received events in the order they were received. This array along with the attributes bufferHead and bufferTail enable this object to implement a standard first in first out (FIFO) buffer.

The services include isKeyInputRcvd( ) which returns true (1) if an event has been received and is waiting to be read and processed. GetMusicInput( ) returns the next event received in the order it was received. The InterruptHandler( ) service is called in response to a hardware interrupt triggered by the received event. The use and implementation of the music input object is straight forward common.

TABLE 18

| Music Input Objects Attributes and Services |
|---|
| Attributes: |
| 1. keyRcvdFlag |
| 2. rcvdKeyBuffer[n] |
| 3. bufferHead |
| 4. bufferTail |
| Services: |
| 1. isKeyInputRcvd(); keyRcvdFlag |
| 2. GetMusicInput(); rcvdKeyBuffer[bufferTail] |
| 3. InterruptHandler() |

TABLE 19

There is one music output object musicOut 3-12. Table 19 shows its attributes and services. This is the interface to the music output hardware (which is usually the same as the input hardware). The low level software interface is usually provided by the hardware manufacturer as a 'device driver'. This object is responsible for providing a consistent interface to the hardware 'device drivers' of many different vendors.

The musicOut object has three main attributes. The array outputKeyBuffer[] is an output buffer that stores many notes and other music messages to be output This array along with the attributes bufferHead and bufferTail enable this object to implement a standard first in first out (FIFO) buffer or output queue.

The service OutputMusic( ) queues music output. The InterruptHandler( ) service is called in response to a hardware interrupt triggered by the output hardware being ready for more output. It outputs music in the order is was stored in the output queue. The use and implementation of the music output object is straight forward and common.

TABLE 19

| Music Output Objects Attributes and Services |
|---|
| Attributes: |
| 1. outputKeyBuffer[n] |
| 2. bufferHead |
| 3. bufferTail |
| Services: |
| 1. OutputMusic(outputByte); |
| 2. InterruptHandler(); |

TABLE 20

The present invention assigns chords to each key in the chord progression section enabling the user to play one finger chords and assign notes and scales to the melody section as previously described. While this is the preferred method, an added feature would be to allow the user to play the entire chord in the chord progression section. This requires the software to recognize the chord played in order to assign the proper notes and scales to the melody section. Table 20 gives the attributes and services of a chord recognition object that could be used for this purpose (chord recognition software is known in the art).

As each note is pressed in the chord progression section, the music administrator object 3-3 calls the SetNoteOn( ) service. As each note is released, the SetNoteOFf( ) service is called. Both of these services return whether or not the new note on or off has resulted in a new valid chord being played in the chord progression section. The service isvalidChord( ) return true if the notes that are on in the chord progression section make up a valid chord. This service returns false if the notes do not make up a valid chord. The GetChord( ) service returns the cord type and fundamental of the most recent valid chord.

The attribute 'chordSingature' is a 12 bit binary number. Each bit represent a note in the chromatic scale. The number is initially set to 0 indicating all notes are off (no notes are played in chord progression section). When the SetNoteOn (noteNum) service is called, the bit for noteNum (regardless of octave) in chordSignature is set to 1. When the SetNoteOff(noteNum) service is called, the bit for noteNum is set to 0. In both cases, the new resulting chordSignature is then look up in a table of valid chord signatures, which identify the chord fundamental and type. If the chordSignature is found, then lastValidSignature is set equal to chordSignature. The table of valid chord signatures can be tailored to anyone's tolerance. For example, if four notes are on which do not represent a valid chord, but three of these notes define a C Major chord, the user may define the four note combination as a C Major chord.

For example, if the bits of chordSignature from left to right, represent the chromatic scale from C to B, then if the user played the notes C, E and G, then the 12 byte signature would 100010010000. The table of valid chord signatures would recognize this as a C Major chord. There are 4096 possible combinations of playing the 12 notes of the chromatic scale, of which a subset are valid chords. There could be a table of valid chord signatures for each song key, since chords may be valid in some keys and invalid in other.

TABLE 20

| Chord Recognition Objects Attributes and Services |
|---|
| Attributes: |
| 1. chordSignature |
| 2. lastValidSignature |
| 3. table of valid chord signatures |
| Services: |
| 1. SetNoteOn(noteNum); is NewChord |
| 2. SetNoteOff(noteNum); is New Chord |
| 3. isValidChord();true/false |
| 4. GetChord(); chord type and fundamental |

USER INTERFACE 3-2

There is one User Interface object 3-2. The user interface is responsible for getting user input from computer keyboard and other inputs such as foot switches, buttons, etc., and making the necessary calls to the other objects to configure the software as the user wishes. The user interface also monitors the current condition and updates the display(s) accordingly. The display(s) can be a computer monitor, alphanumeric displays, LEDs, etc.

In the present invention, the music administrator object 3-3 has priority for CPU time. The user interface 3-2 is allowed to run (have CPU time) only when there is no music input to process. This is probably not observable by the user on today's fast processors (CPUs). The user interface does not participate directly in music processing, and therefore no table of attributes or services is provided (except the Update( ) service called by the main object 3-1. The user interface on an embedded instrument will look quite different from a PC version. A PC using a window type operating system interface will be different from a non-window type operating system.

USER INTERFACE SCENARIOS

The user tells the user interface to turn the system off. The user interface calls musicAdm. SetMode(0) 3-3 which causes subsequent music input to be directed, unprocessed, to the music output object 3-12.

The user sets the song key to D MAJOR. The user interface 3-2 calls songKey. SetSongKey(D MAJOR) (3-8). All subsequent music processing will be in D MAJOR.

The user assigns a minor chord to key 48. The user interface 3-2 calls config.AssignChord(minor, 48) 3-5. The next time pianoKey[48] responds to a key on, the current chord type will be set to minor.

As the user is performing, the current chord and scale are changed per new keys being played. The user interface monitors this activity by calling the various services of crntChord, crntScale etc. and updates the display(s) accordingly.

Many modifications and variations may be made in the embodiments described herein and depicted in the accompanying drawings without departing from the concept and spirit of the present invention. Accordingly, it is clearly understood that the embodiments described and illustrated herein are illustrative only and are not intended as a limitation upon the scope of the present invention.

For example, instead of using 54–65 as the basis for data generation, and popular chord voicing, another range may be used. Also, although the present embodiment designates keys 0–59 as the chord progression section, and 60–127 as the melody section, any ranges can be designated for each to adequately accomplish the same result. Chords in the chord progression section can be set to sound in a different octave than described herein. The preferred embodiment allows chords in the chord progression section to be shifted up or down by octaves with a footswitch, etc., instead of splitting the chord progression section into multiple groups and allowing each ground to be sounded in a different octave when played. This was done so that the keys could be allocated for making more chord types available to the user, or for possibly even making another song key available simultaneously to the user. .Multiple groups could, however, be made to sound in different octaves if needed by simply following the procedures set forth herein for chords in the melody section. Even more chord types could be made available by pressing multiple keys. For example, holding down combinations of keys in the chord progression section such as 1, 1+2, 1+2+3, 1+2+3+4, could each sound a different chord type providing many more chord types to the user. The same system could be used to trigger different inversions of each chord, or even to sound a specific note, combination of notes, or no notes of the chosen chord. When using multiple key presses, the programmer has the option of which combination or combinations shall output a trigger or triggers as described herein. The preferred embodiments of this invention were described using MIDI specifications, although any adequate protocol could be used to accomplish the results described herein. This can be done by simply carrying out all processing relative to the desired protocol. Therefore, the disclosed invention is not limited to MIDI only. Also, a foot pedal, buttons, and/or other input controllers could be used instead of the key depressions as described herein to change song keys, scales, inversions, and modes, and also for general performance or for playing the chord progression.

The invention described herein shall not be limited to the 17 popular chord types and 18 popular scales described, or to the basic inversions given for each chord. Any chord type or scale could be used including modified, altered, or partial scales, and any scale could be assigned to any chord by the user. The preferred embodiment describes how to derive inversions 1,2,3,4 and popular voicing of each chord, although any specific inversion could be derived using these methods, and in any octave. For example, an inversion where the alternate note=highest note in the inversion, 3rd note=highest note in the inversion, etc. could also easily be derived. Additional notes could also be output for each chord to create fuller sound, such as outputting an additional fundamental note which is one octave below the original fundamental, etc. Also, although chord notes in the preferred embodiment are output with a shared common velocity, it is possible to independently allocate velocity data for each note to give chords a "humanized" feel. In addition to this velocity data allocation, other data such as different delay times, polyphonic key pressure, etc. could also be output. Also, the current song key in the chord progression section is based on the Major scale, even though any scale or scales such as blues, relative minor, modified scales, partial scales (ex. 1-4-5 only), etc. could easily be used. Although the preferred embodiment described herein places all chord groups in chromatic order, any random order could just as easily be used. The indication system described herein shows chord groups 1–7 Major, and 1–7 relative minor of current song key and indicates non-scale chord groups with the "#" symbol and appropriate number. Any other symbols or indicators will do as long as they adequately convey to the user each chord groups specific relative position in the current song key scale and/or which chord groups are scale groups and which are non-scale groups. Because of the nature of the fixed-location methods described herein, a user could successfully operate this invention using no indication system at all, if preferred. Also, the indication system in the preferred embodiment shows only 1 or 2 song keys simultaneously to avoid confusion to the user, it could also be expanded to show more song keys simultaneously. For example, in the song key of CMajor, the indication system could be made to not only display a 1 to indicate chord group 1 in the key of CMajor, but also a 5 to indicate chord group 5 in the key of FMajor, a 4 to indicate chord group 4 in the key of GMajor, a 2 to indicate chord group 2 in the key of A#Major, etc. The indication system could also indicate other useful information such as current chord type, chord root, etc. Also, the key labels in the present invention used only sharps (#) In order to simplify the description. These labels could easily be expanded using the Universal Table of Keys with the appropriate formulas, 1-6, 3-5, etc., which is known in the art.

In the preferred embodiment, 4 positions are allocated for the fixed chord location, where the first position is the fundamental (1st) of the chord, second position is the alternate (5th) of the chord, and third and fourth positions are the remaining chord notes sorted from lowest to highest. Although this is the preferred embodiment, any number of positions could be allocated for the fixed chord location to allow for larger chords, or for additional specific chord notes to be played. Also, any specific chord note could be made available on any key in the fixed chord location and in any order. For example, we could have had the (3rd) of the chord specifically made available to the user for playing in place of the C1 for example. We could also have used any order such as fund., 3rd, alt., C1, etc. We could also have one or more chord notes made available in this fixed location randomly, such as sorting them from lowest to highest as described herein, etc.

In the preferred embodiment, 7 positions are allocated for the fixed scale location. Notes are sorted from lowest to highest and then the highest is duplicated if needed. Although this is the preferred method, any number of positions could be allocated to accommodate different scale sizes and scale notes could be made available in any order. For example, the scale could be made available with the root note in the first position, or scale notes could be arranged based on other groups of notes next to them. This would be useful when scale note groups and remaining non-scale note groups are made available next to each other or in the same approximate location. Each scale and non-scale note would be located into a position based on their closest proximity to each other. This would sometimes leave blank positions between notes which could then be filled with duplicate(s) of the previous lower note or next highest note or both, etc. These same rules apply for the remaining non-scale note groups and remaining scale note groups described herein. Any number of positions can be allocated to them and in any order. The scale note groups, chord note groups, remaining scale note groups, and remaining non-scale note groups described herein can be made available to the user in separate groups or together in any combination of groups based on preference and on the capabilities of the instrument on which these methods are employed. The locations of these groups are not to be limited to the locations described herein, with scale notes on the white keys and chord notes on the black keys. Any group or groups could be located anywhere on the instrument, and even broken up if need be. Futuristic instruments may have the ability to make many of the groups available simultaneously, including the right hand chords, block notes, thirds, etc. They may also use input controllers such as pads, buttons, or other devices which do not make-use of traditional keys at all. All methods described herein will work on these futuristic instruments regardless of the type of input controller they utilize and should be protected by the claims described herein. Modern day instruments, however, will probably make the modes mentioned above available to the user by switching various modes between the same sets of keys, as described herein, while making only a certain group or groups available to the user simultaneously. This is due to the current limitations of today's instruments.

The preferred embodiment also describes a means of switching between two different song keys, and also a means of switching between two different scales for each current chord. By using the teachings described herein, a person of average skill in the art could easily expand these to more than just 2 each.

In the preferred embodiment, the chord progression section and the melody section can be made to function together or separately. It may also be useful to make the chord progression section and the first octave of the melody section to function together and independently of the rest of the melody section. Since the first octave of the melody section may often times sound notes which are in the same octave as notes sounded in the chord progression section this may prove useful in certain circumstances. Functions such as octave shifting, full range chords, etc. could be applied to the chord progression section and first melody octave independently of the functioning of the rest of the melody section. It may also be useful to make various modes and sections available by switching between them on the same sets of keys. For example, switching between the chord progression section and first melody octave on the same set of keys, or between scale and non-scale chord groups, etc. This would allow a reduction in the amount of keys needed to effectively implement the system. Also, although the preferred embodiment sends the processed output of the chord progression section and melody section on the same channel, separate channels could be assigned to each thus allowing a user to hear different sounds for each section. This could also apply to the trigger output, original performance, and harmony note output as well.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A method of generating a chord progression on an electronic instrument, comprising the steps of:

a. assigning a first chord to a fixed physical position on the instrument based on a first selected song key and a first selected scale, the first chord representing a relative position based on the first selected song key and scale;

b. selecting a second song key;

c. assigning a second chord which represents the same relative position in the second selected song key and scale as the first chord represented in the first selected song key and scale; and d. assigning the second chord to the fixed physical position, replacing the previous chord.

2. The method of claim 1, further comprising the step of deriving and assigning scale chords, non-scale chords, or a combination of scale and non-scale chords.

3. The method of claim 1, further comprising the step of determining the status of the first chord or the second chord as scale or non-scale.

4. The method of claim 3, further comprising the step of providing a scale or non-scale chord indication for any chord whose status has been determined.

5. The method of claim 1, further comprising the step of changing song keys or scales in real-time.

6. The method of claim 5, further comprising the step of changing the song key according to previously recorded data or manually from a user interface.

7. The method of claim 5, further comprising the step of changing the song key according to a user selectable input.

8. The method of claim 1, further comprising the step of directing the selection of a chord type for at least one chord.

9. The method of claim 8, further comprising the step of selecting chord types manually from a user interface.

10. The method of claim 8, further comprising the step of selecting chord types according to a user selectable input.

11. The method of claim 1, further comprising the step of changing song keys manually from a user interface.

12. The method of claim 1, further comprising the step of providing the circle of 4ths or the circle of 5ths as selectable song keys for at least one selected song key.

13. The method of claim 1, further comprising the steps of a. providing multiple fixed physical positions for user-selectable inputs; and b. arranging the user-selectable inputs in a usable group based on relative position in the song key and scale.

14. The method of claim 13, further comprising the step of providing a plurality of song keys simultaneously for playing.

15. The method of claim 13 further comprising the step of simultaneously making available multiple fixed physical positions representing the same relative position as based on the song key and scale.

16. The method of claim 13, further comprising the step of shifting chords up or down by octaves manually from a user interface.

17. The method of claim 13, further comprising the step of making available different usable groups simultaneously or by switching between the same sets of keys.

18. The method of claim 13, further comprising the step of shifting chords up or down by octaves with an input controller.

19. The method of claim 13 further comprising the step of making chords available in different octaves simultaneously.

20. The method of claim 1, further comprising the step of assigning a chord to a fixed physical position which may represent a different relative position than a previously assigned chord.

21. The method of claim 1, further comprising the step of generating current trigger status from a trigger output denoting the currently selected song key and chord.

22. The method of claim 21 further comprising the step of selectively varying the trigger output.

23. The method of claim 1 further comprising the step of outputting an original performance and a processed performance.

24. The method of claim 23 further comprising the step of outputting the original performance on a specific channel.

25. The method of claim 23, further comprising the step of outputting the processed performance on a specific channel.

26. The method of claim 1, wherein the fixed physical position comprises one or more input controllers.

27. The method of claim 1, further comprising the step of providing a relative scale position indication for at least one chord.

28. A method of generating chord notes on an electronic instrument, comprising the steps of:

a. receiving in the instrument a first user-selectable input from an input controller;

b. determining a set of first current chord notes based on the first user-selectable input;

c. assigning one or more of the first current chord notes to a physical position or physical positions on the instrument;

d. receiving in the instrument a second user-selectable input from an input controller;

e. determining a second set of current chord notes based on the second user-selectable input; and f. assigning one or more of the second current chord notes to the physical position or physical positions replacing the first current chord note or notes.

29. A method of generating one or more scale notes on an electronic instrument, comprising the steps of:

a. receiving in the instrument a first user-selectable input from an input controller;

b. determining a first current scale based on the first user-selectable input and a current chord;

c. assigning one or more of the first current scale notes to a physical position or physical positions on the instrument;

d. receiving in the instrument a second user-selectable input from an input controller;

e. determining a second current scale based on the second user-selectable input and a current chord; and f. assigning one or more of the second current scale notes to the physical position or physical positions, replacing the first current scale note or notes.

30. A method of generating one or more non-scale notes on an electronic instrument, comprising the steps of:

a. receiving in the instrument a first user-selectable input from an input controller;

b. determining a first non-scale note group based on the first user-selectable input and a current scale;

c. assigning one or more notes of the first non-scale note group to a physical position or physical positions on the instrument;

d. receiving in the instrument a second user-selectable input from an input controller;

e. determining a second non-scale note group based on the second user-selectable input and a current scale; and f. assigning one or more notes of the second non-scale note group to the physical position or physical positions, replacing the fir-non-scale note or notes.

* * * * *